United States Patent [19]

Chamberlin et al.

[11] Patent Number: 4,969,136

[45] Date of Patent: Nov. 6, 1990

[54] COMMUNICATIONS NETWORK AND METHOD WITH APPOINTMENT INFORMATION COMMUNICATION CAPABILITIES

[76] Inventors: David B. Chamberlin, 126 Sunnyside Ct., Milford, Conn. 06460; Jy-Hong Su, 14 Hunters La., Norwalk, Conn. 06850

[21] Appl. No.: 895,002

[22] Filed: Aug. 8, 1986

[51] Int. Cl.$^5$ .................. H04M 11/10; H04M 1/65
[52] U.S. Cl. .................................. 369/29; 379/75; 379/84; 369/25
[58] Field of Search ............................ 379/68–70, 379/74, 75, 77, 80, 84, 88, 89; 369/25, 29; 381/39, 44

[56] References Cited

U.S. PATENT DOCUMENTS

| | | |
|---|---|---|
| 3,903,369 | 9/1975 | Darwood . |
| 3,914,551 | 10/1975 | Hunt . |
| 3,916,121 | 10/1975 | Stuzzi . |
| 3,920,926 | 11/1975 | Lenaerts . |
| 3,999,050 | 12/1976 | Pitroda ........................... 235/152 |
| 4,007,491 | 2/1977 | Bolick . |
| 4,057,839 | 11/1977 | Banks . |
| 4,115,846 | 9/1978 | Laine . |
| 4,212,438 | 7/1980 | Schatteman . |
| 4,263,481 | 4/1981 | Ho et al. ........................ 379/80 |
| 4,291,198 | 9/1981 | Anderson . |
| 4,306,117 | 12/1981 | Jacobson . |
| 4,317,143 | 2/1982 | Osanai . |
| 4,328,397 | 5/1982 | Chamberlin ...................... 379/75 |
| 4,378,917 | 4/1983 | Negishi . |
| 4,422,114 | 12/1983 | Sugihara . |
| 4,425,627 | 1/1984 | Eibner . |
| 4,482,085 | 11/1984 | Tanaka . |
| 4,503,288 | 3/1985 | Kessler ........................... 379/79 |
| 4,524,244 | 6/1985 | Faggin . |

FOREIGN PATENT DOCUMENTS

| | | |
|---|---|---|
| 2155278 | 1/1984 | United Kingdom . |
| 2156186 | 3/1984 | United Kingdom . |

OTHER PUBLICATIONS

Telecommunications, North American Edition, vol. 20, No. 8, Aug. 1986, pp. 36–37.
New Products and Services, Telephony, 7/14/86, p. 117.

Primary Examiner—Stuart S. Levy
Assistant Examiner—James E. Tomassini
Attorney, Agent, or Firm—Robert H. Whisker; Melvin J. Scolnick; David E. Pitchenik

[57] ABSTRACT

The network is particularly useful in office communications. The network includes a plurality of transceiver units, each of which can be used as a telephone, or as a dictation terminal, or optionally as an automatic telephone answering machine. The network includes a personal computer for performing various communications and communication control functions. Preferably, each transceiver unit includes a visual display for displaying messages. The computer stores and retrieves information regarding appointments that the users of the network may have. Daily, weekly and monthly appointment calendars are provided for every user of the network. The user is given a reminder message through the network at a predetermined time prior to the appointment. Appointment schedules for current, prior and future time periods can be viewed.

22 Claims, 12 Drawing Sheets

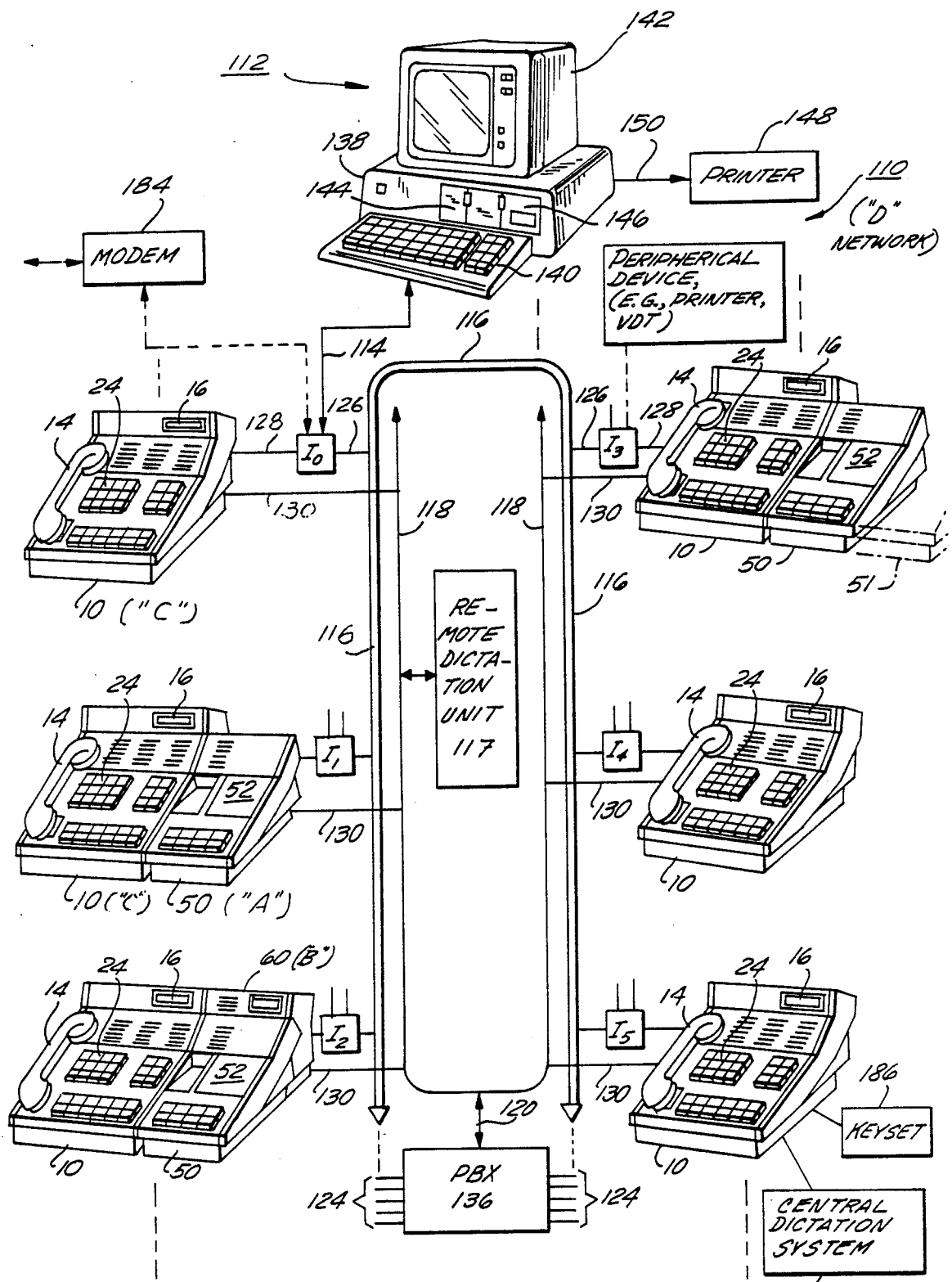
F I G. 1

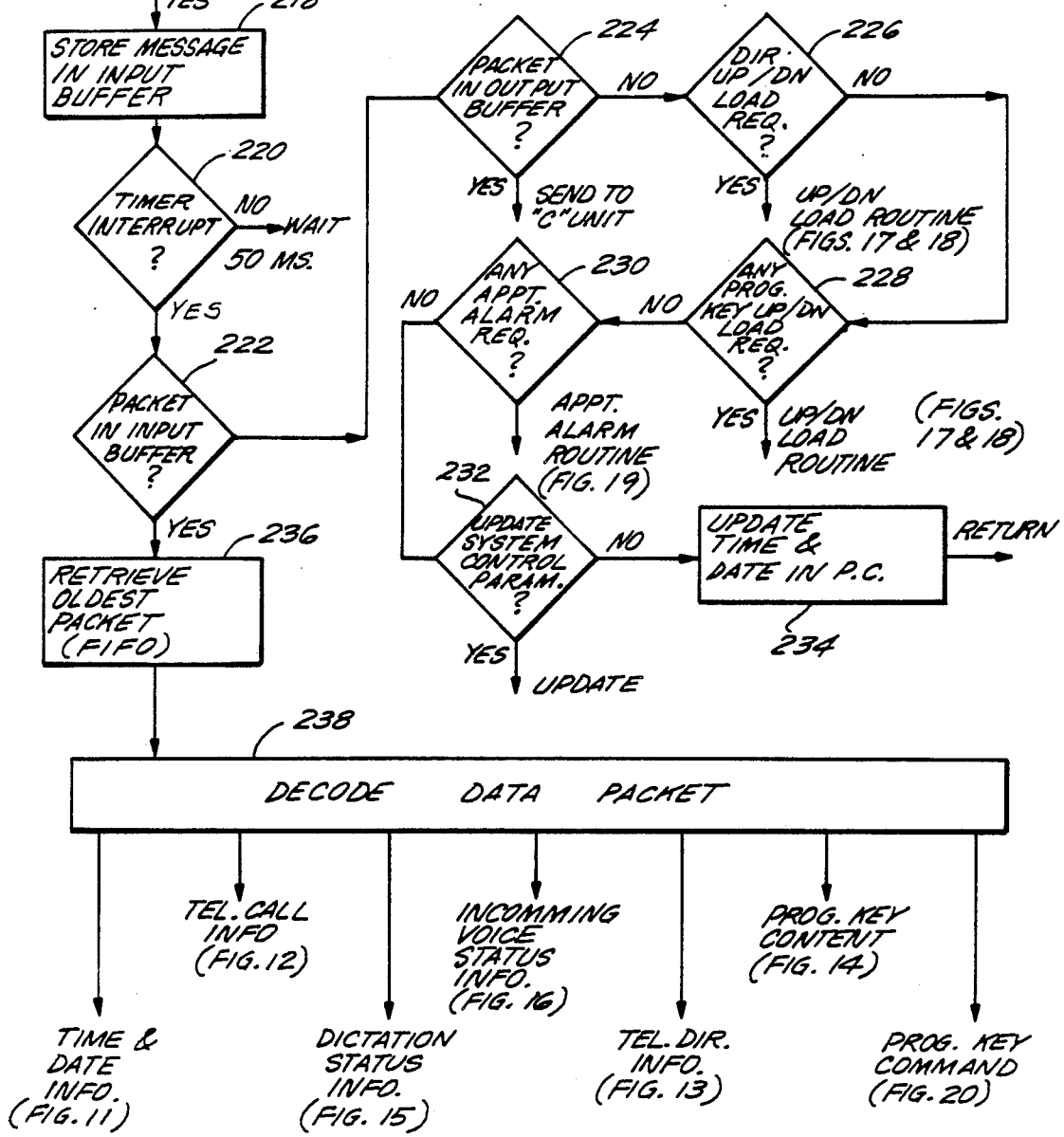
F I G. 9
F I G. 10

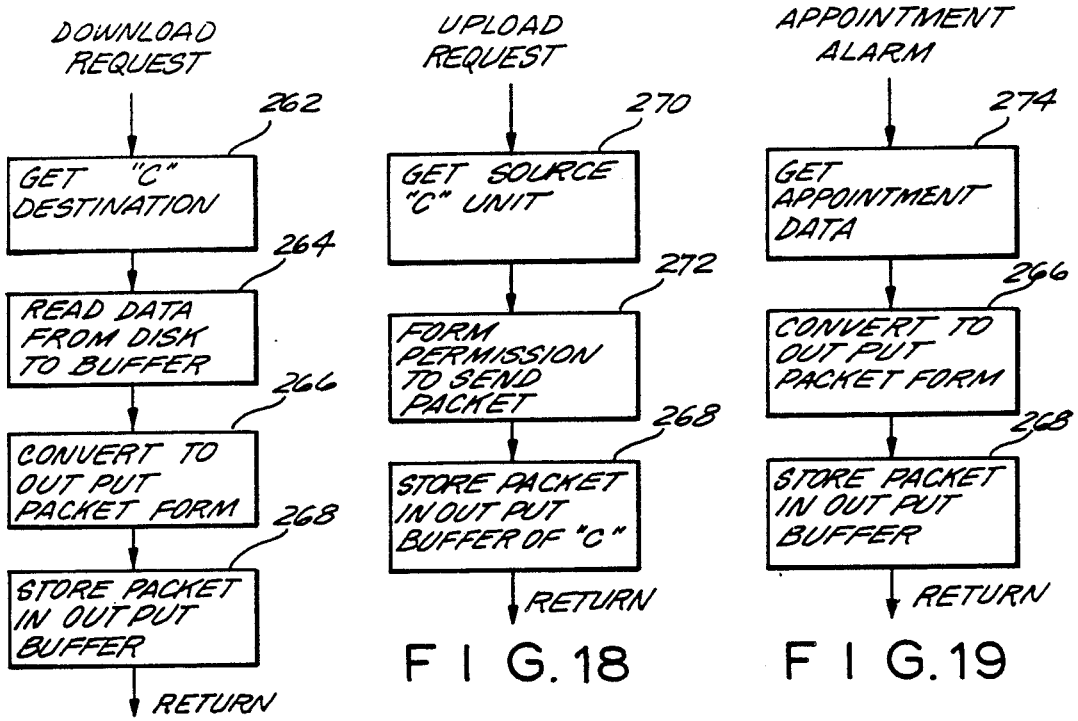
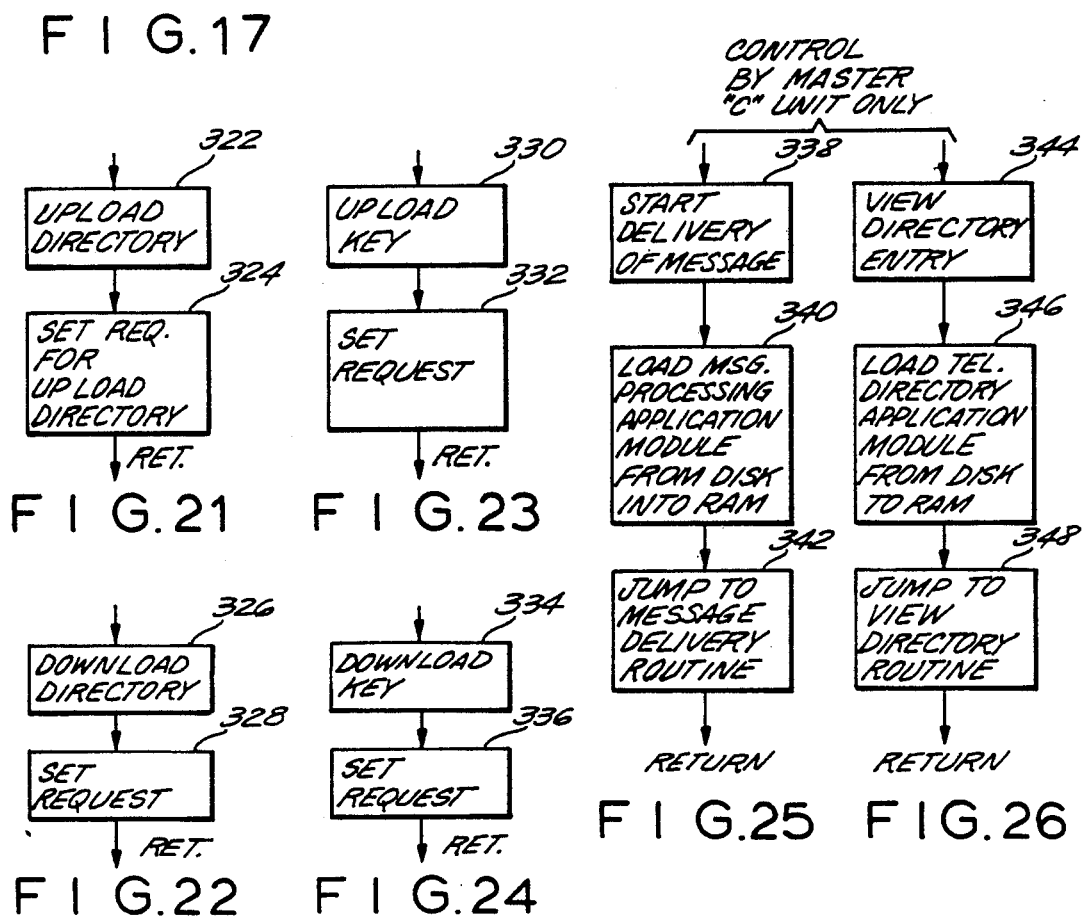

COMMUNICATIONS NETWORK AND METHOD WITH APPOINTMENT INFORMATION COMMUNICATION CAPABILITIES

I. FIELD OF THE INVENTION

Invention relates to communications networks and methods, and particularly to telephone/dictation networks and using computers in the communication process. More particularly, this invention relates to a computerized appointment storage, retrieval and reminder system and method.

II. BACKGROUND OF THE INVENTION

Various proposals have been made in the past and equipment has been offered for intra-office communications networks utilizing computers and telephones. Most such proposals suffer from the defect that they are very expensive; too expensive for most businesses, and prohibitively expensive for relatively small groups.

Therefore, a major problem attacked in making this invention is that of providing an affordable computerized office communications network.

Another problem addressed in making the invention is that it usually is necessary to provide separate equipment for dictation and telephone functions, with each sometimes requiring its own separate computer. This tends to make the total cost of equipping a set of offices relatively expensive.

Prior devices have been proposed in which appointments are stored and reminders given regarding the appointments. However, such prior systems have been unacceptably complex, expensive and difficult to use, or they have provided inadequate information for those using them, or they have other deficiencies.

Other problems which are solved by the network and methods disclosed herein are addressed in co-pending U.S. patent application Ser. Nos. 895,010 and 894,992, now abandoned, both filed on Aug. 8, 1986 which disclose the same network. These problems will not be discussed herein.

III. OBJECTS OF THE INVENTION

In general, it is an object of the present invention to provide equipment and methods which overcome the foregoing problems. More specifically, it is an object of the invention to provide a relatively simple and low-cost office communications network and method which results in more efficient and faster communications, especially for relatively small work groups using the equipment.

It is a specific object of the invention to provide such equipment and methods for keeping track of and reminding people of appointments, without providing any written reminders and with ease of review and change.

Other objects of the invention will be set forth in or apparent from the following description of the invention.

IV. SUMMARY OF THE INVENTION

In accordance with the present invention, the foregoing objects are met by the provision of a telephone communications network including the plurality of telephone transceiver/dictation units connected with a low-cost general purpose digital computer; preferably a "personal" computer. By adopting the network to operate with a personal computer, the cost of the system can be kept relatively low. Moreover, the total cost of the communications equipment for the office is minimized by using various pieces of equipment in the system for multiple purposes.

In accordance with the specific invention claimed herein, an appointment calendar feature is provided whereby appointments are stored for each transceiver unit in the memory of the computer, and an automatic reminder message is transmitted to the transceiver user prior to the appointment. Preferably, the appointments for each unit are arranged in lists for each day or week or month, and it is possible to review the lists for the current period as well as preceding and future periods of time.

V. DESCRIPTION OF THE DRAWINGS

The invention is further explained and described with reference to the accompanying drawings, in which:

FIG. 1 is partially perspective, partially schematic view of a communications network constructed in accordance with the present invention and sometimes referred to as the "D" network;

FIG. 9 is a schematic illustration of the data contained in a data packet used for data transmission in the system of the present invention; and FIGS. 10–26 are computer program flow charts illustrating the data processing steps used in the computer of present invention.

VI. GENERAL DESCRIPTION

Figure 2:
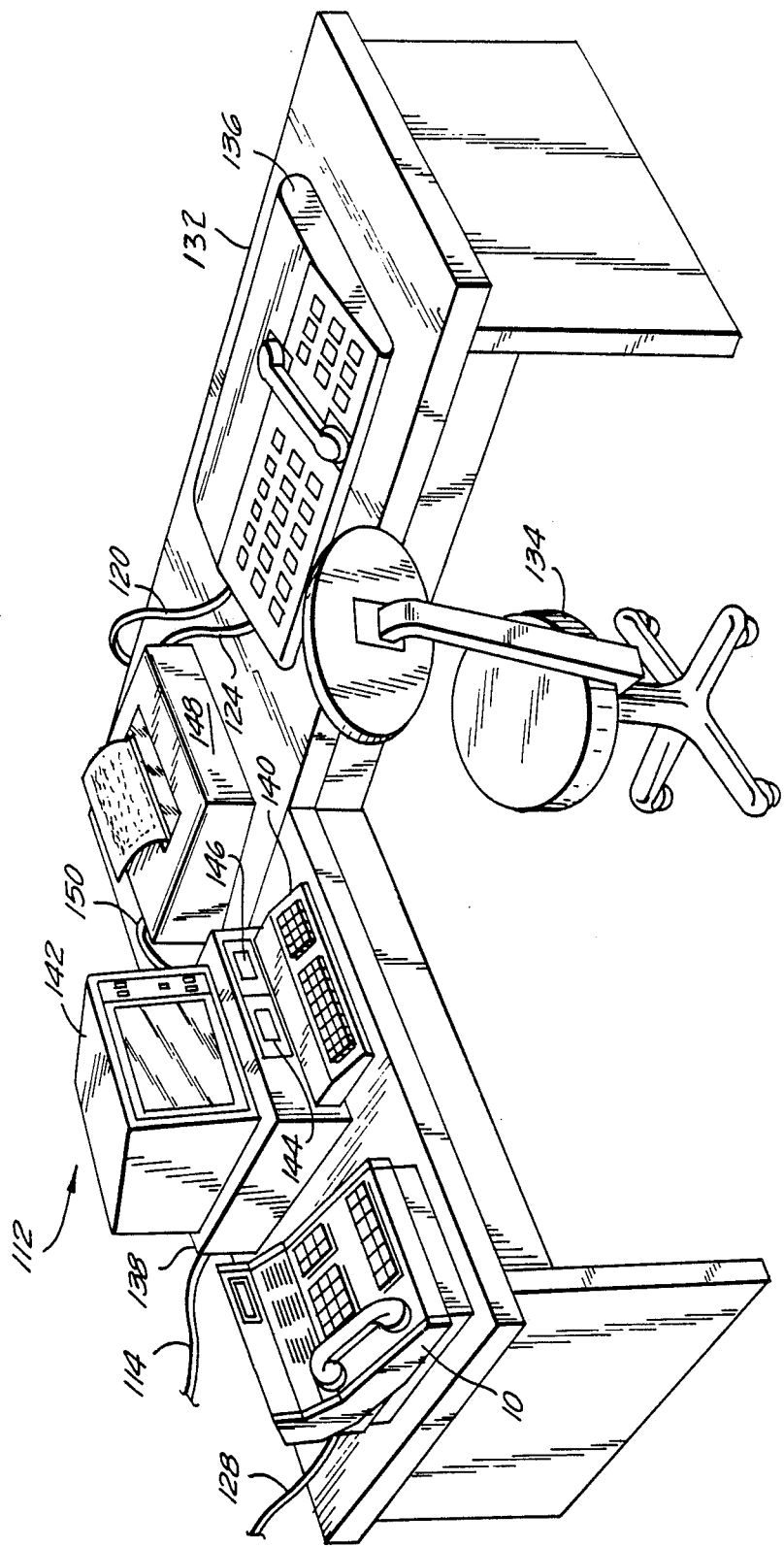
FIG. 2 is a perspective view showing certain equipment used in the present invention.

FIG. 1 shows the communications network 110 of the present invention. This network sometimes is referred to herein as the "D" network. Some of the components used in the network sometimes are identified by the letters "A", "B" or "C" for the sake of convenience.

The network 110 includes a personal computer 112 including a housing 138, a keyboard 140, a floppy disc drive 144, a hard disc drive 146, and a video display unit 142.

The network also includes a plurality of transceiver units 10, which sometimes are referred to as "C" units. Some of the transceiver units 10 have attached to them a sound recorder/reproducer unit ("A" unit) 50, and some of the "A" units have special display units ("B" units) 60 attached to them. The network is capable of supporting up to 16 separate transceiver units at 16 separate stations. Equipment at only six stations is shown in FIG. 1 by way of example. The vertical dashed lines in FIG. 1 indicate the addition of further stations to the network.

The transceiver units 10 are used alone at the station located in the upper left hand corner and the lower right hand corner and in the middle on the right hand side of FIG. 1.

The station in the middle on the left hand side has a combination of a "C" unit and an "A" unit. The station in the lower left hand corner has an "A" a "B" and a "C" unit integrated together.

The station in the upper right hand corner has an "A" and a "B" unit attached, and shows in dashed outline a second "A" unit 51 which may be attached as a further option, for purposes to be described below.

Each transceiver 10 include a telephone handset, a visual display, and a telephone keypad 24, together with other hardware and software which will be described in greater detail below.

The "A" unit has a tape cassette receiving compartment 52, and is used for dictation and transcribing, automatic telephone answering, and telephone conference recording.

The "B" unit 60 is a special display to assist in the use of the "A" unit 50.

Also included in the network 110 are interface units $I_0$, $I_1$, $I_2$, $I_3$, $I_4$, and $I_5$, each of which is connected through lines 126 and 128 between the equipment at each terminal and a data bus 116. The bus 116 is coupled to the computer 112 through the interface unit $I_0$ (the "master" interface unit) and a line 114.

Also included in the network 110 is a private branch exchange unit ("PBX") 136. The PBX unit 136 is connected through a line 120 to an internal telephone line 118 which is connected over conductors 130 to each of the separate terminals. The PBX unit 136 provides means for making selective connections between each internal telephone in the network 110 and one of a plurality of outside telephone lines 124. As it is shown in FIG. 1, each of the interface devices $I_0$, $I_1$, $I_2$, $I_3$, $I_4$, and $I_5$ is capable of connecting the terminal equipment to a modem 184, and each interface unit except the master unit $I_0$ can connect the terminal equipment to a peripheral device such as a printer or a video display terminal as illustrated at 122.

Figure 6:
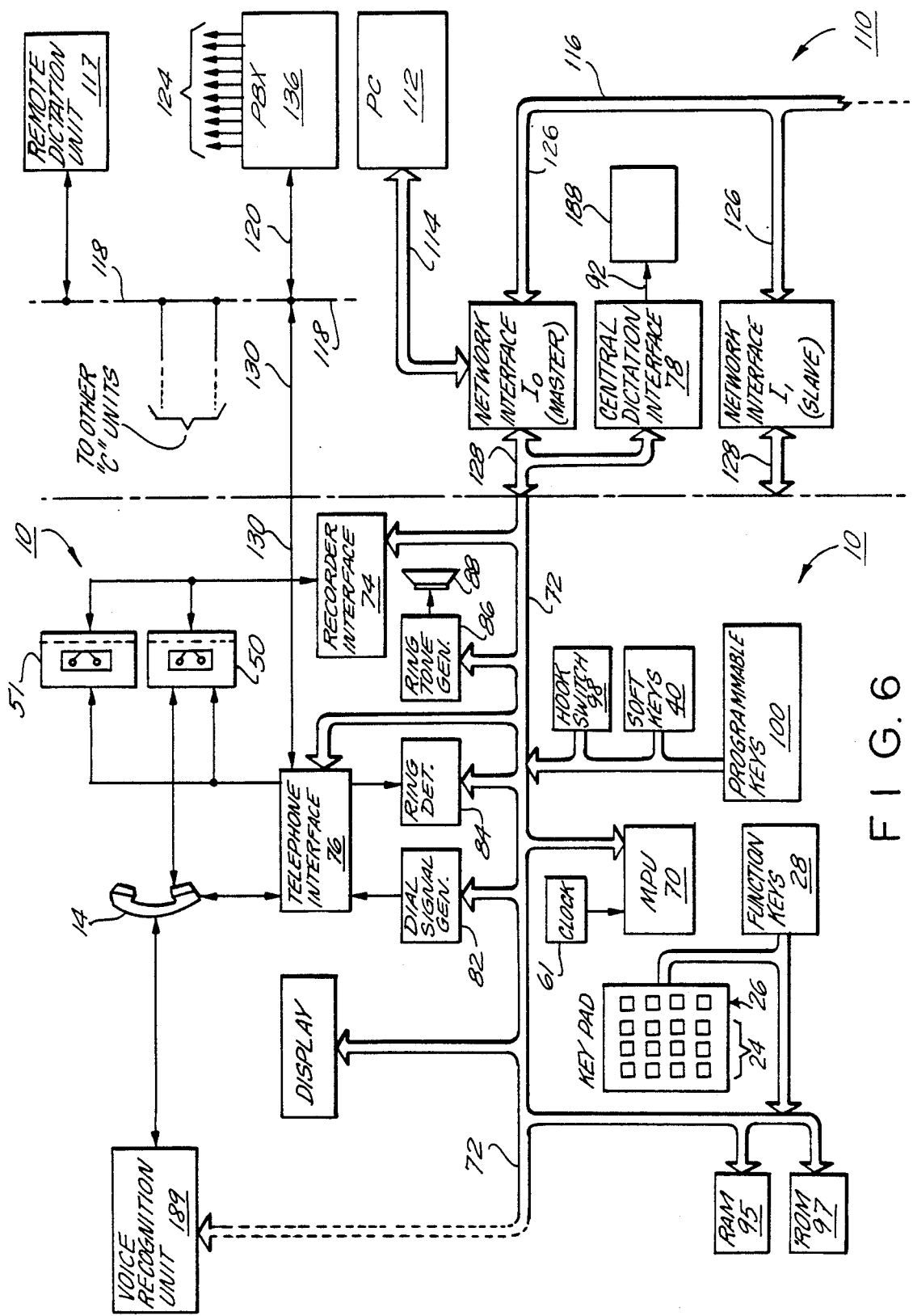
FIG. 6 is a schematic block diagram showing the internal circuitry of a transceiver unit with recorders attached as well as other units in the communication network.

As it is illustrated schematically in the lower right hand corner of FIG. 1, and in greater detail in FIG. 6, each transceiver unit 10 also can be connected to a central dictating system 188 over a private wire system. Alternatively, as shown in the center of FIG. 1, each unit 10 can be connected for dictation to a remote dictation unit 117 through the internal telephone lines 118.

If desired, a keyset 186 can be connected to each unit 10 to provide additional keys for selecting up to five telephone lines to operate from one terminal.

The telephone handset 14 of each transceiver unit 10 advantageously can be used as an input/output device for at least three different types of dictating equipment. First, it can be used with one or more desktop dictating machines such as the "A" unit 50. Secondly, it can be used with a central dictation system 188, and thirdly it can be used with a remote dictation unit 117.

If desired, a printer 148 can be connected through a line 150 to the parallel output port of the PC 112.

FIG. 2 shows a typical work station at which various components of the network 110 are located for use by a single operator. The station includes a desk 132, and a chair 134 for the operator to sit on. Optionally located at the station is one of the transceiver units 10 (preferably the so called "master" unit which is located in the upper left hand corner of FIG. 1); the computer 112, the printer 148, and the PBX unit 136. An operator at the station can operate the PBX unit 136 to connect and disconnect various outside telephone lines with telephone lines in the office, and also can operate the PC 112 and transceiver unit 110 if and when needed.

One of the functions of the computer in the network is to send messages to users of each of the transceiver units 10. It is particularly advantageous for the PBX operator to be able to send such messages to the users when their telephones are busy, thus avoiding the use of "pink slips" or other written memoranda to let the person know that he has or had another call waiting for him while he was on the telephone.

It is preferred that the master transceiver 10 be located near the PC in order that it can be used as the sole means for entry into the computer program stored in the PC so as to take advantage of the electronic lock in the transceiver terminal to prevent access to the computer program in the PC by unauthorized personnel.

As it will be explained below, the network operates on a timesharing basis so that the PC 112 can be used for word processing or office computing or the like at the same time as it is serving its function in the communications network.

It should be understood that the minimum configuration for the network 110 is the combination of one PC with one transceiver terminal 110 and an interface unit $I_0$ (see FIG. 1). However, the network is most advantageous when it is used with a substantial number of transceiver units.

Although the network 110 is shown including a PBX 136 such a unit is not essential. The use of a keyset 186 or programmable keys on the transceiver (as it will be explained below) makes it possible to select various different inside or outside telephone lines for communication, even when a PBX is not used.

Other advantageous arrangements include, for example, location of the PC 112, the printer 148 and the master transceiver unit 10 at the desk of a secretary for a small organization such as a small doctor's or lawyers' office, or small work groups within a larger business organization. The secretary can serve several personnel with with word processing, telephone reception and message handling, as well as transcription of dictation on an "A" unit or central recorder such as that sold under the trademark "THOUGHT TANK" by Dictaphone Corporation, Rye, N.Y. The PC and the printer can be used both for word processing and for the communications functions described herein.

Other attributes and functions of the network 110 and its components have been mentioned above and will be explained in detail below. The uses and combinations which can be made with other office equipment are numerous. The versatility of the equipment and methods described herein is very substantial.

VII. TRANSCEIVER UNIT

Figure 3:
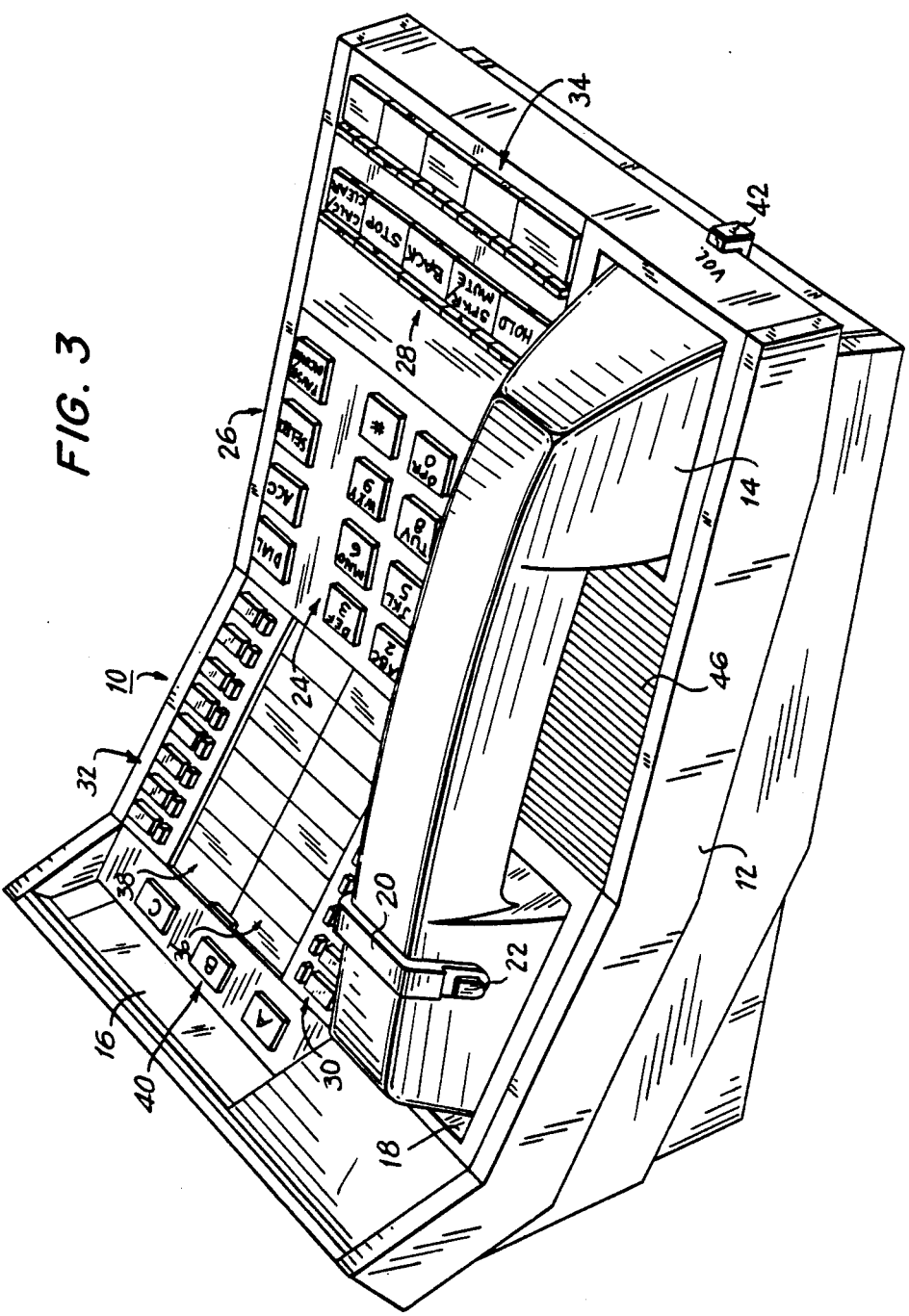
FIG. 3 is a perspective view of one of the telephone transceiver units ("C") units used in the present invention.
Figure 4:
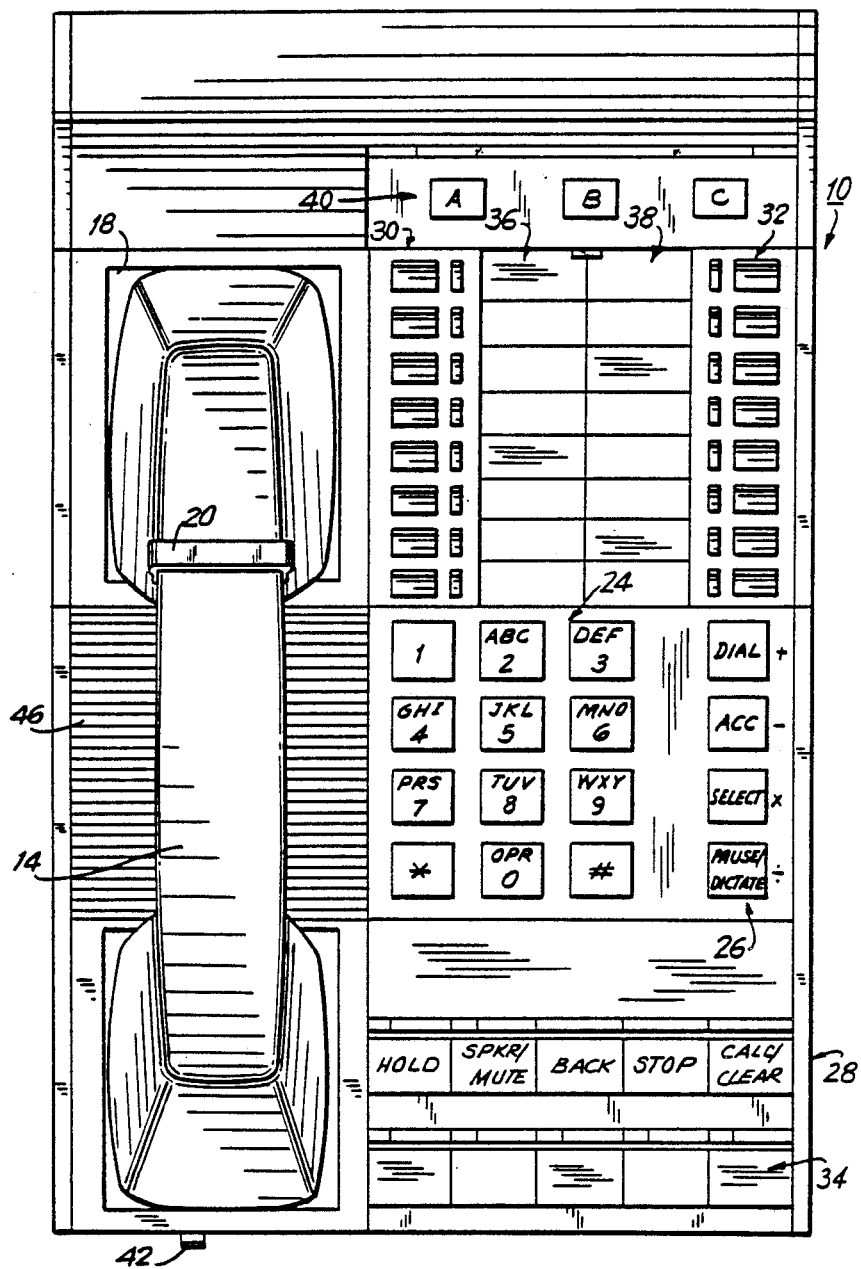
FIG. 4 is a top plan view of the transceiver unit show in FIG. 3.

FIGS. 3 and 4 of the drawings show one of the transceiver units 10 in some detail. The unit 10 is shown and described in even greater detail in co-pending U.S. patent application Ser. No. 895,017, U.S. Pat. No. 4,860,339, filed Aug. 8, 1986, the disclosure of which hereby is incorporated herein by reference. Because of the interaction between the transceivers or "C" units and the computer, it will be helpful to an understanding of the invention to describe the structure and operation of the transceiver in some detail.

Transceiver unit 10 includes a housing 12 containing electrical circuitry. As it will be described in detail below, such circuitry includes a microprocessor, such as the Hitachi Model 6303. Other circuitry is shown in block diagram form in FIG. 6.

1. Handset

Figure 5:
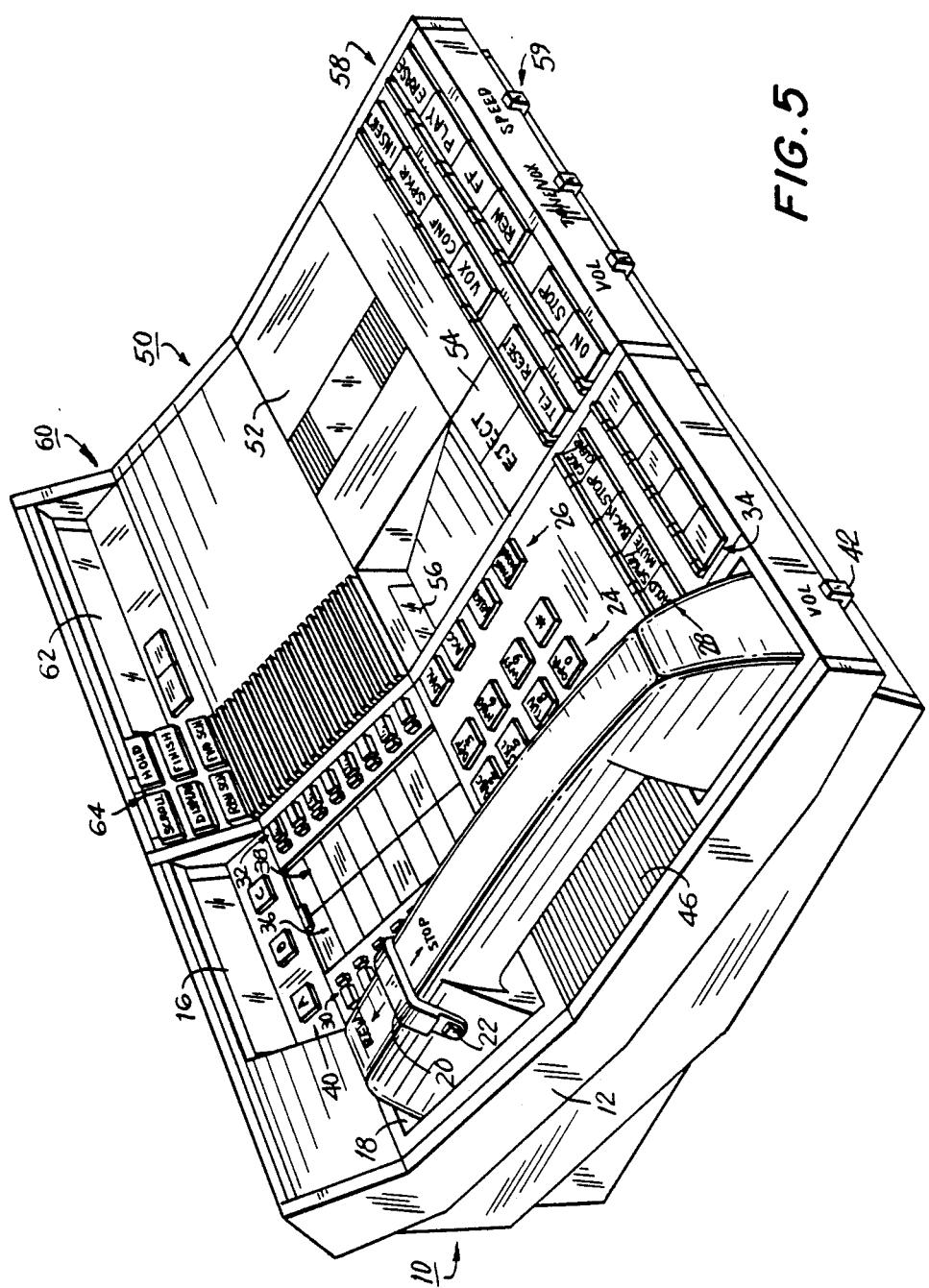
FIG. 5 is a perspective view of the transceiver unit of FIGS. 3 and 4, together with an attached sound recorder/reproducer unit ("A" unit) and display therefore ("B" unit)

Referring to FIGS. 3-5, telephone transceiver unit 10 is provided with a handset 14 having a speaker and a microphone, similar to handsets normally provided in conventional telephone instruments. Handset 14 is held in a cradle 18 which includes a hook switch (not shown) whose function is similar to the conventional hook switch normally provided in telephones. When handset 14 is in the cradle 18, the hook switch is open and the handset is in its "on-hook" condition, and when handset 14 is removed from cradle 18, the hook switch is closed and the handset is in its "off-hook" condition.

Handset 14 differs from conventional telephone handsets in that it has a dictation control yoke 20 and a dictation control button 22 for the purpose of controlling various dictation functions. Such a handset is shown, for example, in U.S. Pat. No. 3,872,263, assigned to the assignee of the present invention. Yoke 20 is spring-loaded and causes magnetic tape in a dictation machine (not shown) to rewind when moved by an operator (when it is moved to the left as seen in FIG. 1) and stops movement of the tape when moved in the opposite direction. Dictate control button 22 is depressed to start dictation.

2. Display

The display 16 of the transceiver unit comprises an LCD display capable of displaying two lines of 16 alphanumeric characters each. Each character is formed by a 5×7 dot matrix. However, other alphanumeric displays may be provided, as desired, such as LED, fluorescent, incandescent and plasma displays. Additionally, if economically acceptable, display 16 may comprise a "mini" CRT device.

3. Telephone Keypad

On the outer surface of the housing 12 of transceiver unit 10 are located various keys, including a conventional pushbutton telephone keypad 24, preset function keys 26 and 28, user-programmable keys 30, 32 and 34 and "soft" keys 40. A user of the transceiver unit 10 may initiate a telephone call by depressing appropriate ones of these pushbuttons to "dial" a desired telephone number, thus providing either "Touch Tone" signals or conventional dialing pulses.

As will be described below, keypad 24 also may be operated as a calculator, or to generate alphanumerical characters for display.

4. Preset Function Keys

Preset function keys 26 and 28 preferably are provided in separate arrays, with keys 26 being arranged in a column adjacent keypad 24 and keys 28 being arranged in a row in the vicinity of the front, or leading edge, of the unit or terminal 10.

a. "Dial" Key

Function Keys 26 include a DIAL key which, when actuated, can command an automatic dial-out operation. As noted above, the transceiver unit 10 includes automatic dialing means which, when operated, results in the display of a particular telephone number. Once a telephone number is displayed, the actuation of the DIAL key causes the tones or pulses corresponding to the displayed telephone number to be generated. Also, terminal 10 permits the automatic re-dialing of the telephone number last dialed. Actuation of the DIAL key causes the last-dialed number to be displayed on display 16 or, if known, the name of the called party is displayed. Re-actuation of the DIAL key results in the actual dialing of the displayed number.

b. "ACC" Key

Function keys 26 also include an ACC key which, for example, may be actuated to initiate the operation of a telephone accessory such as the printer 122 shown in FIG. 2 that may be connected to terminal 10.

c. "SELECT" Key

A SELECT key also is included in the function keys 26, this SELECT key being operable during a programming mode, as will be described. For example, when entering desired telephone numbers for use by the aforementioned automatic dialing means included in terminal 10, operation of the SELECT key is indicative of the end of a desired number (which may be, for example, a 2, 3, 4, 5 or 6-digit extension, a 7-digit "local" telephone number, a 10-digit long distance telephone number or a multi-digit computer-accessed telephone number. Also, as described in co-pending application Ser. No. 895,001, a directory of names and telephone numbers can be stored in terminal 10. These names and telephone numbers are retrieved and displayed on the display 16 by spelling the names on a letter-by-letter basis, each letter being selected by the actuation of a key on the keypad 24. The operation of the SELECT key indicates the entry of a desired letter.

d. DICTATE/PAUSE Key

A DICTATE/PAUSE key is provided which, when actuated, places terminal 10 in a "dictate" or "transcribe" mode for use of dictation/transcription equipment coupled to the terminal. This key also may be operated while a telephone number is being generated and stored in the automatic dialing means included in terminal 10 for the purpose of imparting a "pause" in the dial-out operation, as may sometimes be necessary. For example, in some PBX systems, a "pause" to permit dial tone detection may be necessary in order to complete a dial-out operation.

e. Calculate Keys

Function keys 26 also may operate to carry out addition, subtraction, multiplication and division functions when keypad 24 is operated as a calculator by depressing the calc/clear key. The mathematical function of each key when operating in this mode is indicated by the markings to the right of the keys in FIG. 4.

f. "HOLD" Key

The lower function keys 28 include a HOLD key which may operate to place a telephone call "on hold", as is conventional in multi-line, keyset telephone instruments.

g. SPEAKER/MUTE Key

Function keys 28 also include a SPEAKER/MUTE key which, when actuated, establishes a "speakerphone" mode of operation of terminal 10. The terminal includes a loudspeaker behind a grille 46, and a microphone (not shown) by means of which telephone communication may proceed while handset 14 is in the cradle 18.

A preferred feature of terminal 10 is the ability to enable speaker 46 to operate when handset 14 is removed from cradle 18. This mode is established when the SPEAKER/MUTE key is actuated when handset 14 is off-hook, whereupon the built-in microphone in housing 12 is disabled, or muted. During normal speakerphone operation, the actuation of the SPEAKER/MUTE key continues to enable the operation of speaker 46 while muting the operation of the built-in microphone.

h. Message Scrolling ("BACK" Key)

Function keys 28 also include a BACK key which, when actuated, cause a backward scrolling of alphanumeric messages displayed on display 16. For example, telephone directory information is included in terminal 10 for use in automatic dialing. Each directory entry may be displayed on display 16, and a user of the terminal may scroll through those entries by operating the BACK key. Also, and as it will be described below, incoming telephone messages can be recorded on a local desk-top dictating machine or "A" unit connected to the transceiver unit 10. As each incoming message is recorded, data relating to that message, such as its length, its time of recording, and its position in a sequence (e.g. the first, second, third, etc. message) is stored in the memory of the unit 10. This data may be displayed on display 16, and the user may scroll through such data by operating the BACK key.

The BACK key may be used to scroll through and display messages received from the computer 112.

i. "STOP" key

Function keys 28 also include a STOP key which, when actuated, terminates whatever routine then is being executed by the microprocessor included in terminal 10. Also included in these function keys is a CALCULATOR/CLEAR key which, when actuated, establishes a calculator mode of operation by which keypad 24 and function keys 26 operate in a manner substantially similar to that of conventional desk-top (or pocket) calculators.

j. Calc/Clear Key

The CALC/CLEAR key can be pushed to enable the use of the telephone push-buttons as a calculator. The key is lighted to indicate this mode of operation. When the calculations are complete, depression of the STOP key disables the calculation mode.

The CLEAR function of the key is enabled by the depression of the "#" key and an appearance of a "#" sign on the display 16, in order to display a message on the display. Then, pressing the CALC/CLEAR key clears the message displayed and automatically brings up the next message for display.

5. Programmable Keys

User programmable keys 30, 32 and 34 are arranged in two columns, as illustrated. For example, each column includes eight separate keys and, if desired, each key may be programmed to initiate the dialing of a predetermined telephone number when it is pressed. Other functions preferably are programmed when the transceiver unit is used in the network 110.

Adjacent keys 30 is a column of paper inserts 36 on which the user can write information identifying the particular function which has been assigned to an adjacent key. For example, the identity of a telephone number with which one of these keys is programmed may be written on its associated paper insert. As another example, if terminal 10 is used in conjunction with a plurality of telephone lines, selected ones of keys 30, 32 and 34 as selected by the user, may connect the terminal to respective ones of those telephone lines. The identities of the respective telephone lines that have been assigned to the keys 30 and 32 may be indicated by appropriate inscription on paper inserts 36, 38. Similar inserts can be used for keys 34.

Preferably, each of programmable keys 30, 32, and 34 is provided with a suitable visual indicator, such as an LED, that is selectively energized when that key is actuated. The LED may be formed as an integral part of the key or, alternatively, a separate LED may be positioned adjacent the key. It will be appreciated, although not mentioned above, that similar LED's may be associated with the preset function keys 28.

As a function that has been programmed for a particular one of programmable keys 30, 32 and 34 changes, the identification of that function can be changed by simply re-writing the associated paper insert.

Following are some examples of the functions for which the programmable keys can be programmed:

a. Central Dictation Actuation

One of the programmable keys can be programmed to connect the transceiver unit 10 to a central dictation system such as system 188 shown in FIG. 2. By operating the key so programmed, the handset 14 is connected to a centrally-located recorder/reproducer over special wiring.

b. Telephone Line Selection

Telephone line selection can be made by programming one or more of the keys 30, 32 or 34 so that terminal 10 is connected to a desired one of plural telephone lines by operation of the corresponding key.

c. Telephone Voice Message Recording

Telephone message recording is another programmable key function causing an incoming voice message that is received over a selected telephone line to be recorded on the local desk-top dictating machine ("A" unit) connected to terminal 10 (see FIG. 5);

d. Dial-Out Inhibiting

Dial-out inhibiting also can be enabled by a programmable key, whereby the use of keypad 24 or programmable keys 30, 32 and 34 which are programmed with desired telephone numbers may be inhibited, or the number of digits in telephone numbers permitted to be dialed in the unit 10 can be limited. This feature serves as a full or partial telephone lock.

e. Delayed Ringing

Delayed ringing, whereby an audible ringing sound is not generated until a preset number of telephone call ringing signals has been received.

f. Message Transmission

Each programmable key can be programmed to transmit to the PC 112 or any other "C" unit a message of up to 32 characters in length. The message is pre-stored in the PC memory by the PC operator.

One example of such a message such as: "Please call or see me ASAP—Roger" which could be delivered to any of the other "C" units to tell its user (who is talking on his telephone and thus cannot be reached by that means) to call or see the sender when he finishes his current call.

Another message might be simply "Out of the office", or "In conference—hold all calls" to inform the PC operator of the sender's whereabouts or his or her availability to answer the telephone. A message such as "cancel previous message" can be programmed in another key and sent to inform the operator that the sender has returned to the office or is now available to take calls.

Such message transmission can greatly increase the efficiency of communications in an office; it saves writing and hand-carrying notes; waiting on the telephone or re-dialing a busy line, etc.

g. Voice Recognition Mode

In the usual network, the PC operator must enter the pre-programmed messages in the PC memory. However, in accordance with an optional feature of the invention one of the programmable keys can be programmed to switch the transceiver unit into the voice recognition mode in which a voice recognition circuit, "trained" to recognize the user's voice, converts sounds spoken into the microphone of the handset 14 into signals representing words or alphanumeric characters which are displayed on the display 16 and sent to the PC 112. By this means, the user of each transceiver unit 10 can generate unique messages, suited to the needs of the moment, rather than the more limited pre-stored "standard" messages.

The voice recognition mode also can be used to input data to the PC to update directories, appointments, and other information stored in the computer.

Although a keyboard could be connected to the transceiver unit to accomplish the same functions, this is not desirable because of the cost of the keyboard, the space it would take in the user's desk, and the relative slowness of that mode of operation due to the fact that the user may not be skilled or practiced in keyboard operation. Therefore, the voice recognition mode facilitates more versatile operation without the use of the hands, except to operate the appropriate programmable key.

h. Data Transfer

The programmable keys also can be programmed to transmit data to the PC 112. For example, changes or additions in the telephone directory, contents of programmable key, or the like can be transmitted to the PC by this means.

i. Electronic Lock

One of the programmable keys can be programmed to perform a locking function to prevent unauthorized use of the unit. When this feature is used, the unit 10 is programmed to display a request for the user to identify himself with a unique identify code which has been stored by the user. Only if the user enters the correct code by use of the keypad 24 is he enable to use the unit 10. If he does not do so, the unit 10 is disabled for every function except receiving telephone calls.

j. Other Functions

The programmable keys also are capable of being programmed to initiate other functions, such as a momentary telephone line "flash", or a connection of a modem 184 (FIG. 2) or other peripheral device such as a video display terminal or printer 122 to the transceiver unit.

A full list of the functions available for the programmable keys as of this writing appears below in sections XIII 5(d) (ii) and (iii) entitled: ""C" Programmable Key Feature Codes" and "Master "C" Programmable Key Feature Codes".

6. Soft Keys

Referring now to FIGS. 3, 4 and 5, three such "soft" keys 40 are provided; they are labeled "A", "B" and "C". As it is understood by those of ordinary skill in the art, a "soft" key cooperates with a microprocessor to supply different commands and functions to that microprocessor, depending upon the particular routine which is in the process of being executed. That is, a "soft" key is not dedicated to a particular, predetermined function or command for all routines and for all operating states of the microprocessor. A given soft key, such as key A, may be operated a first time to represent a first command and then, as the microprocessor continues its routine, it may be operated a second time to represent a second, different command. Preferably, soft keys 40 are aligned with display 16 and cooperate with that display and with the microprocessor in the terminal 10 so that the operation of selected ones of these soft keys, as "prompted" by an alphanumeric message displayed on display 16, enables the microprocessor to continue with a particular routine then being executed. The manner in which soft keys 40 are operated to carry out and control the programming of programmable keys 30, 32 and 34 is explained in detail in the above-identified co-pending patent application (DIC 537) and will not be repeated here.

VIII. ADDED DESK-TOP MODULES

Before describing typical operations which may be carried out by terminal 10, reference is made to FIG. 5 which illustrates the electrical and physical interconnection between terminal 10, a record/playback module ("A" module) 50 and a display module ("B" module) 60.

1. Record/Playback Module ("A" Module)

Record/playback module 50 comprises a desk-top dictating machine and is adapted to carry out typical dictating functions by which audio messages may be recorded on and reproduced from the record medium. Typically, the record medium comprises a magnetic tape and this tape may be housed in a suitable cassette, such as a standard cassette, a minicassette, a microcassette or a picocassette of the type described in, for example, U.S. Pat. No. 4,443,827, assigned to the assignee of the present invention. Other record media may be used, such as magnetic disks or magnetic belts. Also contemplated is a solid-state storage device, such as a magnetic bubble array or semiconductor memory chips of the type conventionally used in digital storage devices. For convenience, however, it will be assumed that the record medium is a magnetic tape cassette.

Record/playback module 50 may be of the type described in co-pending application Ser. No. 895,006 the disclosure of which hereby is incorporated herein by reference.

Record/playback module 50 is adapted to record audio messages which are produced by the use of transceiver unit 10. Such audio messages may be dictated by a user via handset 14 or may be received by the terminal over one or more telephone lines. The "A" module 50 thus is capable of cooperating with transceiver unit 10 to function as a telephone answering machine, to record telephone-transmitted dictation from a remote location or to record a telephone conversation, as will be described in greater detail below.

Still referring to FIG. 5, record/playback module 50 includes a cassette compartment (not shown) protected by a door 52 which, when opened, provides access to that compartment for the loading and unloading of a magnetic tape cassette. An eject button 54 is provided by which a loaded cassette is ejected from the module, resulting in the opening of door 52 and facilitating the removal of that cassette from the cassette compartment. The "A" module 50 also is provided with a display 56 which, typically, provides an indication of the relative position of the recording tape as it is transported during record and playback modes of operation. As an example, display 56 provides a visual indication of a simple 4-digit tape count or, alternatively, a 4-digit time or date function indicator.

The record/playback module also is provided with various pushbuttons 58 which, when actuated, effect the operations generally designated on those pushbuttons. For example, an ON button is adapted to actuate module 50 to its active mode, so that dictating operations can be carried out.

2. Telephone Call Recording

A TELEPHONE button enables record/playback module to record telephone calls which are received or made by transceiver unit 10. As will be described below, when the terminal 10 is conditioned to record incoming telephone calls, the TELEPHONE button on module 50 should be actuated. A RESET button functions to reset display 56 to a preset indication, such as "0000". This RESET button also may be actuated to reset the display provided on display 62 (to be described) of display module 60. A STOP button included in pushbuttons 58 establishes a quiescent mode of operation for module 50. Typically, the STOP button is actuated to terminate a fast-forward, rewind, playback or record mode of operation.

A VOX button, when actuated while in record mode, enables record/playback module 50 to record audio messages so long as a speech signal is present. That is, recording tape is advanced in the presence of such speech signals and is stopped when those speech signals terminate. Such voice-operated recording is well known to those of ordinary skill in the art.

A CONFERENCE button establishes a "conference" mode of recording whereby the amplification of audio signals recorded on the magnetic tape is increased. Preferably, the CONFERENCE button is used in conjunction with a conference microphone (not shown) which, when connected to module 50, permits the recording of a conference among individuals.

A SPEAKER button enables the activation of an internal speaker (not shown) provided in module 50. When audio messages recorded on the magnetic tape are played back, such messages are reproduced by that internal speaker. Usually, when handset 14 is used to record dictation, the internal speaker of module 50 is not used.

An INSERT button is adapted, when actuated, to establish an "insert" mode of operation whereby audio information is recorded onto a separate channel, or track of the magnetic tape. This feature enables a user to dictate additional material without editing the message which has already been recorded.

A REWIND button, when actuated, rewinds the magnetic tape at a relatively high speed until, for example, the beginning of the tape is reached or the STOP button is actuated. Conversely, a FAST FORWARD button serves to advance the magnetic tape at a relatively high speed. A PLAY button, when actuated, advances the magnetic tape at its normal speed, whereby audio messages recorded thereon are played back. Such played back messages may be reproduced by the internal speaker of record/playback module 50. An ERASE button is adapted to be actuated concurrently with either the REWIND button or the FAST FORWARD button so as to establish an "erase" mode. An electromagnetic erase circuit (not shown) is triggered to erase audio information which may have been recorded previously on the magnetic tape.

3. Display Module ("B" Module)

Display module 60 (the "B" module) is described in greater detail in co-pending application 894,993 and also in co-pending application Ser. No. 895,011, the disclosures of which are incorporated herein by reference. This display module includes a display 62 which provides both graphical and digital displays. As described in the aforementioned co-pending applications, the graphical displays provide visual information regarding the type and length of each recorded message and also provide displays indicative of the locations of recorded instructions and "special" notes. In addition, a cursor display is provided to indicate the present position of the magnetic tape as it is transported during various dictate operations. The digital display indicates the total length of dictation in minutes and tenths of minutes as such dictation is recorded. Other information also is provided by the digital display during transcribe operations, such additional displays forming no part of the present invention.

Display module 60 also is provided with display control buttons 64. The functions carried out by the individual control buttons are represented by the legends provided on each such button. The SCROLL button, when actuated, permits a user to "scroll" through the various types of messages that may be recorded, such as letters, "priority" letters, instructions or "special" notes. One of these types of messages may be selected for rapid access, as described more particularly in the aforementioned co-pending applications.

A DISPLAY control button may be selectively actuated to scan a dictated magnetic tape for the purpose of detecting information recorded thereon representing the various types, lengths and locations of messages. This information is used to control display 62 to provide the aforementioned graphical display which is most helpful in preparing for transcription of dictated information. A REWIND SEARCH control button, when actuated, causes the magnetic tape to rewind in order to access a selected type of message. Message selection is made by the operation of the SCROLL button, as mentioned above.

Display control buttons 64 also include a HOLD button which, essentially, "freezes" the information displayed on display 62 such that if a new magnetic tape is loaded into record/playback module 50, messages may be dictated on that new tape without disturbing the display associated with the previous tape. This permits dictation to be resumed on the previous tape without any confusion or ambiguity in the display.

A FINISH control button functions to record a "summary" block of data representing the types, locations and lengths of all messages recorded on a particular magnetic tape. This data, when read prior to transcription, presets display 62 to indicate the types and locations of messages which need transcription. Operation of the FINISH button during a transcribe mode serves to extinguish the display of those messages which have been transcribed.

A FORWARD SEARCH control button serves to advance the magnetic tape at a rapid rate to access a selected type of message. It is appreciated that this control button operates in a manner similar to that of the REWIND SEARCH control button.

IX. TRANSCEIVER UNIT ("C" UNIT) CIRCUITRY

1. General Description

FIG. 6 is a block diagram of some of the relevant electrical circuitry of the transceiver unit 10 and the network 110. The circuitry of the transceiver 10 is to the left of line 101 in FIG. 6, and the circuitry of the network 110 other than that in the transceiver unit is shown to the right of line 101.

As it is shown in FIG. 6, the circuitry of the transceiver unit 10 includes a microprocessor 70, a recorder interface 74, a telephone interface 76, a central dictation interface 78, and a digital network interface 80. Also illustrated in FIG. 4 are the pushbutton keypad 24 which, as shown, includes preset function keys 26; function keys 28; soft keys 40 and programmable keys 30, 32 and 34, referred to generally as programmable keys 100. Also shown in FIG. 4 is hook switch 98 which, as mentioned above, normally is opened when handset 14 is disposed in cradle 18 and is closed when the handset is removed from the cradle.

2. Microprocessor

As diagrammatically represented, microprocessor 70, which may be a conventional microprocessor, such as Hitachi Model 6303, is coupled to keypad 24, function keys 28, soft keys 40, hook switch 98 and programmable keys 100. The actuation of any one of the keys or switches connected to the microprocessor is detected and, in the interest of simplification, conventional interface circuitry, such as switch detectors, is omitted from the illustration. Random access memory ("RAM") 95 and read-only memory ("ROM") 97 are provided; the RAM memory for data and variable program storage, and the ROM memory for fixed program storage.

A clock signal source 61 is provided to provide timing signals for the unit 10, and for the time and date function of the computer 112, as it will be described below. The source 61 has battery back-up so that it will not lose power or time during temporary power outages in the "house" current.

Microprocessor 70 is coupled by way of a bus 72 to interfaces 74, 76 and 78, and the microprocessor also is coupled by this bus to display 16. It will be appreciated that display 16 includes not only the visual display means shown in FIGS. 3–5 but also the usual decoder, display-driver circuitry and storage devices normally provided in microprocessor-driven displays.

3. Telephone Connections

Bus 72 also interconnects microprocessor 70 with a dial-out generator 82, a ringing signal detector 84 and a ringing tone generator 86. Generator 82 and detector 84 are coupled to telephone interface 76 which, in turn, is coupled to the internal telephone network 118 through the line 130, and to the PBX unit 136 for selective connection to one of the outside telephone lines 124.

Incoming ringing signals which are received over the telephone network and supplied to telephone interface 76 are, in turn, applied to ringing signal detector 84. As it will be described, the ringing signal detector serves to detect the presence of an incoming ringing signal and to supply microprocessor 70 with suitable indications thereof. The ringing signal detector also is coupled through bus 72 to ringing tone generator 86 which, in turn, triggers an audible tone generator 88 to generate a suitable audible tone in response to each incoming ringing signal. Ringing tone generator 86 is controlled by microprocessor 70 and, as will be described, may supply audible tone generator 88 with different audio signals for the purpose of generating characteristic tones whose distinctiveness may be varied, as desired. For example, ringing tone generator 86 may be controlled to produce a bell-type sound, a buzzer-type sound or an electronic tone of different frequency, pitch, or duration.

Telephone interface 76 also is coupled to handset 14 for the purpose of providing a communication channel between the handset and the telephone network. Still further, the telephone interface is coupled to record/playback modules 50 and 51 to permit incoming messages received over the telephone network to be recorded on either of these modules, under the control of microprocessor 70. A so-called announcement message may be recorded on one or both of record/playback modules 50 and 51, this announcement message being of the type normally used in telephone answering machines. Recorder/playback modules 50 and 51 are coupled to recorder interface 74 which, in turn, is coupled to microprocessor 70, such that, under microprocessor control, the announcement message may be played back and transmitted over the telephone network via telephone interface 76 in response to a detected incoming telephone call.

4. Central and Remote Dictation Connections

Central dictation interface 78 is coupled to microprocessor 70 through the buses 72 and 128 and is controlled by the microprocessor to establish communication with a centrally-located dictation recorder 188 via a private wire network 92. Handset 14 is coupled to the central dictation interface 78 through buses 72 and 128 for the purpose of controlling the central recorder to carry out a dictate operation.

The transceiver unit 10 also can be connected through telephone lines 130 and 118 to the remote dictation unit 117 (also see FIG. 2) to control remote dictation over the telephone lines rather than over the private wire network 92 used with the central dictation system.

5. "D" Network Connections

"D" network interface $I_0$ is coupled to microprocessor 70 via the bus 72, and to the PC 112 through lines 128, 126 and 114. Also see FIGS. 2 and 7 for additional details.

The electrical and physical connection of the two "A" modules 50 and 51 is described in co-pending patent application Ser. Nos. 895,006 and 894,583 whose disclosures hereby are incorporated herein by reference.

6. Voice Recognition Unit

An optional voice recognition unit 189 is shown in FIG. 6. Upon the operation of a pre-programmed programmable key, the unit 189 is connected to receive voice signals from the microphone of the handset 14 and convert them into digital signals representing words and numerals. Those signals are stored in RAM memory 95 until the message is complete, and displayed on the display 16, all under the control of the microprocessor 70. When the message is complete and correct, the depression of the key again transmits the message to the "D" console for storage on disc, or to another "C" unit, and returns the "C" unit to normal operation. Other data can be generated and transmitted in the same way.

The voice recognition unit 189 preferably is one of several microcircuit chips available today for voice recognition. Such circuits usually have a limited vocabulary of words or sound which they will recognize. A vocabulary of 100 to 250 words and characters usually will be sufficient to enable the composition of most messages useful in office communications. Of course, greater vocabularies are even more desirable, but may cost more than the user desires to pay.

Usually, the recognition unit 189 requires "training-"—that is, the user must speak each word one or more times during a "training" mode of operation so that the unit will recognize the work when it is spoken later.

If preferred, the recognition unit 189 may be located in the PC unit 112 where it has access to the much greater memory of the PC and its storage discs. One unit 189 may be provided for each "C" unit, or a single "multi-user" unit capable of recognizing several voices can be stored there for the same purpose.

The use of the recognition unit increases the flexibility of the communications network without requiring the user to be able to type efficiently, or even to use his hands to compose a message, and without adding the expense and space requirements of a keyboard.

X. TRANSCEIVER UNIT ("C" UNIT) OPERATION

The manner in which transceiver unit 10 is operated now will be described. It is assumed that various ones of programmable keys 100 have been suitably programmed to initiate respective operating functions. The manner in which these keys are programmed are described in greater detail in co-pending application Ser. No. 897,017 and will not be described here.

1. Dialing a Telephone Number

Let it be assumed that the user wishes to make a telephone call. In one mode, handset 14 is removed from cradle 18, thus closing hook switch 98. Microprocessor 70 responds to this off-hook condition to control telephone interface 76, whereby a connection is made to telephone network 90. The microprocessor thereafter responds to the operation of keypad 24 and controls dial-out generator 82 to supply suitable dialing signals to the telephone network. Thus, a telephone call is made. As each pushbutton of keypad 24 is depressed, the number represented by that pushbutton is displayed on display 16. Hence, not only is the telephone number dialed but it also is displayed.

2. Automatic Re-Dialing

In the event that the called telephone number is busy, as sensed by the detection of distinctive busy tone on the telephone line, a re-dial operation is carried out at pre-set intervals. The number of re-dial attempts which has been established previously is displayed on display 16. The user may change the number of re-dial attempts by operating keypad 24. As re-dialing takes place, an indication that it is taking place is provided by display 16 under the control of microprocessor 70.

Once the dialed telephone number is answered, a normal telephone conversation may ensue via handset 14. Alternatively, the user may operate the speaker/mute key, whereby terminal 10 will operate in the aforementioned speakerphone mode of operation.

3. Call Recording

While carrying on a telephone conversation, the user may record that conversation on, for example, record/playback "A" module 50 by depressing a preselected one of the programmable keys 100. In the event that telephone interface 76 is coupled to a plurality of telephone lines, this recording operation will be carried out if the telephone call was made over the telephone line which previously had been selected for coupling to the record/playback module. It will be appreciated that the operation of the appropriate one of programmable keys 100 is sensed by microprocessor 70 which, in turn, turns on the record/playback module by way of recorder interface 74.

4. Automatic Dialing

Let it be assumed that various ones of programmable keys 100 have been assigned to desired telephone numbers, such that the assigned number is dialed automatically upon the actuation of that programmable key. If handset 14 is off-hook, the actuation of a programmable key to which a telephone number has been assigned (sometimes referred to herein as the "stored number key") is detected by microprocessor 70, resulting in the display of the assigned telephone number. If this is the telephone number which the user wishes to dial, the DIAL key is pressed, and a dial-out operation is carried out in the same manner as if keypad 24 had been operated. Of course, if the user wishes to dial a number different from the one displayed, he need merely actuate another one of the stored number keys.

5. Stored Directory Display

Assuming handset 14 is in the cradle 18, thus establishing the on-hook condition, a stored directory of telephone numbers may be displayed on display 16 by actuating any one of keys "2" through "9" of keypad 24. For example, if key "2" is depressed, an individual whose last name begins with the letter "A", together with his or her telephone number is displayed. In one embodiment of the invention, the display includes the person's mailing address, thus giving a convenient source for that information.

Successive actuations of the "2" key (which also bears letters "A", "B" and "C") permit the user to scroll through the stored directory and observe, one-by-one, in alphabetical order, the telephone numbers, etc., of individuals whose last name begins with the letter "A". Then when the "A" list has been exhausted, repeated actuation of the "2" key displays telephone numbers of individuals whose last name begins with the letter "B". Then when the "B" list has been exhausted, the telephone numbers of individuals whose last name begins with the letter "C" will appear. Similar retrieval of names beginning with other letters of the alphabet is done by depressing keys "3" through "9". Once a desired name and telephone number are displayed, that telephone number may be dialed merely upon the actuation of the DIAL key.

6. Dictation Mode

Normally, when handset 14 is removed from cradle 18 to establish the off-hook condition, transceiver unit 10 is conditioned to operate as a telephone instrument. However, if the PAUSE/DICTATE key of preset function keys 26 is actuated, microprocessor 70 controls recorder interface 74 to activate the record/playback "A" module 50, if one is attached to the "C" unit. This module now is enabled to record dictation that may be communicated thereto from handset 14. It will be appreciated that the typical dictate, playback, fast forward and stop functions normally utilized in dictation are generated by the actuation of dictate control yoke 20 and dictate control button 22 of handset 14. The magnetic tape included in record/playback module 50 thus is driven and audio messages are recorded on it. In addition, letter and instruction cue signals, described in, for example, co-pending application (DIC-526) may be generated and recorded by operating selected control keys included in the soft keys 40. Display 16 provides a visual indication of the functions that may be carried out by each of soft keys A, B and C.

7. Twin "A" Unit Operation

In an embodiment wherein two record/playback modules 50 and 51 are interconnected in, for example, side-by-side relation, one or the other of these modules may be turned ON to have dictation recorded thereon. In accordance with a preferred protocol of the system in which the present invention is used, the left-most module is adapted to exhibit priority to have dictation recorded on it.

8. Operating a Remote Dictation Machine Over Telephone Lines

As it has been stated above, in addition to being able to record dictation on record/playback module 50, terminal 10 may be operated to record dictation on a remotely located dictating machine 117 (FIGS. 2 and 6) via telephone lines 118, etc. An example of telephone-linked dictation is described in co-pending application Ser. No. 495,756. By using terminal 10 of the present invention, the telephone number of the remote station at which dictation equipment is located may be dialed, either by operating keypad 24, or by operating an appropriate one of the stored number keys included in programmable keys 100, or by accessing that telephone number from the stored telephone number directory included in terminal 10, and then dictation operations may ensue. Alternatively, if footpedal switches of the type normally used to carry out a transcription operation are connected to the terminal 10, those switches may be operated to effect a transcription operation. In this manner, a transcription machine located at the called remote station is controlled to enable a user at terminal 10 to transcribe information that has been dictated onto that device.

9. Central Dictation

Referring again to FIG. 6, in response to the actuation of a pre-programmed programmable key 100, the microprocessor 70 controls central dictation interface 78 to effect the operable connection between terminal 10 and the central recorder 188. Dictation then may proceed by operating dictate control yoke 20 and dictate control button 22 of handset 14, in a manner similar to that described in U.S. Pat. No. 3,872,263. Optionally, if handset 14 is disposed in cradle 18, a transcription operation may be carried out in cooperation with the central recorder; and display 16 provides a visual indication of this "transcribe" condition. However, if the off-hook condition is established at terminal 10, a dictate operation may be carried out with the central recorder; and display 16 provides a visual indication of this "dictate" mode.

10. Telephone Message Recording

Let it be assumed that one of programmable keys 100 has been programmed to effect a telephone message recording mode of operation by which incoming audio messages that are received over the telephone network 90 are recorded on, for example, record/playback "A" module 50. Let it be further assumed that the telephone network includes a plurality of telephone lines, any one of which may be selected for coupling incoming audio messages to the record/playback module. As will be described below, the user may select the appropriate line (or lines) for coupling to the record/playback module. Then, when an incoming telephone call is received on the selected line, the presence of that call is detected by ringing signal detector 84, and microprocessor 70 controls telephone interface 76 to couple that line to module 50. Additionally, the microprocessor controls recorder interface 74 to activate this record/playback module, whereupon the incoming audio message is recorded.

11. Automatic Telephone Answering Machine Operation

In one mode of operation, record/playback module 50 operates as an automatic telephone answering machine. In this regard, the user first records an announcement message on the magnetic tape of the record/playback module such that, in response to a detected incoming telephone call, the module is turned on to play back the announcement message and thereafter the operating mode of this module is changed over to enable it to record the expected incoming audio message. One example of the use of a dictating machine as a telephone answering machine is described in U.S. Pat. No. 4,309,571.

Alternatively, if record/playback modules 50 and 51 both are provided, one of these modules may have the aforementioned announcement message recorded on the magnetic tape therein and the other module may be used to record incoming audio messages. Alternatively, digital voice recording techniques can be used to record the audio messages. Then, in response to an incoming telephone call, microprocessor 70 controls recorder interface 74 to turn on the module having the announcement message and then, after that message is played back, the recorder interface turns on the other module to permit the expected incoming audio message to be recorded on it.

12. Recording Dictation From Remote Telephones

In a similar mode of operation, terminal 10 may be used in conjunction with record/playback module 50 to record dictation that may be transmitted via the telephone network by the user of this terminal. Optionally, the user may wish to record an announcement message on the magnetic tape included in module 50 to remind him of the fact that, if he telephones this terminal on a previously selected telephone line, he may initiate a dictation operation. Such an announcement message is optional and, if desired, it may be omitted by the user.

13. Combined Remote Dictation Recording and Telephone Answering

By using two record/playback modules 50 and 51, programmable keys 100 may be operated in conjunction with keypad 24 and control keys 40 to select one telephone line (or one group of telephone lines) for coupling to, for example, module 50 and another telephone line (or another group of telephone lines) for coupling to module 51. One of these modules then may be configured as a telephone answering machine, as mentioned above, and the other module may be configured to record remote dictation transmitted over telephone network in the manner mentioned above. Microprocessor 70 cooperates with telephone interface 76, ringing signal detector 84 and recorder interface 74 to turn on the appropriate one of modules 50 and 51 to record incoming messages, depending upon the particular telephone line on which an incoming ringing signal is detected.

14. Display of Audio Message Data

Advantageously, upon the recording of an incoming message, be it during a telephone answering mode of operation or a remote dictation mode of operation, microprocessor 70 controls display 16 to provide a visual indication of the receipt and recording of such messages. Each message is numbered in sequence, and its time of recording and length are stored. The user of terminal 10 may retrieve anyone or all of such recorded messages. For example, by operating keypad 24, such as by depressing the "*" pushbutton, microprocessor 70 controls display 16 to display the number of the latest message which was received, its time of recording and its length. A prompt message also is displayed; and the user then may operate a designated one of control keys 40 to retrieve that message, which then is played back. If the user does not wish to listen to the displayed message, he need merely re-depress the * pushbutton, whereupon display 16 displays the first of the received messages, its time of recording and its length. The foregoing operation then may be repeated either to scroll forward through all of the received messages or to select desired ones for playback.

15. Message From "D" Console

Referring now to FIGS. 1 and 2, relatively short text messages may be generated at the PC 112 by means of operation of the keyboard 140. This text message then is transmitted via lines 114, 116 and an interface unit I in conventional digital format. Such text message may be directed to a particular one of the "C" units 10, or to all of them. Upon receipt of this message by the interface I, signals are transmitted to microprocessor 70 and the microprocessor controls display 16 to provide an audible and a visible indication of the receipt of this text message. Specifically, a longer or shorter "beep" is sounded by the speaker 88 (FIG. 6), and a stationary or flashing pound sign "#" appears on the display. The long beep and a flashing "#" sign indicates a high priority or urgent message, and the short beep and steady "#" sign indicates an ordinary message. The text message is stored in RAM memory 95 (FIG. 6) and may be accessed and displayed on display 16 when the user presses the # pushbutton. The memory 95 permits plural text messages to be stored, and the user may scroll through those messages by successive depressions of the # pushbutton.

16. Automatic Dialing of Telephone Number in Message

If the text message includes a telephone number, (for example, "Call Mr. Smith (703) 555-2801"), that telephone number will be displayed on display 16 when the stored message is retrieved. If the user then depresses the DIAL pushbutton, the telephone number which is displayed is dialed automatically in the manner discussed above.

17. Message From "C" Unit

As it has been noted above, certain pre-stored message can be transmitted to the "D" console 112 and/or to one or more selected "C" units. By inputting a specific feature code, the "C" unit or "D" unit and pressing the desired one of the programmable keys 100, the message will be sent, with the aid of microprocessor 70, to the selected receiver.

Unique messages developed by the voice recognition unit 189 in response to a vocal message will be transmitted in the same manner.

XI. NETWORK INTERFACE UNIT

Figure 7:
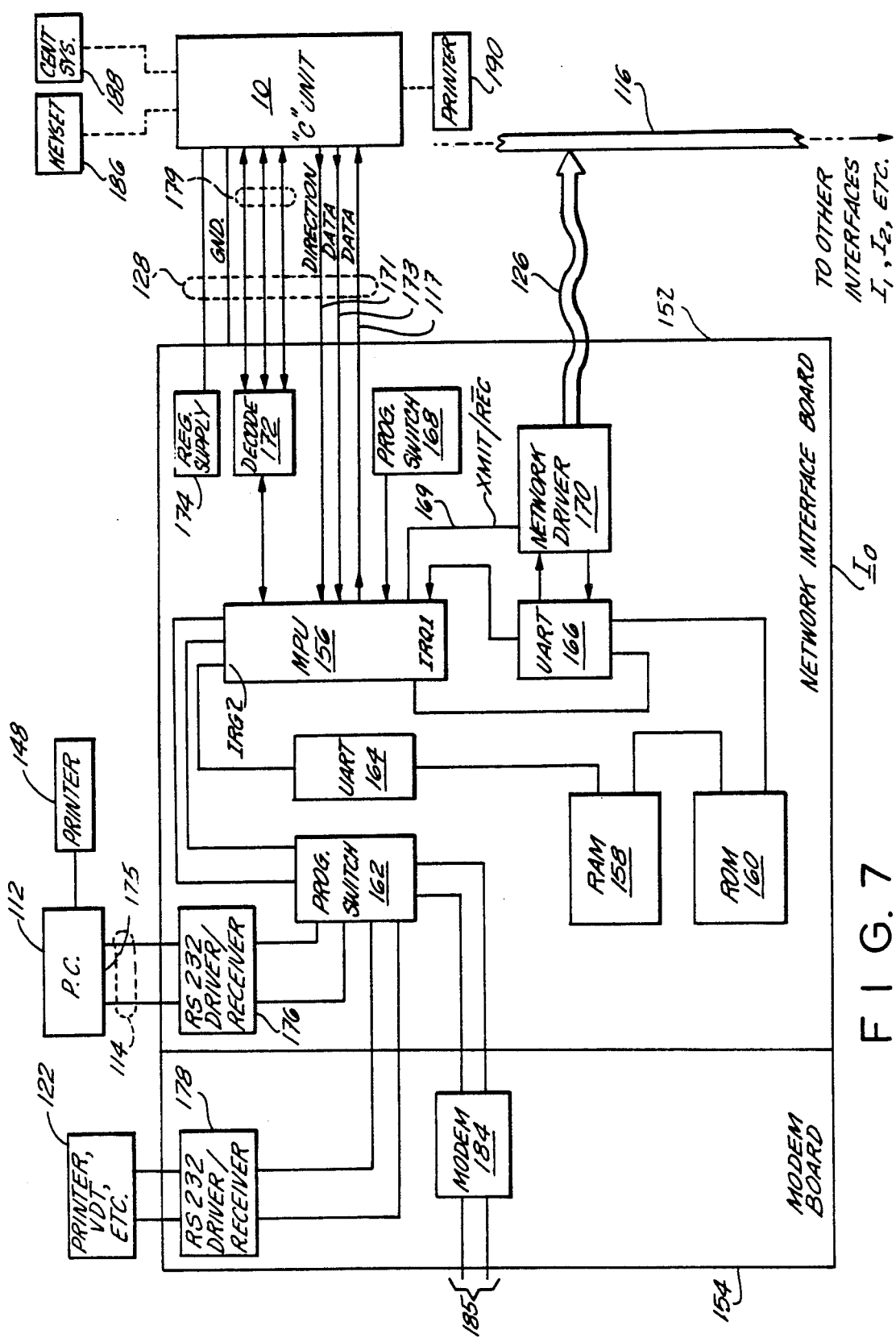
FIG. 7 is a schematic block diagram of a network interface unit connected in the network.

FIG. 7 is a block diagram illustrating the network interface circuitry and how it interconnects with other parts of the network.

1. Circuit

The interface circuitry is shown in FIG. 7 mounted on a network interface printed circuit card 152. Preferably the card 152 is mounted in a small housing (not shown). The network interface board 152 is shown connected to a modem board 154. The latter board is optional. The board 152 shown constitutes the master interface unit $I_0$.

The network interface board 152 includes an RS 232 driver/receiver circuit 176 which is connected to communicate with the RS 232 port 175 of the PC 112. The output of the driver/receiver 176 is delivered to a programmable switch 162 which is connected to a microprocessor circuit 156, a "UART" device 164 and, if the modem board is connected, a modem unit 184 and a RS 232 driver/receiver circuit 178 on the modem board. The unit 178 is connected to external leads which lead to a printer or a video display terminal, or other peripheral device indicated at 122 which can be located near each of the transceiver units 10. The modem 184 is provided to make connections over lines 185 to external telephone lines for digital data transmission, if this function is required.

The microprocessor 156 advantageously is the same type of device as the microprocessor 70 used in each transceiver unit 10.

Also provided on the network interface board 152 are a random access memory ("RAM") 158, a read only memory ("ROM") 160, another "UART" 166, and a network driver circuit 170.

Also provided are a regulated power supply 174, a decoding circuit 172 and a programmable switch 168. The line 128 shown in FIG. 1 connecting each "C" unit 10 to the interface unit actually is a cable indicated at 128 in the upper right hand portion of FIG. 7. Included in the cable 128 are conductors 171, 173 and 177. The signal on conductor 171 determines the direction of data flow; that is, it determines whether data is being sent to or received from a "C" unit. Line 73 is a conductor reserved for transmitting data from the "C" unit to the interface board, and line 177 is for transmitting data from the interface board to the "C" unit.

Lines 179, forming a part of the cable 128, are decode lines connected to the decoder 172 and the interface board for each "C" unit. Each "C" unit interface board sends out a unique identification code which is detected by the decode circuit which then delivers a corresponding signal to the microprocessor unit 156 to identify the "C" unit.

Communications between the PC and the network interface board 152 are accomplished through the port 175.

The programmable switch 162 is controlled by signals from the C unit to connect its various input and output lines in different combinations, as needed. The settings of the switch are controlled by signals from the PC 112. Various different conditions of the switch produce various different switching combinations. For example, the output from the driver/receiver circuit 176 can be connected directly to the "UART" 164. Also, either the modem 184 or the driver/receiver 178 on the modem board can be connected to the "UART" 164 instead.

Alternatively, the programmable switch 162 can be controlled to connect driver/receiver 176 directly with driver/receiver 178 on the modem board, or driver/receiver 176 can be connected directly to the modem 184. Also, driver/receiver 178 can be connected directly the modem 184 by means of the switch 162.

The "UART" 164 ("UART" is an acronym for Universal Asynchronous Receiver/Transmitter) is used to convert serial data to parallel data.

The RAM 158 is used to store data, and the ROM 160 is used to store the program for the microprocessor 156.

The "UART" 166 operates to convert parallel data from the microprocessor into serial form to send polling signals through the network driver 170 through the cable 126 to the bus 116 and to other interface boards of other terminals. These polling signals are used to inquire of each "C" unit, in sequence, whether it has any data to deliver. If it does, data is delivered from the "C" unit over a data line corresponding to line 173 in FIG. 7 to its own network interface board, where it is stored in RAM until it can be transmitted to the master interface board shown in FIG. 7.

When the time arrives to transmit the data from the slave interface board to the master interface board 152, the network driver circuit is converted so as to receive data over the line 126 from the other interface boards. The "UART" 166 converts this data into parallel form and sends it to the microprocessor 156 which stores it in RAM until it can be delivered to the PC 112. The lines 169 from the network driver 170 to the microprocessor 156 indicates whether the interface is in the transmit or receive mode.

In accordance with another advantageous feature of the present invention, each of the network interface boards used in a given network 110 is identical to the others when manufactured. When installed in a network, however, each board is programmed so that it will be identified by a unique code number, as well as to adapt the board to being either a "master" unit or a "slave" unit for the purposes of data transmission. This is highly advantageous in that it allows the boards to be manufactured in significant quantities by mass-production techniques, since each board is identical when manufactured. Programming is done by use of the programmable switch 168, which preferably can be programmed simply by the selective connection of one or more jumper wires upon installation of the network.

The "C" unit nearest the computer 112 (in the upper left hand corner of FIG. 1 e.g.) is made the master unit and is assigned identification code number "0". Each successive "C" unit is assigned a code number of 1 to 15, in a network having 16 C units. The conversion of the master interface board makes it into a network controller which controls the polling of the slave units and the transmission of data to and from the PC.

2. Programming

The program which is stored in the interface boards and used in controlling the network is a modification of the IBM Binary Synchronous Communication ("Bi-Sync") protocol. The specific program steps used will not be described because it is believed that the suitable programming will be readily evident and can be written by one of ordinary skill in the art without undue experimentation, with the knowledge of the interface circuitry, the foregoing description and the description to follow.

One modification of the standard Bi-Sync protocol is that the interface board selected as the network controller board always is the master and each of the other units in the network always is the slave, unless the switches 168 are changed because the system is altered. Since the switch 168 preferably is set by the use of jumper wires, it is not anticipated that such a change will be made in the ordinary course of events.

The sequence of steps is such that the PC 112 can send a message to any "C" unit in the network between two sequential polling transactions. In other words, the sequence of events is as follows:

1. A polling message is sent to the interface $I_1$ of unit $C_1$ (the first unit subsequent to the master unit; e.g., the middle unit on the left in FIG. 1) from the master interface $I_0$;

2. A response, if there is any, is sent from unit $C_1$ back to the master board and the PC. This response can be up to one "data packet" or "frame" in length. The data packet or frame will be described in detail below;

3. The PC sends a data packet or frame to any "C" unit (if any frame is waiting to be sent);

4. A polling message is sent to unit $C_2$;

5. A response is sent from unit $C_2$ (up to one frame long);

6. The PC sends a data packet or frame to any "C" unit (if frame is waiting to be sent);

7. etc.

The foregoing process is repeated over and over again very rapidly, the master interface repeatedly asking each "C" unit for data, receiving and transmitting it to the computer, and transmitting data from the PC to any "C" unit.

The data transmission rates need not be extraordinarily high in order to enable the system to work at a satisfactorily high speed. For example, transmission of data over the line 126 is at 19.2K baud. Data transmitted over cable 128 is at 9307 baud, and data transmitted to and from the PC at port 175 is at 9.6K baud. The total length of bus 116 can be up to 4,000 feet in any given system, and the line 126 can be up to 50 feet long.

Due to the relatively low baud rate over line 126, it is made advantageously, of a twisted pair of ordinary conductors, rather than as an expensive coaxial cable. The bus 116 can have the same simple and inexpensive construction. This is highly advantageous in keeping costs low. The low baud rate also keeps the cost of the system components such as the network driver 170 at a level much lower than it would be at significantly higher baud rates.

FIG. 9 of the drawings shows the format of each "data packet" or "frame" 208 of text transmitted between the "C" units and the computer 112. Each data packet or frame includes a header portion 210, a data portion 212, and a trailer portion 214. In the present embodiment, The maximum amount of data which can be included in any packet or frame 208 is 51 bytes. The total length of the packet or frame is a maximum of 64 bytes.

The header includes the following components:
1. SYNCBYTE
2. SOH (Start of Header)
3. DESTINATION ADDRESS
4. RETURN ADDRESS
5. ACKBYTE (Acknowldge Byte)
6. 1 ascii letter
7. MESSAGE TYPE
8. 1 ascii number
9. MESSAGE NUMBER
10. XSTS (Start of Text)

The trailer of each data packet or frame 208 includes the following components:
1. XETX or XETB (End of Text or Endo of Text Block)
2. ERROR CHECK (2 bytes)
3. PAD (Filler)

The meaning of the foregoing symbols are well known in the bi-sync protocol and will not be discussed in detail here.

Data is exchanged between the network controller and the PC in a full duplex mode; that is data can be communicated both into and out of the PC at the same time.

XII. COMPUTER FLOW CHARTS

Figure 8:
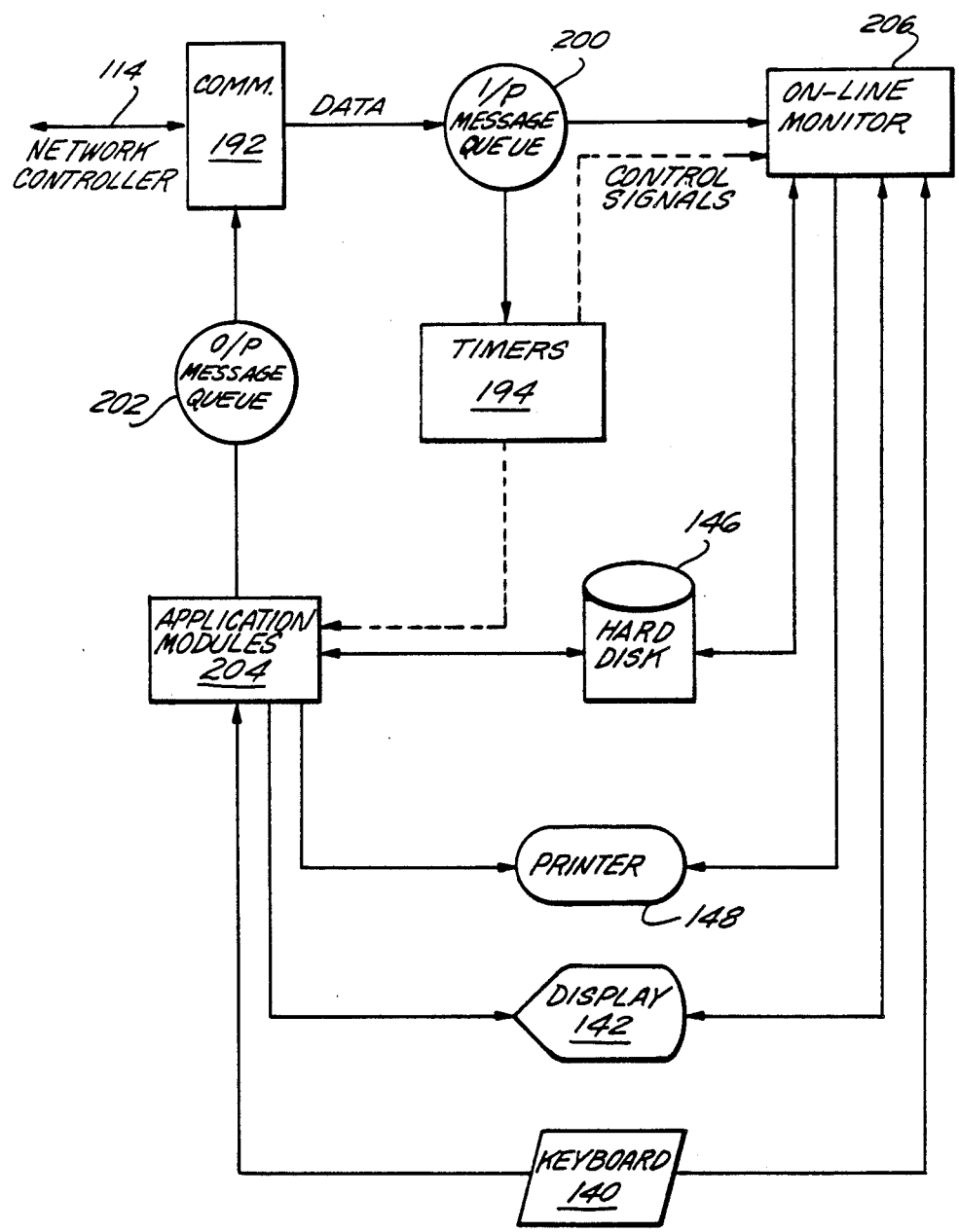
FIG. 8 is schematic data flow diagram illustrating the flow of data in the use of the PC of the present invention.

The processing and handling of data in the personal computer 112 is illustrated by the data flow diagram of FIG. 8, and the detailed flow charts of FIGS. 10-26.

1. Data Flow Diagram

FIG. 8 is a diagram showing the flow of data in the computer in a very general form. Data enters and leaves via line 114 which communicates with the network controller shown in FIG. 7. Communication program modules are represented in rectangular block 192, application program modules are indicated by rectangular block 204, and on-line monitor program modules are indicated by rectangular block 206. Timers 194, which are software modules controlled by hardware clock generators, are provided and control signals are sent over the dashed lines to the locations indicated in FIG. 8.

Reference numeral 200 represents an input message buffer or queue, and 202 represents an output message queue or buffer.

Input messages are held in the buffer 200 until timers permit its transmission to the on-line monitor modules 206. Similarly, output messages are held in the buffer 202 until timing signals allow its release to the communication modules 192 for transmission to and from the network.

The application modules 204 are the various routines for doing such jobs as telephone management, message transmission, and other functions to be described below.

The on-line monitor modules 206 include modules for determining the sequence of operations of the hard disc drive 146, printer 148, and display 142. The keyboard 140 delivers input signals to the application and on-line monitor modules to input data and control operations.

2. Timing and Data Input/Output

Referring now to FIG. 10, data from the network controller (see upper left hand corner of FIG. 10) enters the computer and is checked in a routine 216 to determine whether a full data packet has been received. If so, the message is stored in the input buffer at 218.

The timers 194 (FIG. 8) provide timer interrupt indicated at 220. The timer interrupt preferably is 50 milliseconds in length. Since data is processed only during the interrupt, there is ample time for the computer to perform other functions such as word processing or office computing or the like simultaneously with its operation in monitoring and facilitating communications within the network 110.

When the interrupt occurs, a routine 222 is used to check to see whether a data packet is in the input buffer. If it is not, then several routines are conducted as indicated in the central right hand portion of FIG. 10.

a. Transmitting Packet to Network

First, routine 224 is executed to check to see whether a data packet is in the output buffer. If it is, the packet is sent to a specified "C" unit under the control of the network controller.

b. Upload or Download Telephone Directory

If there is no output data packet to be delivered, routine 226 determines whether there are any requests for uploading or downloading directory data. If so, either the "download" routine of FIG. 17 or the "upload" routine of FIG. 18 is conducted.

Referring now to FIG. 17, in response to a download request in which it is requested either by a "C" unit or the PC operator that telephone directory information is to be downloaded from the PC memory to the "C" unit memory, first the identification of the "C" unit to which the data is to be downloaded is determined in routine 262.

Next, in routine 264, data is read from the hard disk to a buffer. Then, in routine 266, the data is converted the to output packet form shown in FIG. 9. Then, in routine 268, the packet is stored in the output buffer and the program returns to start. Then, during the next interrupt available for sending output data, the packet is sent to the specified "C" unit in routine 224 (see FIG. 10).

The specific procedures used for storing telephone directory information in the memory of each "C" unit is described in some detail in co-pending U.S. patent application Ser. No. 895,001, the disclosure of which hereby is incorporated herein by reference.

Referring now to FIG. 18, when a request to upload directory information from a "C" unit is received, such as one user of the "C" unit which is to update the directory information stored in the PC for his "C" unit, in routine 270, the identification of the "C" unit which is the source of the information is determined. Then, in routine 272, permission is given to send the packet, and at 268, the packet is stored in the output buffer of the "C" unit from where it will be transmitted to the computer under the control of the network controller.

c. Upload or Download Programmable Key Data

In FIG. 10, routine 228 inquires whether there is any request to either upload or download programmable key data, such as when the user of one of the "C" terminals change the programming of the keys or the PC operator changes the programming of those keys. If there is such a request, the appropriate one of the uploading and downloading routines of FIGS. 17 and 18 is performed and the data is transmitted either to or from the specified "C" unit.

d. Appointment Alarm Transmission

In FIG. 10, routine 230 asks whether there is any request for ah appointment alarm. Such a request will be developed when a pre-stored appointment time arrives. If there is such a request, then the appointment alarm routine of FIG. 19 is enacted.

Referring FIG. 19, routine 274 fetches the appointment data from the hard disc where it is stored, routine 266 converts the data into output packet form, and in routine 268, the data packet is stored in the output buffer for transmission to the specific "C" unit where it will display a message and sound an alert tone which will remind the user of an appointment just prior to the appointment.

e. Updating Parameters

FIG. 10 illustrates routine 232 in which, if there is any need to update the system control parameters (to be described below) this will be done. If not, the time and date in the PC is updated at 234, and the program returns to start.

Time and date are updated by use of the clock (FIG. 6) located in the master "C" unit. However, if the PC has its own clock source, that source is used instead.

3. Incoming Data Packet Processing

If there is a data packet in the input buffer, routine 236 in FIG. 10 causes the oldest data packet to be retrieved. Then, in routine 238 the data packet is decoded and it is determined whether the packet contains time and date information; telephone call information; dictation status information; incoming voice status information; telephone directory information; programmable key content information; or programmable key commands. The processing of each such type of information is illustrated in the drawing figure referred to near the listing of each type of information at the bottom of FIG. 10.

a. Time and Date Information

Figure 11:
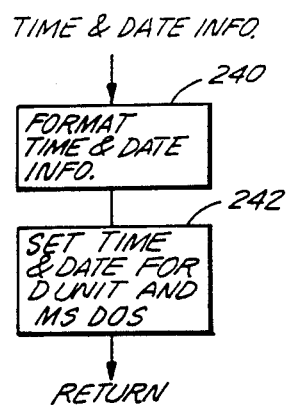

Referring now to FIG. 11, the time and date information from the system controller board clock is formatted as at 240, and the time and date are set in routine 242 for the "D" unit and MSDOS, the operating software for the IBM PC XT. Then the program returns to start.

b. Telephone Call Information

Figure 12:
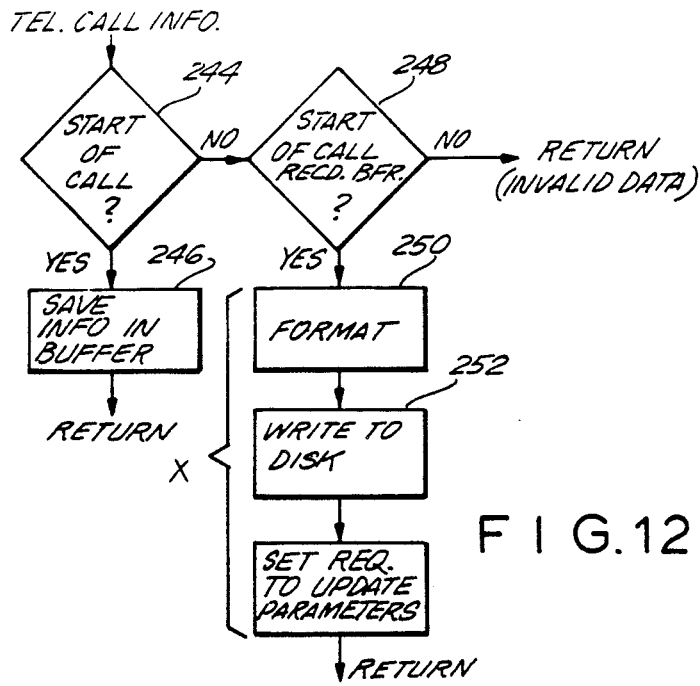

Referring now to FIG. 12, telephone call information from a "C" unit, such as the number being called, the party to which the call is to be billed, and the billing rate, etc., is received. A routine 244 detects whether the data received constitutes the start of the call. This routine is necessary because the memory of each "C" unit is not large enough to store all of the information, so that it must be transmitted in sequential packets. If it is the start of a call, routine 246 is enabled to save the information in a buffer until the rest of the information has been received.

When it is determined that the entire message has been received, routine 248 determines whether the start of the call has been received previously. If the answer is no, the program returns to start because the data is invalid. If the answer is yes, the data is formatted in routine 250, and is written to disc in routine 252. Then a request is sent to update the system parameters at 254. That request is satisfied in routine 232 (FIG. 10).

c. Dictation Status Information

Figure 15:
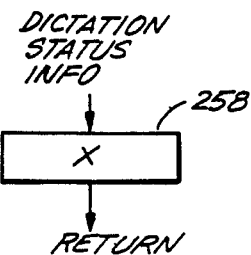

Referring now to FIG. 15, dictation status information received from a "C" unit is processed by a routine 258 called "X", which is the combination of routines 250, 252 and 254 from FIG. 12, which have been discussed above.

d. Incoming Voice Status Information

Figure 16:
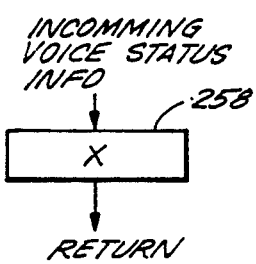

As it can be seen in FIG. 16, incoming voice status information is processed in the same way as dictation status information.

e. Telephone Directory Information

Figure 13:
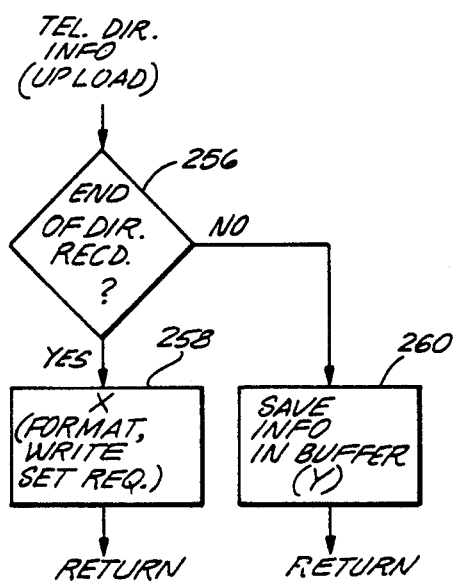

Referring now to FIG. 13, if telephone directory information to be uploaded from a "C" unit to the PC is received, a routine 256 detects whether the end of the directory information has been received. If not, it is saved in a buffer in routine 260 and the program returns to start.

If yes, the routine 258, (formatting, writing the disc and setting request as in FIGS. 15 and 16) is implemented.

Later, in routine 226 of FIG. 10, the request is satisfied.

f. Programmable Key Content Information

Figure 14:
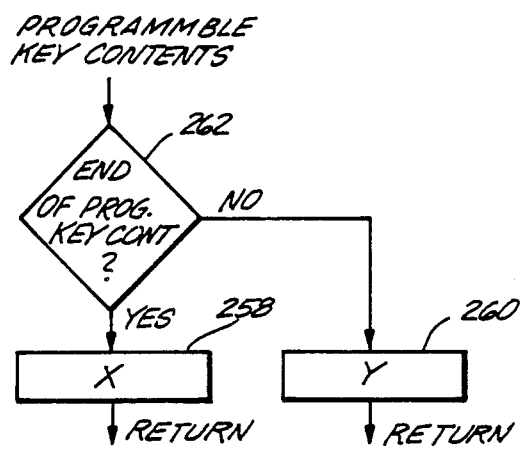

Referring now to FIG. 14, programmable key content information received from a "C" unit is processed in routine 262 to determine whether the end of the data has been detected. If not, it is saved in buffer in routine 260; if so, it is processed in accordance with routine 258 to set a request to upload the programmable key contents. That request is executed in routine 228 of FIG. 10.

g. Programmable Key Commands

Figure 20:
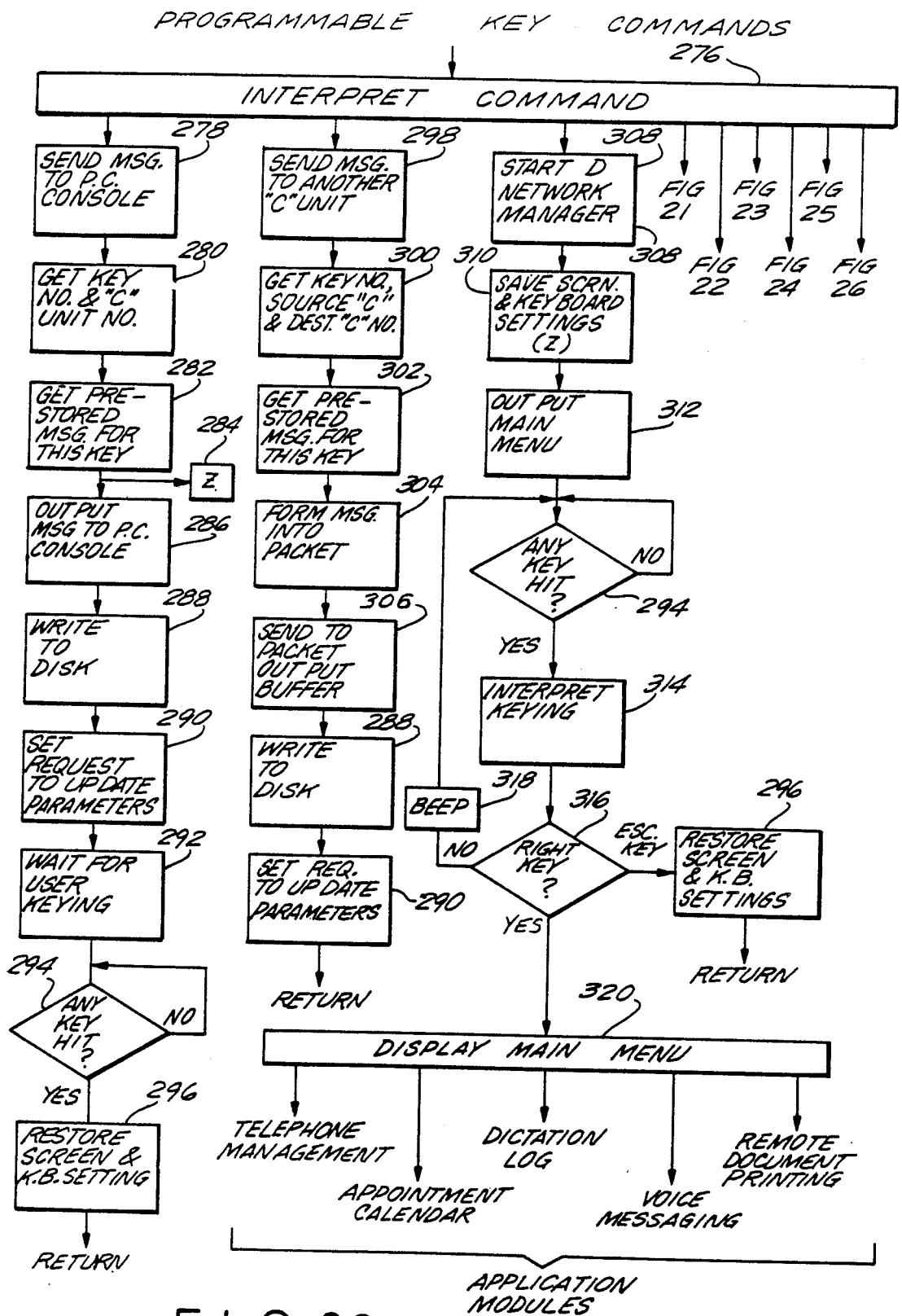

FIG. 20 illustrates the processing of many of the possible programmable key commands. Certain of the processing routines cannot be shown in FIG. 20 because of space limitations and are shown in FIGS. 21–26, as it is indicated in the upper right hand corner of FIG. 20.

(i) Send Message to PC

If, in routine 276, the programmable key command is to send a message to the PC console, this is detected in routine 278. Then, in routine 280 the number of the programmable key and the "C" unit from which it came are determined. Then, in routine 282 the pre-stored message for this key is retrieved from the hard disc. In routine 284, called "Z", the current screen and keyboard settings are saved.

In routine 286 the message is output to the PC console. In routine 288 the message is written to disc, and in routine 290 a request is sent to update parameters.

As indicated at 292 the PC then waits for the PC operator to hit a key. As indicated at 294, when any "ESC." key is hit, the screen and keyboard settings are restored as at 296, and the program returns to start.

(ii) Send Message to Another "C" Unit

When a command is detected as at 298 in FIG. 20 to send a message to another "C" unit, the program determines the key number, the source "C" unit and the destination "C" unit. The, at 302, the pre-stored message for this key is retrieved from disc, and is formed into a data packet at 304, and the packet is sent at 306 to the output buffer.

Then, during the next interrupt available for sending output data from the PC, the data packet is sent to the recipient "C" unit for display.

Then, the pre-stored message is rewritten to disc at 288, and a request to update parameters is set at 290 and the program returns to start.

(iii) Start "D" Network Manager Program (Display Main Menu)

The "D Network Manager" is the name given to the applications program for performing telephone management, performing appointment reminders and calendar function, maintaining a dictation log, voice messaging, and remote document printing, as indicated at the bottom of FIG. 20.

As it has been noted above, it is preferred to enter the Network Manager program from the master "C" unit, which preferably is located next to the PC console. Accordingly, routine 308 to start the D Manager Network program will be recognized only if the command comes from the network controller; that is the unit next to the PC. In this manner, the electronic "lock" which prevents access to the master "C" unit without authorization is utilized to protect the Network Manager from entry by any unauthorized personnel, even though the PC itself may not have locking system. Of course, if the PC itself has a lock, then this precaution is unnecessary.

Since it is also possible to access the Network Manager through various keystrokes of the PC, if the PC has a lock, then those keystrokes can be used to access the program, and the master "C" unit or system controller need not be used for this purpose. In that case, the "C" unit 10 next to the PC in FIG. 2 can be used elsewhere in the network.

As indicated at 310, the screen and keyboard settings are saved. Then, at 312 the Main Menu is output.

Routine 294 detects when any key is hit, and the particular key or keys hit is interpreted in routine 314. Routine 316 determines whether the right key has been hit. If not, a beep is sounded as indicated at 318, and the program returns to the "any key hit" routine 294.

If the right key has been hit, then routine 320 causes the Main Menu to be displayed, with all of its application modules or options available for selection as indicated at the bottom of FIG. 20.

As indicated at 296 in FIG. 20 when the operator depresses the "escape" key, the screen and keyboard settings are restored, and the program returns to start.

(iv) Upload/Download Telephone Directory

FIGS. 21 and 22 of the drawings indicate what happens when commands are received from the programmable keys of a "C" unit to either upload or download directory information. FIGS. 21 and 22 are self-explanatory.

(v) Upload/Download Programmable Key Information

FIGS. 23 and 24 show what happens when the command sent from a "C" unit is to either upload or download programmable key information. FIGS. 23 and 24 are self-explanatory.

(vi) Deliver Message Entry Short-Cut

FIG. 25 shows what happens when a command is received from the master "C" unit or system controller to start the delivery of a message. A message processing application module is loaded from disc into RAM as indicated at 340. Then, as indicated at 342, a jump routine is executed to jump to the message delivery routine. This short-cuts the several steps which usually are required to perform the delivery of a message. Since message delivery is expected to be a frequent operation for the PC operator, this short-cut is a work saver. Also, operation of the "C" unit instead of the PC itself avoids interrupting any other operations which may be going on in the use of the PC.

(vii) View Telephone Directory Entry Short-Cut

If a command is received from the master "C" unit to view the directory entries, a telephone directory application module is loaded from disc to RAM as at 346, and a jump routine is executed as at 348 to view the directory immediately. This also is a work saver for the PC operator for the reasons explained above.

It should be emphasized that both of the routines shown in FIGS. 25 and 26 can be executed only from the master "C" unit or program controller. However, it is within the scope of the invention to program the same labor-saving routines into the PC, if it is not desired to use the master "C" unit as a nearby auxiliary control unit.

XIII COMPUTER

The preferred personal computer for use in the network 110 is the IBM PC "XT". Preferably, it has at least 256K of RAM. Although the network requires only 128K of RAM to operate, the recommended operating program, Microsoft "MS DOS", release 2.0 or higher, or a compatable program, requires 30K of RAM, and additional RAM may be required for other purposes, so that 256K gives a good safety factor.

As it has been mentioned above, the XT machine has both a floppy diskette drive 144 and a hard disk or "Winchester" disk drive 146 (FIGS. 1 and 2). The hard disk is mounted "permanently" in the computer; that is, it is not easy to remove and is not designed to be removed frequently like the floppy disk is. Therefore, it always is in place for storage or retrieval of data and programs. Since the network 110 may need to store data on or retrieve data from the disk at almost any time, the use of a permanently-mounted disk is valuable.

The hard disk has a recommended storage capacity of 10 megabytes. Around 2 megabytes is needed for the network program, leaving at least 8 megabytes for other purposes.

Preferably, the PC has one serial RS232 port and one parallel port. The optional printer 148 (FIGS. 1 and 2) is connected to the parallel port; and the rest of the network is connected to the RS232 port 175 (See FIG. 7).

Personal computers other than the IBM PC "XT" also can be used. For example, the ITT-"XTRA" is suitable, and other personal computers compatible with those the IBM and ITT computers are believed to be usable as well.

The PC should have a video display screen 142 or other display means. Color display is not required.

The term "personal computer", as used in this specification, means a relatively low-cost mass-produced general purpose digital computer. A personal computer typically has RAM, a keyboard, peripheral memory, and display means, and is economically usable for small computing jobs, word processing and home computing functions. The computer should cost less than $10,000, preferably less than $5,000 new, when purchased in small quantities. It need not be particularly fast in operating speed, but it should be relatively small.

permits data transmission at relatively low baud rates, thus permitting the use of relatively low-cost conductors and components for the network, even though up to sixteen "C" units can be serviced. The cost objectives of the invention thus are met admirably.

The programming of the various sections or modules of the Network Manager program will be explained by means of descriptions of the functions performed and reproductions of actual "screens" i.e., displays on the video display produced by the program while it is running. Since the program is written in Structured Assembly language, a widely used computer language, and since the program steps used to construct the various sections or modules of the program are conventional, neither program listings nor flow charts are needed to give an adequate description.

2. Initialization and File Maintenance

The Network Manager program has an initialization and file maintenance section which allows the PC operator to change telephone addresses to easily-identifiable names, to add new telephones to the system, to change the hard disk file storage allocation, to perform maintenance on the files stored on the hard disk, and to assign author identification numbers to names so that they can be identified by the Network Manager. This section of the program would be used at the time of installation and rather infrequently thereafter.

Following is a reproduction of the first or "top level" screen in the initialization and file maintenance section of the program:

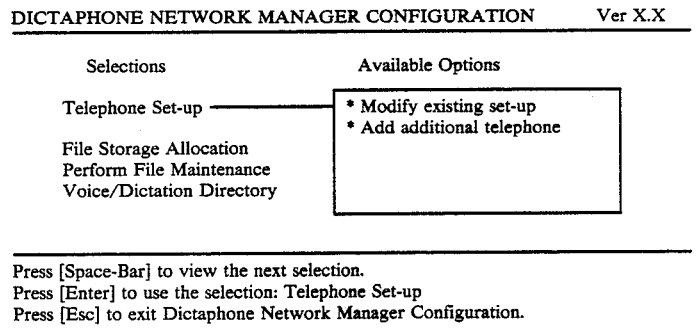

DICTAPHONE NETWORK MANAGER CONFIGURATION       Ver X.X

Selections                    Available Options

Telephone Set-up ─────────    * Modify existing set-up
                              * Add additional telephone
File Storage Allocation
Perform File Maintenance
Voice/Dictation Directory Press [Space-Bar] to view the next selection.
Press [Enter] to use the selection: Telephone Set-up
Press [Esc] to exit Dictaphone Network Manager Configuration.

XIV COMPUTER OPERATION

1. Memory Requirements

The software for the "D" network, called the "Dictaphone Network Manager", or "Network Manager", preferably is stored in a floppy disk. After the MSDOS or other operating program has been stored, the D network disk is loaded in the left drive port 144 (FIGS. 1 and 2), and stored in the hard disk, and the computer is ready to use.

The Network Manager software, including the screen files (used for creating the screens displayed on the PC) is 330K bytes in length. The default hard disk storage allocation is 1,111,000 bytes for 16 C's. The default storage allocation is broken down as follows:
150 Master Directory Entries per C
300 Telephone Calls Recorded per C
90 Dictation Entries Recorded per C
140 Messages Logged per C
40 Voice Messages Logged per C
280 Appointments Remembered per C It can be seen that the invention provides a system with relatively large capabilities but relatively low memory requirements. As mentioned above, it also

SCREEN 1

On many screens, the "Selections" are the various sub-sections of the program, each of which can be selected to perform a set of tasks described by the name of the sub-section and the "Available Options" which are displayed in the right-hand portion of the screen enclosed by a box.

The selection currently chosen is "highlighted" by the P.C. that is, the illumination around the selected name is increased, and a line is formed extending from the selection to the box. For example, in SCREEN 1 above, "Telephone Set-up" has been chosen. The options available are either to modify the existing set-up, or add an additional telephone.

The instructions at the bottom of screen A tell the PC operator what to do next; if he or she wishes to use the Telephone Set-up sub-section, pressing the "Enter" key on the IBM PC XT keyboard 140 will bring up the next screen, to be shown below. However, if another selection is desired, the operator presses either the Space-Bar or the key bearing either the "up" arrow or the "down" arrow to move up or down through the list of selections.

Pressing the "Esc" key on the keyboard will cause the computer to exit this section of the program and ready it for another task.

(a) Telephone Set-Up

Selection of "Telephone Set-up" and pressing the "Enter" key brings up the next screen as follows:

DICTAPHONE NETWORK MANAGER CONFIGURATION-Telephone Set-up　　Ver X.X

Selections

Modify Existing Setup
Add New Telephone

| TEL ADDR. | ASSIGNED NAME |
|---|---|
| 00 | TELEPHONE 0 |
| 01 | TELEPHONE 1 |
| 02 | TELEPHONE 2 |
| 03 | TELEPHONE 3 |
| 04 | TELEPHONE 4 |
| 05 | TELEPHONE 5 |
| 06 | TELEPHONE 6 |

Press [Space-Bar] to view the next selection.
Press [Enter] to use the selection: Modify Existing Setup
Press [Esc] to return to the previous screen.

SCREEN 2

Now the "Selections" are the options which appeared in the previous screen. Part of the list of telephones and corresponding names of the current telephone set-up is given in the box. Choosing one of the options is done as with Screen 1, and as will all other screens.

(b) Modify Existing Set Up

The Modify Existing Set Up selection will allow the PC operator to change the assigned name for each address on the Network to make it more easily identifiable in day-to-day operations. This section will also serve to inform the PC of a printer connected to any C unit in the network.

Once the Modify Existing Set Up selection has been made, the user will be shown a list of telephone addresses, names assigned and printer options, as shown in the next screen:

DICTAPHONE NETWORK MANAGER CONFIGURATION-Telephone Set-up　　Ver X.X

| TEL ADDR | NAME ASSIGNED | PRINTER OPTION | REMARKS |
|---|---|---|---|
| 00 | TELEPHONE 0 | N | @ |
| 01 | TELEPHONE 1 | N | @ |
| 02 | TELEPHONE 2 | N | @ |
| 03 | TELEPHONE 3 | N | @ |
| 04 | TELEPHONE 4 | N | @ |
| 05 | TELEPHONE 5 | N | @ |
| 06 | TELEPHONE 6 | N | @ |
| 07 | TELEPHONE 7 | N | @ |
| 08 | TELEPHONE 8 | N | @ |
| 09 | TELEPHONE 9 | N | @ |
| 10 | TELEPHONE 10 | N | @ |

Press [Space-Bar] to move to phone to assign.
Press [Enter] to select phone to assign.
Press [PgDn] to see next page of phones.
Press [Esc] to return to previous screen.

SCREEN 3

A table is presented in the center of the screen that contains the address identifying each C Station on the Network, a name assigned to each telephone station (such as "Tom Smith" instead of "Telephone 0"), whether that C Station has a printer connected to it or not and a "Remarks" field which can be used for items such as "Corner Office Sales Dept" to describe the location of the C telephone. Depression of the Space Bar will move the highlighted field through the list. When the desired C Station is highlighted, depression of the Enter Key will select the station for which the above information can be changed. Since the screen has the capability of displaying information for only eleven telephones, use of the Page-Up and Page Down Keys on the PC keyboard will allow the user to examine information for all of the telephones in the Network. Once a telephone has been selected by pressing the Enter Key, the user will be allowed to change the information for that particular telephone, by use of the next screen:

TELEPHONE ADDRESS: 01

NAME ASSIGNED: Gretchen Schell
PRINTER OPTION (Y or N): N
REMARKS: Thank you for Typing

---

Type in the information.
Press [Enter] to move to the next line.
Press [PgDn] to modify next telephone's setup.
Press [F1] to save modifications.
Press [Esc] to return to the previous screen.

SCREEN 4

Screen 4 describes the telephone at the address selected. The PC operator is now free to change the name assigned to the telephone, and to change the indication of whether it has a printer connected to it or not, as well as the remarks. Only the highlighted field may be edited. The Page Down Key is provided to move through the entire list of telephones on the system to facilitate first time set up. It is necessary to press the F1 Key to save all modifications made before using the Page Down Key to move to the next telephone. Once all modifications are complete, the Escape Key is pressed to return to the top level menu—Screen 1.

After returning to Screen 1, if the operator wishes to use the "Add New Telephone" option, he or she presses "Enter" to bring up Screen 2, and then moves the highlighted area down to choose the second option, thus creating the following screen:

that the following selections permit the functions listed below:

File Storage Allocation—allows the operator to re-allocate disc storage space as data stored changes.
Perform File Maintenance—allows removal of old data from the disk.
Voice/Dictation Directory—allows the operator to assign author identification numbers to the names of people using the Voice/Dictation directory.

If the latter is done, the PC will refer to author's dictation by name rather than number. These names will appear in the Voice Messaging Section. If the names are not entered into the Voice/Dictation Directory, the numbers will appear in that section instead.

A feature of considerable convenience is provided by programming such that a selection in any list on any screen can be made merely by typing the first letter of the selection. Thus, Voice/Dictation Directory can be selected from Screen 1 merely by typing the letter "V"

---

DICTAPHONE NETWORK MANAGER CONFIGURATION-Telephone Set-up          Ver X.X

Selections
Modify Existing Setup         | All telephones are in the system
Add New Telephone ─────────

---

Press [Space-Bar] to view the next selection.
Press [Enter] to use the selection: Add New Telephone
Press [Esc] to return to the previous screen.

SCREEN 5

Screen 5 is the same as Screen 2 except that the "Add New Telephone" selection has been chosen and a different message appears in the box.

The "Add New Telephone" function provides memory storage space for additional telephones as they are needed without reconfiguring the entire system. Depression of the Enter Key will allow the PC operator to add memory space for new telephone.

The Telephone Set-Up routines have been explained in detail here in part in order to establish the procedures used by the operator in handling the functions of the program. These procedures are used consistently throughout the following description.

(b) Other Functions

The remaining selections on Screen 1 will not be explained in detail. It is unnecessary to do so in order to adequately describe the invention. It is sufficient to say on the keyboard, rather than having to use several key strokes to move from the top to the bottom of the list. This is facilitated by using selection names which have different first letters.

On the foregoing screens, and in the screens to follow, the "level" of the screen—that is, the selection and option which have been chosen—usually appears at the top of the screen.

3. Entering the Main Program; Security Precautions

There are three ways to enter the main part of the Network Manager Program. They are as follows:

1. A "C" Programmable Key programmed with #*21 will bring the user to the top level screen or Main Menu (to be shown next).

2. A "C" Programmable Key programmed with #*22 will bring the user to the Message Deliver Screen. This can be used to send "pink slip" type messages quickly.

3. A "C" Programmable Key programmed with #*23 when pressed will enter the Network Manager at the expanded view section of the Master Telephone Directory stored in the PC. This will allow quick access to see the entries in the directory.

These Programmable Keys are active only in the master C Station next to the PC (address 00000). The Programmable Keys programmed with these codes will only be active when the user is not in the Network Manager Program. Thus, the program is, in effect, access-protected by the security code that locks the C Telephone.

Entry to the Network Manager also can be accomplished by a series of commands given when operating at the MS DOS level, but this is not recommended since entry cannot be protected by a security access code, unless the PC has its own lock.

If the Programmable Keys with #*22 or #*23 are used to enter the Dictaphone Network Manager, the "Home" Key on the PC keyboard will return the PC operator to the top level screen or Main Menu. A depression of the Escape Key, at this point, would quickly return the PC operator to the task that was running prior to the depression of the Programmable Key.

4. Main Menu

Entry into the program at the start brings up the Main Menu below:

---

DICTAPHONE NETWORK MANAGER　　　　　　　　　　Ver X.X
Copyright 1986 Dictaphone Corp.

Selections

| Telephone Management ─────── | |
| Appointment Calendar | * Message Processing |
| Dictation Log | * Telephone Call Accounting |
| Voice Messaging | * Directory Management-Telephone |
| Remote Document Printing | * Programmable Key Management |

---

Press [Space-Bar] to view the next Selection.
Press [Enter] to use the Selection: Telephone Management
Press [Esc] to exit the Dictaphone Network Manager.

SCREEN 6

The main menu shows the five major functions which can be performed by the network under the "Selections" heading. Each of those functions now will be described, in the order in which they are listed.

5. Telephone Management

The options available for the Telephone Management selection are shown in Screen 6. Those options and options for the Message Processing selection are shown in Screen 7 below.

---

TELEPHONE MANAGEMENT　　　　　　　　　　　　Ver X.X

Selections

| Message Processing ─────── | Deliver Message(s) |
| Telephone Call Accounting | Create Reusable Message(s) |
| Directory Management-Telephone | Edit Reusable Message(s) |
| Programmable Key Management | Remove Reusable Message(s) |
| | Print Reusable Message(s) |
| | Message(s) Delivered |

---

Press [Space-Bar] to view the next Selection.
Press [Enter] to use the Selection: Message Processing
Press [Esc] to return to the previous screen.

SCREEN 7

(a) Message Processing

The PC operator can create short messages to be directed and displayed on a desired C unit. On receipt of each Message, the C unit will produce a short beep and an indication of the waiting message will appear on the C display in the form of a pound (#) sign. The C user can scroll and view these messages by pressing the pound (#) Key (See FIG. 4). The C user can delete these messages by pressing the Calculator Clear Key, in Key group 28 of FIG. 4, when the message to be deleted appears on the display.

A message sent to a C may be pre-formatted to include a phone number on the second line which can be automatically dialed by the depression of the Dial Key while that message is displayed.

Pressing the Enter Key causes the PC to show Screen 8, the first screen of the Message Processing section of the program:

TELEPHONE MANAGEMENT-MESSAGE PROCESSING　　Ver X.X

-continued

Selections

Deliver Message(s) ─────────
Create Reusable Message(s)
Edit Reusable Message(s)
Remove Reusable Message(s)
Print Reusable Message(s)
Message(s) Delivered

| Reusable Messages |
|---|
| This is a test 216 |
| Come see me right away |
| create a message |

Press [Space-Bar] to view the next Selection.
Press [Enter] to use the Selection: Deliver Message(s)
Press [Esc] to return to the previous screen.

SCREEN 8

Selection of the Deliver Message(s) option brings up the next screen:

TELEPHONE MANAGEMENT-MESSAGE PROCESSING-DELIVER        Ver X.X

| Reusable Message(s) | | |
|---|---|---|
| A. This is a test 216 | | |
| B. Come see me right away | | |
| C. create a message | | |

Press [Space-Bar] to move through the list of Reusable Message(s).
Press [Enter] to select a Reusable Message for delivery.
Press [F1] to type a new Message.
Press [F2] to type a new Message with telephone number.
Press [PgDn] to see the next screen of Reusable Message(s).
Press [PgUp] to see the previous screen of Reusable Message(s).
Press [Esc] to return to the previous screen.

SCREEN 9

(i) Delivering a Reusable Message

To deliver a Reusable Message, the Spacer Bar and the Enter Key are used to select a message for delivery. The PC screen will change to allow the selection of destinations or receivers for the Reusable Message just selected, as shown below:

TELEPHONE MANAGEMENT-MESSAGE
PROCESSING-DELIVER Ver X.X

Deliver Message to:
Receiver(s)

| | |
|---|---|
| *A.Secretary | J.Shamla Sharma |
| B.Betsy Lab | K.Om Sood |
| *C.Steve Smith | L.Brian Beloin |
| D.Nick Dagasto | M.Betsy |
| E.David Chamberlin | N.Walt |
| F.Jy-hong Su | D.Jack Dwyer |
| G.Mark Harris | P.Ernie Hoffman |
| H.Shailai Kambli | Q.ALL |
| I.John Garay | |

Press [Space-Bar] to move to the desired Receiver.
Press [Enter] to select the Receiver : Steve Smith (Repeat above steps for selecting multiple Receivers)
Press [F1] to send as a non priority message.
Press [F2] to send as a priority message.
Press [Esc] to return to the previous screen.

SCREEN 10

Screen 10 displays a list of possible recipients of the message selected previously. An asterisk will appear next to all receivers who are selected. Several receivers may be selected to receive a given message.

A receiver may be de-selected (taken off the selected list for delivery of this particular message) by using the Space Bar to move to the desired receiver and pressing the Enter Key to de-select that receiver. The asterisk next to that particular receiver will now disappear. The PC operator may select the receiver next to the capital letter "A" on the list by pressing the "A" Key. Similarly, the recipient next to the letter A may be de-selected by pressing the letter "A" Key again.

A message can be sent to all recipients by selecting item "Q"—ALL.

Once all of the desired receivers have been selected, the user may send the message by pressing the F1 or F2 Key on the PC Keyboard.

Depression of the F1 Key will send the message in a non-priority format. A non-priority message will cause the recipient C unit to issue a short beep (about ¼ second), and a stationary pound sign (#) will appear on the display of the C unit.

Depression of the F2 Key will send the message as a priority message which causes a long (approx. 1 second) beep to be issued by the recipient C unit, and cause a flashing pound sign (#) to appear on the display of that C unit.

After either F1 or F2 is pressed, the selected Reusable Message will be sent to the selected receivers and the PC will return to the previous screen. If "Escape" is pressed before F1 or F2 is pressed, the Selections made on this screen will be ignored and the user will be returned to the previous screen.

(ii) Typing a New Non-Reusable Message for Delivery

Beginning from Screen 9, the PC operator may wish to type in a new message for delivery. The message is .

unique and is not intended to be reusable. To do this the operator presses the F1 Key, producing the following new screen:

TELEPHONE MANAGEMENT-MESSAGE PROCESSING-DELIVER        Ver X.X

```
Message
Line 1: Hi There !
Line 2:
```

Type the desired Reusable Message. (up to 16 characters per line)
Press [Enter] to go to the next line.
Press [F1] to deliver the Message.
Press [Esc] to disregard this Message and return to the previous screen.

SCREEN 11

The PC operator may now type in a two-line message consisting of 16 characters per line. This message will appear on the PC screen exactly as it is seen on a "C" display. The second line of this message can be a telephone number. When the message is correct, the F1 Key is pressed to deliver it. Screen 10 now appears again to give a list of recipients or receivers, and the selection and transmission process described above is repeated.

(iii) Typing a New Non-Reusable Message With a Telephone Number

The message sent can include a telephone number. Beginning from Screen 9, the PC operator presses the F2 Key, types in the telephone number in the second line of the message, and sends it in the manner described above.

(iv) Creating Reusable Message(s)

Beginning from the top level of the Message Processing menu (Screen 7), the PC operator can create a reusable message that will be stored in the PC's memory for future delivery to C units.

Selection of Create Reusable Message(s) from Screen 7, and then pressing "Enter" to use the selection, produces this screen:

pressed, a new table of Reusable Messages is displayed. The PC operator can press F1 again to return to the Message Create screen, or press Escape to return to the Message Processing main menu (Screen 7).

(v) Edit and Remove Reusable Message(s)

The PC operator may exit the Reusable Messages stored in PC's memory. Beginning from the main menu for Message Processing (Screen 8) the Edit Reusable Message option may be selected. This creates a screen (not shown) which displays all existing reusable messages. The selection of one message to edit creates a screen like Screen 11 which can be used to edit the message in the same manner as creating a new reusable message.

Once the message appears on the screen correctly, it can be saved by pressing the F1 Key.

Reusable messages may be removed from the list by a similar procedure.

(vi) Print Reusable Message(s)

To print a list of the Reusable Messages currently stored in the PC, the operator begins at the top level menu for Message Processing, Screen 8. Then, "Print Reusable Messages" is selected, and printing on the printer 148 (FIG. 1) is started by pressing the Enter Key.

(vii) Message(s) Delivered Log

The PC will keep a log of all messages exchanged between it and individual C units, as well as messages TELEPHONE MANAGEMENT-MESSAGE PROCESSING        Ver X.X

```
Selections
Deliver Message(s)
Create Reusable Message(s) ─────────  Message
Edit Reusable Message(s)              Line 1:
Remove Reusable Message(s)
Print Reusable Message(s)             Line 2:
Message(s) Delivered
```

Press [Space-Bar] to view the next Selection.
Press [Enter] to use the Selection: Create Reusable Message(s)
Press [Esc] to return to the previous screen.

SCREEN 12

In the center of the screen a blank two line message form is presented. The PC operator can type in a two-line message having 16 characters per line on the blank message form, and may edit the message as many times as desired. Once the message is correct, F1 is pressed to save (store) the message on the hard disk. Once F1 is exchanged between C units. The operator may access the message log by beginning at the top level menu of the Message Processing section (Screen 8). Choosing the Messages Delivered Selection produces the following screen:

| TELEPHONE MANAGEMENT-MESSAGE PROCESSING-MESSAGE(S) DELIVERED | |
|---|---|
| Receiver(s) | |
| A.TELEPHONE 0 | J.TELEPHONE 9 |
| B.TELEPHONE 1 | K.TELEPHONE 10 |
| C.TELEPHONE 2 | L.TELEPHONE 11 |
| D.TELEPHONE 3 | M.TELEPHONE 12 |
| E.TELEPHONE 4 | N.TELEPHONE 13 |
| F.TELEPHONE 5 | O.TELEPHONE 14 |
| G.TELEPHONE 6 | P.TELEPHONE 15 |
| H.TELEPHONE 7 | Q.Network Manager |
| J.TELEPHONE 8 | R.ALL |

Press [Space-Bar] to move to the desired Receiver.
Press [Enter] to review Message(s) Delivered for:TELEPHONE 0
Press [Esc] to return to the previous screen.

SCREEN 13

When the desired receiver is selected pressing the Enter Key produces the following screen:

TELEPHONE MANAGEMENT-MESSAGE PROCESSING-MESSAGE(S) DELIVERED        Ver X.X

Time Period for: Secretary      Available Options

From:   6/MAR/1986
To:     6/MAR/1986

| Reverse Time Order |
| View more Detail |
| Erase Message(s) |
| Print Message(s) |

Type a different Time Period if desired.
Press [Enter] to move to the next line.
Press [F1] to display Message(s) delivered.
Press [Esc] to return to the previous screen.

SCREEN 14

A cursor will be located under the first digit of the "From" date. The user can change the "From" date, which is always earlier than or the same as, the "To" date. The Arrow Keys will move the cursor through the "From" date to change a single digit or letter. The Tab Key will move the cursor to the beginning of each date.

Once the dates displayed indicate the time period that the operator wishes, the F1 Key is pressed to view messages delivered during the Time Period as shown in the following screen:

TELEPHONE MANAGEMENT-MESSAGE PROCESSING-MESSAGE(S) DELIVERED        Ver X.X

Selections

Reverse Time Order
View More Detail
Erase Message(s)
Print Message(s)

| Receiver | Message(s) Delivered | Date |
|---|---|---|
| Secretary | Hi There ! | MAR 6 |
| Secretary | No download allowed !!!!! | MAR 6 |

Press [Space-Bar] to move through the list of Selections.
Press [Enter] to use the Selection: Reverse Time Order
Press [PgDn] to see the next screen of Messages.
Press [PgUp] to see the previous screen of Messages.
Press [Esc] to return to the previous screen.

SCREEN 15

(viii) Reverse Time Order Log Display

Once the table of Messages Delivered has been displayed, selection of the Reverse Time Order function (listed under the Selections column) will re-sort the list of Messages Delivered from oldest to newest and newest to oldest, and display the message in the new format.

(ix) View More Detail

The View More Detail function under Messages Delivered (Screen 15) will allow the operator to see the Time and Sender of a particular message, in addition to all the information displayed in the table presented in Screens 13 and 14. The following screen will result:

TELEPHONE MANAGEMENT-MESSAGE PROCESSING-MESSAGE(S) DELIVERED        Ver X.X

| Receiver | Message(s) Delivered | Date | Time | Sender |
|---|---|---|---|---|
| Secretary | Hi There ! | MAR 6 | 16:00 | PC |
| Secretary | No download allowed !!!!! | MAR 6 | 08:00 | PC |

Press [PgDn] to view the next screen of Message(s).
Press [PgUp] to view the previous screen of Message(s).
Press [Esc] to return to the previous screen.

SCREEN 16

(x) Erase Message(s)

Messages can be erased from the list of Messages Delivered (Screen 15) by selecting the Erase Message(s) function, which produces the following screen:

TELEPHONE MANAGEMENT-MESSAGE PROCESSING-MESSAGE(S) DELIVERED

| Receiver | Message(s) Delivered | Date | Time | Sender |
|---|---|---|---|---|
| Secretary | helloooooooooo!!! | MAR18 | 13:02 | PC |
| Secretary | helloooooooooo!!! | MAR18 | 13:01 | PC |

Press [Space-Bar] to move through list of the Message(s) Delivered.
Press [Enter] to select a Message to be erased.
 (Repeat above steps for selecting multiple messages for removal)
Press [F1] to erase the selected Message(s) on this screen.
Press [F10] to erase all Messages for the specified user and time period.
Press [PgDn] to view the next screen of Message(s).
Press [PgUp] to view the previous screen of Message(s).
Press [Esc] to disregard the Selections and return to the previous screen.

SCREEN 17

Once all of the messages that are to be erased have been selected, the F1 Key is pressed to erase them.

Depression of the F10 Key will erase all messages for the specified user and the specified time period. Once the F10 Key is depressed, a prompt message will appear in the instruction field of the display to enter a "Y" or an "N" on the PC Keyboard to confirm the Erasure Selection. Entry of a "Y" will complete the erasure process; entry of an "N" will return the operator to the same position that he or she was in before the F10 Key was pressed.

Depression of the Escape Key before the F1 or F10 Keys will return the operator to a previous screen and disregard all of the Selections made for erasure. Once an erase is complete by the F1 or F10 Keys, the operator will automatically return to the previous screen.

(xi) Print Message(s) Log)

The PC operator may print a list of Messages Delivered for a specific user and time period by selecting the Print Message(s) function from Screen 15. Pressing the Enter Key begins the message printout Messages will be printed on the printer 148 (FIG. 1). The message printout will include the receiver, the message delivered, the date, the time, and the sender of the message.

(b) Telephone Call Accounting

The Network Manager program automatically tracks every telephone call that is made within or outside of the network. When this option is selected from Screen 17 above, information about telephone usage appears in a table format. Each entry in the table contains the C unit number (or the name assigned to that unit), the phone number called (or the words "incoming call", for calls received at that C unit), the time, the date and the call duration, rounded to the nearest minute. Account numbers and customer billing amounts will be added to this table if the C operator uses the Programmable Key for call billing.

The first screen which appears (not shown) gives identification of the telephones and their users. After a particular telephone has been selected from the list, the following screen appears:

TELEPHONE MANAGEMENT-TELEPHONE CALL ACCOUNTING        Ver X.X

Time Period for: Secretary            Available Options

From:   6/MAR/1986            * Erase Telephone Call
To:     6/MAR/1986            * Reverse Time Order
                              * View More Detail
                              * Print Telephone Call
                              * Modify Call Billing Type in a different Time Period if desired.
Press [Enter] to go to the next line.
Press [F1] to display Telephone Call Accounting.
Press [Esc] to go to the previous screen.

SCREEN 18

Once the dates displayed indicate the time period that operator wishes to review, pressing F1 brings up the following screen:

TELEPHONE MANAGEMENT-TELEPHONE CALL ACCOUNTING    Ver X.X

Selections

| | NAME | TELEPHONE NUMBER | DATE | TIME |
|---|---|---|---|---|
| Erase Telephone Call | Steve Smith | 8P*919142411300 | MAR06 | 02:19pm |
| Reverse Time Order | Steve Smith | Incoming Call | MAR06 | 01:26pm |
| View More Detail | Steve Smith | 9P*8525180 | MAR06 | 11:51am |
| Print Telephone Call | Steve Smith | 8P*919142255476 | MAR06 | 11:01am |
| Modify Call Billing | Steve Smith | Incoming Call | MAR06 | 09:20am |
| Calculate Billing | Steve Smith | Incoming Call | MAR06 | 09:19am |

Press [Space-Bar] to move through the list of Selections.
Press [Enter] to use the Selection: Erase Telephone Call
Press [PgDn] to see the next screen of Telephone Calls.
Press [PgUp] to see the previous screen of Telephone Calls.
Press [Esc] to return to the previous screen.

SCREEN 19

(i) Erasing Call; Reversing Time Order, etc.

A list of Selections appears at the left side of the screen. These Selections may be used to manipulate the Telephone Accounting information stored for any C telephone on the network.

Erasing the telephone call, showing the calls in reverse time order, viewing more detail, and printing a list of telephone calls are selections which are performed in essentially the same manner as the same functions are performed for messages. Since those functions are disclosed adequately above, they need not be discussed further here.

The added information given when "View More Detail" is selected is the account number to which the call was billed, and the amount billed for the call. All of these details will be printed out when the print option is selected.

(ii) Modify Call Billing

The PC operator may change the information stored in the account number or billing field of the telephone call accounting table by using the Modified Call Billing function. When this option has been selected, the Enter Key can be pressed to create the following screen:

TELEPHONE MANAGEMENT-TELEPHONE CALL ACCOUNTING

Telephone Call(s)

| Name | Telephone Number | Date | Time | Len | Account | Bill |
|---|---|---|---|---|---|---|
| TELEPHONE 1 | 216 | MAR26 | 03:27 pm | 01 | 252 | 0.2 |

Type in new Account number. Press [Tab] to change Bill amount.
Press [Enter] to move to the next Call.
Press [F1] to save the changes on the screen.
Press [PgDn] to see the next page of Telephone Calls.
Press [PgUp] to see the previous page of Telephone Calls.
Press [Esc] to disregard the changes and return to the previous screen.

SCREEN 20

After one of the calls in the list on Screen 20 has been selected, the Account Number and Bill fields can be changed for the call. Once the Account and Bill fields are correct, the F1 Key may be depressed to save the changes.

(iii) Calculate Call Billing

Before the amount billed can be displayed in any of the foregoing options, the Calculate Billing function must be used. Once the Calculate Billing option has been selected, the Enter Key can be pressed to start the Calculate Billing process. The words "Please wait Billing Calculation in Progress" will appear until the calculation is complete.

(c) Telephone Directory Management

The PC is capable of maintaining a large master directory (up to 2,400 or more names and numbers) from which 16 individual "C" directories (100 names and numbers each) can be maintained. Each different number that appears in an individual C directory will appear in the Master Directory. Directory entries will be considered different if the name and number fields are different. A name (or number) is not considered different if the difference between two names (or numbers) is only upper case letters (v.s. lower case), or if one contains punctuation (spaces, dashes, brackets) that the other does not.

The Telephone Directory Management section of the Network Manager is capable of: adding, modifying, erasing, viewing and copying directory entries as well as sending a directory to a phone, receiving a directory from a phone, duplicating directories between phones and printing directories from individual phones.

To use this portion of the program, the PC operator must begin at the top level of the Telephone Management menu, Screen 7, and select the "Directory Management—Telephone" option. This creates the following screen which shows the numerous options available, with the use of the invention, for telephone directory management.

At the bottom of the entry form, the PC user can enter a billing account number and a billing rate in dollars ($) per hour. The billing rate has five (5) character places to enter a dollars ($) per hour amount and will accept a decimal point so that fractional amounts can be entered.

This information is used in conjunction with a "C" Programmable Key programmed with #*13. If the C user wishes to bill a particular phone call to a certain account, it is possible to alert the PC that a call in progress should be billed. To activate the call billing function, the "C" user must bring up the name of the person who is to be billed for the call in progress on the

```
TELEPHONE MANAGEMENT                                    Ver X.X

Selections                      Available Options

┌──────────────────────────────┐
                                    │ Add Directory Entry          │
                                    │ Modify Directory Entry       │
    Message Processing              │ Erase Directory Entry        │
    Telephone Call Accounting       │ View Directory Entry         │
    Directory Management-Telephone ─┤ Copy Directory Entry         │
    Programmable Key Management     │ Send Directory to Phone      │
                                    │ Receive Directory from Phone │
                                    │ Duplicate Directory          │
                                    │ Print Directory              │
                                    └──────────────────────────────┘
```

Press [Space-Bar] to view the next Selection.
Press [Enter] to use the Selection: Directory Management-Telephone
Press [Esc] to return to the previous screen.

SCREEN 21

(i) Add Directory Entry

To add a Directory Entry (new name and telephone number) to a directory, the PC operator follows the selection instructions to create this screen:

"C's" display, then press a Programmable Key programmed with #*13. The PC will search the directory for the name sent from the "C" and, upon finding it, will add the billing account number and the billing rate multiplied by the length of the call to the telephone call accounting data table.

```
TELEPHONE MANAGEMENT-DIRECTORY MANAGEMENT-ADD        Ver X.X

New Entry:
    ┌─────────────────────────────────────────┐
    │ TELEPHONE NUMBER: 8P9*12038534800       │
    │ LAST NAME: Su                           │
    │ FIRST NAME: Jy-hong                     │
    │ TITLE:                                  │
    │ ADDRESS:                                │
    │ CITY:                                   │
    │ STATE:                                  │
    │ ZIP:                                    │
    │                                         │
    │ TIME ZONE:                              │
    │ BILLING ACCOUNT:                        │
    │ BILLING RATE:                           │
    │ REMARKS:                                │
    └─────────────────────────────────────────┘
```

Type in directory information.
Press [Enter] to go to the next line.
Press [F1] to select the directory(ies) to add New Entry to.
Press [F2] to add the New Entry to the Master Directory Only.
Press [Esc] to return to the previous screen.

SCREEN 22

A cursor will appear after the words "Telephone Number" at the top of the new entry form on Screen 22. The PC operator fills in the appropriate Telephone Number here, entering it just as it would be dialed on a "C" telephone. Pauses can be inserted between numbers by entering a capital letter "P".

Note that, in order for some person to be billed for a call from a "C" unit, that person's name must be in the directory of that "C" unit, and it must be displayed on the display 16 before #*13 is used. Once all of the directory information appears on the new entry form correctly, the PC operator may select the directories to which the new entry will be added. This is done by pressing the F1 Key.

The latter procedure may be deferred, if for example, the PC operator wishes to enter several successive new entries. Depression of the F2 Key will add the new entry only to the Master Directory and present the user with a new entry form. Individual entries can be created later from the Master, by using the Copy Entry function to be described below. Note that depression of the Escape Key before the F1 or F2 Key has been pressed will return the user to the previous screen without saving any of the data entered on the new entry form. If the F1 Key is pressed, the PC will display the list of telephones for which there are directories so that the operator can select which directory to add the entry to.

depression of the Enter Key will create the following screen:

TELEPHONE MANAGEMENT-DIRECTORY MANAGEMENT-MODIFY-SELECT    Ver X.X

| NAME | TELEPHONE NUMBER | REMARKS |
|---|---|---|
| Smith | 260 | |
| Su | BP9*12038534800 | |

Press [Space-Bar] to move through the list of entries.
Press [Enter] to select the entry to modify.
Press [PgUp] to see the previous page of entries.
Press [PgDn] to see the next page of entries.
Press [Esc] to return to the previous screen.

SCREEN 24

Once the operator has selected a particular range, a table of names, telephone numbers and remarks will appear on the PC screen. When the name which is to be modified has been selected, the PC operator now will be presented with all of the directory information stored for that particular entry in a form like the new entry form of Screen 22. Then the operator can delete or add characters to the directory entry in the usual way.

(iii) Erase Directory Entry

The procedure for erasing directory entries is essentially the same as the erasure steps described above for messages and need not be repeated.

If an entry is erased from the master directory, it will be removed from all of the individual C directories automatically.

(ii) Modify Existing Directory Entry

To modify an existing directory entry, the PC operator begins from the Telephone Management Directory Management top level menu, Screen 21. Selecting "Modify Directory Entry" creates a screen like the Screen 25 below. Then, selecting a directory from Screen 25 produces the following screen:

TELEPHONE MANAGEMENT-DIRECTORY MANAGEMENT-MODIFY-SELECT    ver X.X

Last names starting with:
A-C
D-F
G-I
J-L
M-O
P-S
T-V
W-Z

| Name | Telephone Number |
|---|---|
| Su | BP9*12038534800 |

Press [Space-Bar] to view the next group of names.
Press [Enter] to select Names starting with: A-C
Press [Esc] to return to the previous screen.

SCREEN 23

The operator will be prompted to select an alphabetical category in which the desired directory entry exists. The window to the right of the list will display a small portion of the names and telephone numbers which are stored within that particular alphabetical range. If there are not enough entries within a given range to fill the window, names from subsequent ranges will be displayed. If there are no entries for a given range and no subsequent entries for subsequent ranges, the window will display the words, "No entries for this range". Once the desired alphabetical range has been selected,

(iv) View Directory Entry

To view a directory entry which exists in any directory, the PC operator begins with Screen 21 and creates from it the following screen:

| TELEPHONE MANAGEMENT-DIRECTORY MANAGEMENT-VIEW Ver X.X | |
|---|---|
| Telephone Directories | |
| A.Secretary | J.Shamla Sharma |
| B.Betsy Lab | K.Om Sood |
| C.Steve Smith | L.Brian Beloin |
| D.Nick Dagasto | M.Betsy |
| E.David Chamberlin | N.Walt |
| F.Jy-hong Su | O.Jack Dwyer |
| G.Mark Harris | P.Ernie Hoffman | screen which divides the directory into alphabetical ranges.

TELEPHONE MANAGEMENT-DIRECTORY MANAGEMENT-VIEW-SELECT

Last names starting with:

| | Name | Telephone Number |
|---|---|---|
| A–C | Su | 216 |
| D–F | | |
| G–I | | |
| J–L | | |
| M–O | | |
| P–S | | |
| T–V | | |
| W–Z | | |

Press [Space-Bar] to view the next group of names.
Press [Enter] to select Names starting with: A–C
Press [Esc] to return to the previous screen.

TELEPHONE MANAGEMENT-DIRECTORY MANAGEMENT-VIEW Ver X.X    20

| H.Shailai Kambli | Q.Master Directory |
|---|---|
| I.John Garay | |

Press [Space-Bar] to move through the list of Directories.
Press [Enter] to select Directory to view.
Press [Esc] to return to previous secreen.

SCREEN 25

When a particular directory has been selected, the PC operator will be presented with the following new SCREEN 26

Once an alphabetical range has been selected, the following screen will appear:

TELEPHONE MANAGEMENT-DIRECTORY MANAGEMENT-VIEW-Secretary

| NAME | TELEPHONE NUMBER | REMARKS |
|---|---|---|
| Su | 216 | |

Press [Space-Bar] to move through the list of entries.
Press [Enter] to select the entry to be viewed.
Press [PgUp] to see the previous page.
Press [PgDn] to see the next page.
Press [Esc] to return to the previous screen.

SCREEN 27

Selection of an entry to be viewed in greater detail is accomplished by pressing the Enter Key. This brings up the following screen:

TELEPHONE MANAGEMENT-DIRECTORY MANAGEMENT-EXPANDED

TELEPHONE NUMBER: K05260
LAST NAME: BLASH, BILL
FIRST NAME:
TITLE:
ADDRESS:
CITY:
STATE:
ZIP:

BILLING ACCOUNT:
BILLING RATE: .00
REMARKS:

Press [F1] to print entry as an address label.
Press [F2] to dial the displayed phone number.
Press [PgDn] to see the next entry.
Press [PgUp] to see the previous entry.
Press [Esc] to return to previous screen.

SCREEN 28

There are many reasons for wishing to view a directory entry in the detail exhibited by Screen 28. As examples, one might wish to determine the correct spelling of the name of the person or company named in the entry; or one might wish to determine the billing account number or rate for the person or company named; or to determine the person or companies' address; etc.

In accordance with further advantageous features of the invention, the display also can be used in special labor-saving ways as follows:

(iva) Print Address Labels

Depression of the F1 Key will cause the second through the eighth line of the directory entry to be printed as an address label on the printer 148 (FIGS. 1 and 2). This is a very quick way of printing address labels, and greatly increases the value of the system.

(ivb) Automatic Dialing of Telephone Number

Depression of the F2 Key will dial the displayed telephone number on the master C unit next to the PC station (address 00000).

(ivc) Electronic Rotary Telephone Number Index

Use of the Page Up and Page Down Keys will move the display forward or backward through the directory one entry at a time, in alphabetical order. The PC operator can move to different sections of the directory by pressing the alphabetical Key on the PC Keyboard which is the same as the section of the directory desired. For example, depression of the "A" Key will move to the beginning of the section of the directory that contains the last names beginning with an A. This feature provides an electronic substitute for a rotary telephone number index or file for every directory.

(v) Copy Directory Entry

To copy a directory entry from an existing directory to another directory, the PC operator begins from Screen 21. Once the Copy Directory Entry section of the program has been selected, a screen like Screen 26 showing alphabetical ranges for the Master Directory will be created.

Since the Master Directory contains all of the possible entries for copying, it will always be the first directory seen when the Copy Directory entry mode is entered. Once an alphabetical range has been selected, a screen like Screen 27 will be created for the Master Directory (not the individual directory shown in Screen 27). From the list of entries thus displayed those to be copied can be selected.

Once all of the entries to be copied have been selected, the F1 Key may be pressed to allow the user to choose which directories will receive the copied entries. After the F1 Key is pressed, the PC operator will be prompted to select the telephone directory or directories that will receive the copied entries from the following screen:

| TELEPHONE MANAGEMENT-DIRECTORY MANAGEMENT-COPY Ver X.X ||
|---|---|
| Telephone Directories ||
| *A.Secretary | J.Shamla Sharma |
| B.Betsy Lab | K.Om Sood |
| C.Steve Smith | L.Brian Beloin |
| D.Nick Dagasto | M.Betsy |
| E.David Chamberlin | N.Walt |
| F.Jy-hong Su | O.Jack Dwyer |
| G.Mark Harris | P.Ernie Hoffman |
| H.Shailai Kambli | Q.All |
| I.John Garay | |

Press [Space-Bar] to move through the list of destination Directories.
Press [Enter] to select the destination Directory(ies).
Press [F1] to copy the selected entries to the selected Directories.
Press [Esc] to disregard selections and return to the previous screen.

SCREEN 29

Once all of the directories which are to receive the copied directory entries have been selected, depression of the F1 Key will copy the entries to the selected directories. The copied entries will now be stored both in the PC and in the individual C machines.

After the depression of the F1 Key, the PC will return to the screen that contains the list of alphabetical ranges so that another range can be selected for copying.

(vi) Send Whole Directory to Phone

The Send Directory to Phone Selection will send a complete C directory (as it is known to the PC) to a particular C telephone. Directory entries that are made at the C machine are not known to the PC unless the entire C directory is uploaded to the PC. When a directory is sent to a particular C telephone, it will overwrite the existing directory.

To select Send Directory to Phone, the PC operator begins from Screen 21. Once this has been done, the PC operator will be shown a list of possible telephone directories which can be sent to individual telephones.

Once all of the directories which are to be sent have been selected, the PC operator may press the F1 Key to send the selected directories to the selected telephones.

The Send Directory to Phone function can be duplicated by using a Programmable Key at each C unit in the network. Depression of a Programmable Key which has been programmed with the feature code #*48 will cause the PC to overwrite that particular C's directory with the directory information it has stored for that particular C unit.

(vii) Receive Whole Directory from Phone

The PC 112 has the ability to upload (i.e., to cause transfer from the C to the PC) of the entire contents of any particular C's directory. This is useful in a situation where several C units have been recently linked together in a D network. All of the existing directories in individual C machines can be uploaded or received at the PC, thus eliminating the need to reenter all of the individual directories.

To use the function, the PC operator begins at Screen 21. Once the Receive Directory from Phone section of the directory management program has been selected, the user will be prompted to select which telephone directory will be received by the PC. A screen (not shown) listing the telephones is provided for this purpose. Key F1 then is pressed to transfer the selected directories to the PC.

The Receive Directory from Phone process can be duplicated at individual C telephones by depression of a Programmable Key which has been programmed with the feature code #*49. Depression of such a key at the C machine will cause the directory that is stored in the C to be received or uploaded to the PC, overwriting the individual directory currently stored in the PC for that C unit.

(viii) Duplicate Whole Directory and Send to Another "C" Unit

The PC is capable of duplicating entire directories from any "C" unit and sending them to any other "C" unit in the network. Once this option has been selected, the following screen will be created:

TELEPHONE MANAGEMENT-DIRECTORY MANAGEMENT-DUPLICATE            Ver X.X

| Directories | | Available Options | |
|---|---|---|---|
| A. Sceretary | J. Shamla Sharma | A. Secretary | J. Shamla Sharma |
| B. Betsy Lab | K. Om Sood | B. Betsy Lab | K. Om Sood |
| C. Steve Smith | L. Brian Beloin | C. Steve Smith | L. Brian Beloin |
| D. Nick Dagasto | M. Betsy | D. Nick Dagasto | M. Betsy |
| E. David Chamberlin | N. Walt | E. David Chamberlin | N. Walt |
| F. Jy-hong Su | O. Jack Dwyer | F. Jy-hong Su | O. Jack Dwyer |
| G. Mark Harris | P. Ernie Hoffman | G. Mark Harris | P. Ernie Hoffman |
| H. Shailai Kambli | | H. Shailai Kambli | Q. All |
| I. John Garay | | I. John Garay | |

Press [Space-Bar] to move through the list of source Directories.
Press [Enter] to select the source Directory.
Press [Esc] to return to the previous screen.

SCREEN 30

At the left side of Screen 30 is a list of Directories which can be used as a source of directory information. Selection of a source directory from Screen 30 is followed by selection of one or more destination directories using another screen (not shown) showing the list of directories listed under "Available Options" in Screen 30.

Once all of the destinations have been selected, the PC operator can duplicate the source directory to all of the selected destination directories by pressing the F1 Key.

(ix) Print Directory

Selection of the Print Directory option produces the following screen:

SCREEN 31

Once a directory has been selected, the PC operator will be prompted to select which of two print options will format the directory printout.

The option "Name and Numbers Only" will, as the name implies, print only the names and telephone numbers stored in that particular directory. The option "All Information" will print all of the directory information stored for all of the directory entries listed. Printout will begin at the printer 148 connected to the PC immediately after a print option has been selected.

(d) Programmable Key Management

The D unit is capable of managing the Programmable Key contents of each C unit connected to the network. Under Programmable Key Management, the PC will be capable of modifying, copying, printing, sending or receiving Programmable Key contents. To use the Programmable Key Management section of the program, the PC operator begins at the top level menu for Telephone Management, Screen 7. This menu appears immediately after selecting Telephone Management from the top level of the Dictaphone Network Manager, Screen 6. Selection of this option produces the following screen listing the various options available:

TELEPHONE MANAGEMENT-DIRECTORY MANAGEMENT-PRINT            Ver X.X

| Directories | | Available Options |
|---|---|---|
| A. Sceretary | J. Shamla Sharma | * Names and Numbers Only |
| B. Betsy Lab | K. Om Sood | * All information |
| C. Steve Smith | L. Brian Beloin | |
| D. Nick Dagasto | M. Betsy | |
| E. David Chamberlin | N. Walt | |
| F. Jy-hong Su | O. Jack Dwyer | |
| G. Mark Harris | P. Ernie Hoffman | |
| H. Shailai Kambli | Q. Master Directory | |
| I. John Garay | | |

Press [Space-Bar] to move to the next Directory.
Press [Enter] to select a Directory to print.
Press [Esc] to return to the previous screen.

TELEPHONE MANAGEMENT-PROGRAMMABLE KEYS MANAGEMENT            Ver X.X

Selections

Modify Key Content
Copy Key Content
Print Key content
Send Keys to Telephone
Receive Keys from Telephone

| A. Secretary | J. Shamla Sharma |
| B. Betsy Lab | K. Om Sood |
| C. Steve Smith | L. Brian Beloin |
| D. Nick Dagasto | M. Betsy |
| E. David Chamberlin | N. Walt |
| F. Jy-hong Su | O. Jack Dwyer |
| G. Mark Harris | P. Ernie Hoffman |
| H. Shailai Kambli | |
| I. John Garay | |

Press [Space-Bar] to view the next Selection.
Press [Enter] to use the Selection: Modify Key Content
Press [Esc] to return to the previous screen.

SCREEN 32

(i) Modify Key Contents

It is possible to change any Programmable Key on any C machine in the D network by using the Modify Key Content option. Once this option has been selected, the user will be presented with a list (not shown) of telephones with Programmable Keys which can be modified.

When a telephone has been selected from that list, the PC operator will be shown the following screen:

SCREEN 33

If the desired Programmable Key does not appear in the table, the Page Down Key can be used to view the remaining Programmable Keys for that particular telephone. Once the desired Programmable Key appears on the screen, it can be selected, and then depression of the Enter Key will allow changes to the selected Key. Once the Enter Key is pressed, the user is shown the Key that was selected, the contents of that particular Key and the contents of the remarks field that follows the Program- TELEPHONE MANAGEMENT-PROGRAMMABLE KEYS-MODIFY-Secretary     Ver X.X

| KEY | CONTENTS | REMARKS |
|-----|----------|---------|
| 01  | **30     |         |
| 02  | **46     |         |
| 03  | **30     |         |
| 04  |          |         |
| 05  |          |         |
| 06  |          |         |
| 07  | **22     |         |
| 08  | **21     |         |
| 09  |          |         |
| 10  |          |         |
| 11  |          |         |

Press [Space-Bar] to move to the next line of the Key Contents.
Press [Enter] to select the Key Contents to change.
Press [PgDn] to see the next page of Key Contents.
Press [Esc] to return to the previous screen.

mable Key, in the following screen:

TELEPHONE MANAGEMENT-PROGRAMMABLE KEYS-MODIFY-TELEPHONE

KEY 01
CONTENTS: #*30
REMARKS: Hello
AVAILABLE FEATURE CODES

| #*01 - Recorder Access | #*10 - Modem Answer | #*30-45 - Inter C Msg. |
| #*02 - Line Select | #*11 - Headset Answer | #*46-Send Msg. to PC |
| #*03 - Voice Message Left | #*12 - AnsaPhone Monitor | #*47-Download Appointments |
| #*04 - Voice Message Right | #*13 - Telephone Billing | #*48-Download Directory |
| #*05 - Electronic Lock | #*14 - Directory Access | #*50-Download Keys |
| #*06 - Delayed Ring | #*21 - Start Network Manager | #*51-Upload Keys |
| #*07 - Hook Flash | #*22 - Deliver Message | |
| #*08 - Modem Connect | #*23 - View Directory Entry | |
| #*09 - RS232 to Network | #*24 thru 29 - Reserved | |

Type in new information in the block:
Press [Enter] to go to the next line.
Press [F1] to save the Changes.
Press [Esc] to return to the previous screen.

SCREEN 34

A cursor will be provided directly after the words "Contents". The user can modify the Contents as well as the Remarks field by changing characters in the display of Screen 34 in the same way as any characters. That is, the Arrow (left or right) Keys can be used to move the cursor to selectively modify a particular character without disturbing the others. The Backspace Key will remove the character the cursor is on. The user may move back and forth between contents and remarks by using the Enter Key or the Arrow Up/Down Keys.

Directly below the Remarks field is a list of all the Available Feature Codes that can be placed in to the Contents field of a Programmable Key. Note that the Contents of a Programmable Key can also contain a telephone number. The telephone number entered into a Programmable Key should be entered exactly as it would be dialed on a C telephone. Pauses are entered as capital P's. Once the contents and remarks fields are correct, depression of the F1 Key will save all of the changes made. Depression of the Escape Key before the F1 Key will ignore the changes made on the screen and the Contents of the Programmable Key will remain unaltered.

The feature codes listed in Screen 34 are divided into three groups:

Key numbers 1–20 are reserved for "C" unit functions only and will not be recognized if sent to the PC.

Feature codes 21–23 are not usable on any of the "C" units alone because they will not appear on the display of any "C" unit; rather, they appear on the PC screen. Therefore, codes 21–23 are usable only when the master "C" unit is next to the PC, in the arrangement shown in FIG. 2, for example.

Feature codes 24–51 are reserved for the "D" unit only.

ii. "C" Programmable Key Feature Codes

The meaning of the feature codes 1–14 which are used and displayed in screen 34 is as follows:

*01. "Recorder Access". This code is used to select the central dictation system 188 (FIG. 1).

*02. "Line Select" is used to select one of several different telephone lines available at the "C" transceiver unit.

*03 and #*04. "Voice Message Left" and "Voice Message Right" are used, respectively to select either the left or the right sound recorder when two "A" units 50 and 51 are used at the same "C" station, in the manner described above.

*05 "Electronic Lock". This is used to set the internal electronic lock on each "C" unit which prevents authorized access to it.

*06, #*07 and #*08. "Delayed Ring", "Hook Flash" and "Modem Connect" are self-explanatory, in view of the above description of the "C" unit.

*09. "RS 232 to Network" Causes switching of the RS 232 port of an interface board for that "C" unit between the network and a peripheral device.

10. "Modem Answer" Causes incoming telephone calls to be routed to a modem for communication or storage in a peripheral device.

11. "Headset Answer" Directs incoming calls to a headset rather than telephone. This enables a transcriptionist to answer the telephone, with the use of the microphone of the the speakerphone to talk into, without removing the headset.

12. "AnsaPhone Monitor" This enables the user of a C unit to listen to incoming calls while they are being recorded in the automatic telephone answering mode of operation. ("AnsaFone" is a registered trademark of Dictaphone Corporation, Rye, N.Y. for automatic telephone answering equipment). This allows the user to selectively "filter" out the calls he wishes to respond to immediately and record those to be returned later.

13. "Telephone Billing" This enables telephone billing information to be transmitted from the "C" unit to the "D" unit.

14. "Directory Access" This code gives the "C" unit access to the directory stored at the "D" unit for that "C" unit for the transfer of directory entries as described above.

At present there are no codes for spaces 15 through 20. They can be used for telephone numbers for for any other function desired.

(iii). Master "C" Programmable Key Feature Codes

21. This code, usable only at the master "C" unit, starts the "D" unit Network Manager program, as indicated at 308 in FIG. 20.

22. "Deliver Message". This code starts the delivery of a message as indicated at 338 in FIG. 25.

23. "View Directory Entry". This code starts the view directory entry routine as indicated at 344 in FIG. 26.

(iv) Programmable Key Feature Codes

The following feature codes can be used only with the D network.

*30–45. A "C" Programmable Key programmed with #*30 through #*45 will cause a text message to be sent between two C machines without PC operator intervention. A #*30 will send a text message to the C machine station next to the PC (with an address of 0). Likewise, a "C" Programmable Key programmed with #*31 will send a message to the station address at 1, etc. The message that is sent to the C display will be a duplication of the message found in the "Remarks" field associated with that programmable key in the PC memory.

*46. A "C" Programmable Key programmed with #*46, when pressed, will cause a message to be sent to the display of the PC. The message that is displayed will correspond to the "Remarks" field stored in the PC for that particular programmable Key. A #*46 will suspend any task under MS—DOS. Depression of any Key will return the operator to the previous task.

*47. Download daily appointments to a "C" unit with a printer attached.

*48. A programmable Key programmed with #*48 will command the PC to down-load a copy of the directory stored for that particular C machine.

*49. A programmable Key programmed with #*49 will cause the PC to upload or receive the entire contents of that C unit's directory so that it can be stored in the PC.

*50. A programmable Key programmed with #*50 will cause the PC to download or send all of the programmable Key contents that it has stored in its memory for a given C unit to that unit C.

*51. A programmable Key programmed with #*51 will cause the PC to receive or upload all of the contents of the programmable Keys programmed at a particular C unit for storage in the PC.

(v) Copy Key Contents From One "C" Unit to Another

The PC operator can copy an entire set of programmable Key contents from one C unit to another. This option is shown in Screen 32 above. Since the procedure for doing this is essentially the same as that described above for copying a whole directory from one C unit to another, it will not be described further here.

The Copy Key Content function can be used to retrieve several sets of programmable Keys for a single C telephone. For Example, a "C" at address 00002 desires two sets of programmable Keys to be saved. There are no C telephones at addresses 15 or 16. However, their programmable Key memories (in the PC) can hold two sets of programmable Keys for the C at address 00002. The Copy function allows retrieval and download capabilities for either set to C2.

(vi) Print Key Contents

It is possible to print the contents of any C telephone's programmable Keys at the printer 148 located next to the PC. Since the procedure used is essentially the same as for printing directory contents, it will not be described here.

(vii) Send Keys to or Receive Keys from Telephone

It is possible to Send a complete set of programmable Keys to the PC, or for the PC to receive such a set from any telephone on the D network by using the Send Keys to Telephone option or the Receive Keys from Telephone option. Since the procedures used for these operations are essentially the same as those described above, respectively, for Sending a Directory to or Receiving a Directory from a telephone, they will not be described further here.

The Send Keys to Telephone function would be used if, for some reason, a particular C machine has lost its programmable Key contents. This situation is possible during a service call. The Send Keys to Telephone process can be duplicated by pressing a programmable Key (on the C) that has been programmed with #*50.

Reception by the PC of all programmable Key contents from the selected telephones will overwrite all of the PC's programmable Key contents for the selected telephones. The Receive Key Contents from Telephone can be duplicated by the depression of the programmable Key that has been programmed with #*51.

6. Appointment Calendar

The D network is capable of storing, editing and deleting calendar appointments for each user in the D network. As appointments or reminders occur, an appropriate message will be transmitted to the selected C unit at pre-programmed alarm times. Appointments may be scheduled from 6:30 a.m. to 11:30 p.m. The calendar may be displayed in a daily, weekly or monthly format.

To use the Appointment Calendar, the PC operator must begin at the Network Manager top level display or Main Menu, Screen 6. That Main Menu, modified to show selection of the appointment Calendar feature, is repeated below, for the sake of convenience, as Screen 35.

---

DICTAPHONE NETWORK MANAGER
Copyright 1986 Dictaphone Corp.                                   Ver X.X Selections Telephone Management
Appointment Calendar
Dictation Log
Voice Messaging
Remote Document Printing

| A. Secretary | J. Shamla Sharma |
| B. Betsy Lab | K. Om Sood |
| C. Steve Smith | L. Brian Beloin |
| D. Nick Dagasto | M. Betsy |
| E. David Chamberlin | N. Walt |
| F. Jy-hong Su | O. Jack Dwyer |
| G. Mark Harris | P. Ernie Hoffman |
| H. Shailai Kambli | |
| I. John Garay | |

---

Press [Space-Bar] to view the next Selection.
Press [Enter] to use the Selection: Appointment Calendar
Press [Esc] to exit the Dictaphone Network Manager.

SCREEN 35

Depression of the Space Bar (or Arrow Up/Down Keys) will move the highlighted field through the list of Selections. When the words "Appointment Calendar" are highlighted, depression of the Enter Key will allow the PC operator access to the Appointment Calendar functions. Depression of the "A" Key on the PC Keyboard will duplicate the Space Bar/Enter Key Selection process.

Once the Appointment Calendar section of the Dictaphone network manager has been entered (either by Enter Key or A Key on the PC Keyboard), the PC operator will be presented with a list of names for which appointment calendar information can be stored in the following screen:

APPOINTMENT CALENDAR                                              Ver X.X

| Name(s) | | Available Options |
|---|---|---|
| A. Sceretary | J. Shamla Sharma | * Add/Change Appointment(s) |
| B. Betsy Lab | K. Om Sood | * Reschedule Appointment(s) |
| C. Steve Smith | L. Brian Beloin | * Next Day Appointment(s) |
| D. Nick Dagasto | M. Betsy | * Last Day Appointment(s) |
| E. David Chamberlin | N. Walt | * Weekly Appointment Calendar |
| F. Jy-hong Su | O. Jack Dwyer | * Monthly Appointment Calendar |
| G. Mark Harris | P. Ernie Hoffman | * Print Appointment(s) |
| H. Shailai Kambli | | |
| I. John Garay | | |

Press [Space-Bar] to move through list of Name(s).
Press [Enter] to see the appointment calendar for: Secretary.
Press [Esc] to return to the previous screen.

SCREEN 36

Once a particular name has been selected, the PC operator will have access to all of the Appointment Calendar options for that particular name. A description of those options follows.

(a) Add/Change Appointment

It is possible to add or change appointments for any C telephone user in the D network. To use the Add/Change Appointment function, the PC operator begins at Screen 36. By selection of the Appointment Calendar option for a particular name or telephone, the following screen is generated:

Calendar information. To the right of the Selections appears a small portion of the Appointment Calendar which includes 5½ hours of a given day's appointments. The information shown will be for the current day when the Appointment Calendar has been entered for the first time. If the day is altered after that point, it will remain altered until the Appointment Calendar function is exited. When the Add/Change Appointment Selection has been selected, depression of the Enter Key will allow the user to begin the Add/Change appointment process. The user will be prompted to select a date for which appointments can be added or changed. The Selection list will be replaced with the words "Type Date" followed by the date shown previously, as in the APPOINTMENT CALENDAR-Secretary -     Ver X.X

| Selections | TIME | Mar 6, 1986 |
|---|---|---|
| Add/Change Appt | 06:30 AM | |
| Reschedule Appt | 07:00 AM | |
| Next Day Appt | 07:30 AM | |
| Last Day Appt | 08:00 AM | |
| Weekly Appt Calendar | 08:30 AM | This is a test for remote appt. alarm |
| Monthly Appt Calendar | 09:00 AM | |
| Print Appointment(s) | 09:30 AM | |
| | 10:00 AM | |
| | 10:30 AM | test for rescheduling |
| | 11:00 AM | |
| | 11:30 AM | |

Press [Space-Bar] to view the next Selection.
Press [Enter] to use the current Selection: Add/Change Appt
Press [PgDn] to see the next page of daily appointments.
Press [PgUp] to see the previous page of daily appointments.
Press [Esc] to return to the previous screen.

SCREEN 37

On the left hand side of Screen 37 is a list of Selections that can be used to manipulate the Appointment following screen:

APPOINTMENT CALENDAR-Secretary -Add/Change     Ver X.X

Type Date: 06/Mar/86

| TIME | Mar 6, 1986 |
|---|---|
| 06:30 AM | |
| 07:00 AM | |
| 07:30 AM | |
| 08:00 AM | |
| 08:30 AM | This is a test for remote appt. alarm |
| 09:00 AM | |
| 09:30 AM | |
| 10:00 AM | |
| 10:30 AM | test for rescheduling |
| 11:00 AM | |
| 11:30 AM | |

Type in new Date for adding or changing appointments.
Press [Enter] to add or change appointments for the selected Date.
Press [PgDn] to see the next page of daily appointments.
Press [PgUp] to see the previous page of daily appointments.
Press [Esc] to return to the previous screen.

SCREEN 38

The date now can be changed in the same way as any other characters on the screen. Note that when the date is changed, the portion of the Appointments Calendar that is visible to the right of the date will not change. The date of the Appointment Calendar that is displayed is the same as the one shown on the previous screen. The entire contents of that particular day can be viewed by using the Page Up or Page Down Keys.

Once the date that is desired is typed correctly after the words "Type Date", the PC operator may view the appointments for that particular day by pressing the Enter Key. Once the Enter Key has been depressed, the user will be shown an expanded table of the appointments for that particular day, as in the following screen:

time at which a text message identifying the appointment as in the center column of Screen 39 is to be delivered to the appropriate "C" unit.

To add or change appointments for the day, the desired time slot must first appear on the screen. The Page Up and Page Down Keys can be used to move through the hours available for appointments. When the desired time appears in the time column, the Enter Key is pressed to move the highlighted field to the desired time. A cursor will appear on the left hand edge of the center column. If an appointment exists for that time slot, it can now be edited, and if an appointment does not exist, one may be added.

There are 40 characters available for adding or editing appointments. If an appointment is being edited, note that the first depression of the Space Bar Key will remove the old appointment entirely. In the case of a APPOINTMENT CALENDAR-Secretary    -Add/Change

| TIME | Jan 1, 1980 | LEN | ALARM |
|---|---|---|---|
| 06:30 AM | | | |
| 07:00 AM | | | |
| 07:30 AM | | | |
| 08:00 AM | | | |
| 08:30 AM | | | |
| 09:00 AM | | | |
| 09:30 AM | | | |
| 10:00 AM | | | |
| 10:30 AM | | | |
| 11:00 AM | | | |
| 11:30 AM | | | |

Type in new appointment or changes. Type [Tab] to change length.
Press [Enter] to move to the next appointment time.
Press [F1] to save the new appointment(s) or changes.
Press [F2] to dial the number in the current appointment.
Press [PgDn] to see next page, or [PgUp] to see previous page of appointments.

SCREEN 39 the Time column lists, in sequential order, by half-hour increments, the time of day for particular appointments. Appointments for any particular day can be shown in three ranges; each can be accessed by using the Page Up and Page Down Keys.

The column directly under the date (the center column) lists all of the appointments scheduled for that particular date. The LEN column specifies the length of the appointment. The ALARM column indicates the new appointment, as soon as the first character is entered in the center column, the default parameters for length (LEN) and alarm times will appear. The default for length is 30 minutes, and the Alarm Time is preset to five minutes before the appointment time.

Once the text in the center column is correct, the user may move to the length column by pressing the Tab Key. The length field (LEN) will accept characters in the hours and minutes format separated by a colon. The length field will accept any digits entered into it. The interpretation of those digits will be as follows; lengths that are not equal to specific half-hour increments will be rounded up to the next highest half-hour. Lengths entered in the minutes field, if they are greater than 30, will be converted into the correct number of half-hour intervals.

Once the length field is correct, the user may move to the Alarm column by pressing the Tab Key. The alarm field, like the length field, will accept any characters entered into it, however, if the time that is entered does not conform to the HH:MM format followed by AM or PM for a time that exists within the day of the appointment, the alarm feature will not operate. Alarm times are not restricted to half-hour intervals.

When an appointment is entirely correct (columns under date, length and alarm are filled out correctly), depression of the Enter Key will move the cursor from that appointment and the appointment is set. The time slots that follow the appointment in the center column will contain arrows in each half-hour segment. The user may now add or change appointments. Once all additions or changes are made for the appointments currently being displayed, it is necessary to press the F1 Key to change to save the changes on the screen.

(b) Telephone Dialing From the Appointment Calendar

As it is indicated in the instructions at the bottom of Screen 39, depression of the F2 Key will dial a telephone number that has been entered in the center column of the selected appointment. The call will be placed on the "master" "C" unit next to the PC 112. The first digit that appears in the appointment (from left to right) will be considered to be the beginning of the telephone number. All digits that follow it will be dialed when the F2 Key is pressed. This feature is particularly useful when contacting persons to confirm or change appointments.

(c) Rescheduling Appointments

It is possible to move an appointment to another date or time using the Reschedule Appointment function. The date and time that an appointment is going to be rescheduled to should be known before entering this function since other portions of this calendar are not then visible. To use the Reschedule Appointment function, the PC operator begins at Screen 37. Once the Rescheduled Appointment option has been selected, the user will be shown an expanded Appointment Calendar for the date shown, as in the following screen:

APPOINTMENT CALENDAR-Secretary  -RESCHEDULE    Ver X.X

| TIME | Mar 6, 1986 | LEN | ALARM |
|---|---|---|---|
| 06:30 AM | | | |
| 07:00 AM | | | |
| 07:30 AM | | | |
| 08:00 AM | | | |
| 08:30 AM | This is a test for remote appt. alarm | 00:30 | 08:25AM |
| 09:00 AM | | | |
| 09:30 AM | | | |
| 10:00 AM | | | |
| 10:30 AM | test for rescheduling | 01:30 | 10:25AM |
| 11:00 AM | | | |
| 11:30 AM | | | |

Press [Space-Bar] to move block to next appointment.
Press [Enter] to select an appointment for rescheduling.
Press [PgDn] to see the next page of daily appointment(s).
Press [PgUp] to see the previous page of daily appointment(s).
Press [Exc] to return to the previous screen.

SCREEN 40

After the appointment to be rescheduled has been selected, the following screen appears:

APPOINTMENT CALENDAR-Secretary  -RESCHEDULE    Ver X.X

| TIME | Mar 6, 1986 | LEN | ALARM |
|---|---|---|---|
| 08:30 AM | This is a test for remote appt. alarm | 00:30 | 08:25AM |

Enter new appointment date : 07/Mar/86
Enter new appointment time : 08:30AM
Enter new appointment : This is a test for remote appt. alarm
Enter new appointment length : 00:30
Enter new alarm time : 08:25AM Press [Enter] to move block to the next line
Press [F1] to reschedule appointment.
Press [F2] to reschedule appointment and to replace original appointment.
Press [Esc] to return to the previous screen.

SCREEN 41

The date of the appointment can be edited in the usual way. Once the date is correct, depression of the Enter Key will move the highlighted field to the next appointment parameter. Each parameter can be edited in this manner.

Once the new appointment information is correct, the PC operator can press the F1 Key to create a new appointment at the date and time just entered. The old appointment which appears in the box at the top of the screen will be removed. The previous screen will reappear so that other appointments on the same day can be rescheduled. Depression of the F2 Key, once all of the new appointment information has been entered, will create a new appointment at the time and date just entered and allow the user to replace the original appointment with a new appointment. Once the F2 Key has been pressed, the new appointment information will be entered, stored in the calendar and the following screen will appear:

APPOINTMENT CALENDAR-Secretary   -RESCHEDULE      Ver X.X

| TIME | Mar 6, 1986 | LEN | ALARM |
|---|---|---|---|
| 06:30 AM | replace original appointment | | |
| 07:00 AM | | | |
| 07:30 AM | | | |
| 08:00 AM | | | |
| 08:30 AM | | | |
| 09:00 AM | | | |
| 09:30 AM | | | |
| 10:00 AM | | | |
| 10:30 AM | test for rescheduling | 01:30 | 10:25AM |
| 11:00 AM | | | |
| 11:30 AM | | | |

Type in new appointment or changes. Type [Tab] to change length.
Press [Enter] to move to the next appointment time.
Press [F1] to save the new appointment(s) or changes.
Press [PgDn] to see the next page of daily appointments.
Press [PgUp] to see the previous page of daily appointments.
Press [Esc] to disregard the changes and return to the previous screen.

SCREEN 42

The portion of the appointment that is now displayed will show the date and time of the old appointment (the one that required rescheduling). The PC operator is now allowed to enter a new appointment in its place. The PC operator may enter a new appointment by following the procedure outlined in the Add/Change Appointment description above. Once the new appointment has been entered, depression of the F1 Key will add the new appointment to the calendar. After the F1 Key is depressed, Screen 40 reappears. The PC operator is now free to reschedule other appointments for that particular date.

(d) Next Day Appointments

It is possible to advance to the next day of any appointment calendar by using the Next Day Appointment function. To use this function, the PC operator begins at Screen 37, selects the function, and thus creates this screen:

APPOINTMENT CALENDAR-Secretary -                 Ver X.X

Selections

| TIME | Mar 7, 1986 |
|---|---|
| 06:30 AM | |
| 07:00 AM | |
| 07:30 AM | |
| 08:00 AM | |
| 08:30 AM | This is a test for remote appt. alarm |
| 09:00 AM | |
| 09:30 AM | |
| 10:00 AM | |
| 10:30 AM | |
| 11:00 AM | |
| 11:30 AM | |

Add/Change Appt
Reschedule Appt
Next Day Appt
Last Day Appt
Weekly Appt Calendar
Monthly Appt Calendar
Print Appointment(s)

Press [Space-Bar] to view the next Selection.
Press [Enter] to use the current Selection : Next Day Appt
Press [PgDn] to see the next page of daily appointments
Press [PgUp] to see the previous page of daily appointments.
Press [Esc] to return to the previous screen

SCREEN 43

When the Next Day Appointment Selection has been made, Screen 43 shows that depression of the Enter Key will allow the user to advance the Appointment Calendar displayed at the right by one day. Depression of the "N" Key on the PC Keyboard will duplicate the Space Bar/Enter Key selection process. Repeated depressions of the Enter Key or the "N" Key will advance, one day at a time, through the Appointment Calendar. Note that the date that remains at the top of the Appointment Calendar will remain the same unless it is adjusted by another function) until the user exits the Appointment Calendar function.

(e) Previous Day Appointments

It is possible to move the Appointment Calendar backward by one day by using the Previous Day Appointment function. This is done in the same way as viewing Next Day Appointments, except that "Last Day Appt" is selected from Screen 37, rather than "Next Day Appt". Depression of the Enter Key will move the Appointment Calendar back one calendar day. The "L" Key on the PC Keyboard will duplicate the Space Bar/Enter Key Selection process. Repeated depression of the Enter Key or the "L" Key will move the Appointment Calendar shown back one calendar day for each depression.

(f) Weekly Appointment Calendar

It is possible to format the Appointment Calendar so that an entire week of appointments can be viewed on one display. To use the Weekly Appointment Calendar function, the PC operator begins with Screen 37. When the "Weekly Appt Calendar" has been selected, the following screen is displayed:

SCREEN 44

Screen 44 lists all of the appointments for the selected week.

(i) Add/Change Appointment (Weekly)

It is possible to add an appointment to the Appointment Calendar or change an existing appointment in the Weekly Calendar Display.

At the left hand side of the screen is a list of Selections. When the Add/Change Appointment option has been selected, depression of the Enter Key will allow the user to select a date for adding or changing appointments, as in Screen 45:

APPOINTMENT CALENDAR-Secretary    WEEKLY

Type Date : 01/Jan/80

WEEK BEGINNING - Dec 31, 1979

| TIME | Mon 31 | Tue 1 | Wed 2 | Thu 3 | Fri 4 |
|---|---|---|---|---|---|
| 06:30 AM |  | this is |  |  |  |
| 07:00 AM |  |  |  |  |  |
| 07:30 AM |  |  |  |  |  |
| 08:00 AM |  |  |  |  |  |
| 08:30 AM |  |  |  |  |  |
| 09:00 AM |  |  |  |  |  |
| 09:30 AM |  |  |  |  |  |
| 10:00 AM |  |  |  |  |  |
| 10:30 AM |  |  |  |  |  |
| 11:00 AM |  |  |  |  |  |
| 11:30 AM |  |  |  |  |  |

Type in new Date for adding or changing appointments.
Press [Enter] to add or change appointments for the selected Date.
Press [PgDn] to see the next page of daily appointments.
Press [PgUp] to see the previous page of daily appointments.
Press [Esc] to return to the previous screen.

SCREEN 45 the date can be changed in the usual way.

A cursor will be provided underneath the first digit of the date. The Arrow Keys (left or right) will move the cursor through the date to change a single digit or letter. The Backspace Key will delete one character from the date and move the cursor one space to the left. The Tab Key will move the cursor to the beginning of each field of the date (DD/MMM/YY). If a day only has a single digit in it, it should be preceded by a 0. The ab- APPOINTMENT CALENDAR-Secretary   -WEEKLY                Ver X.X

| Selections | TIME | WEEK BEGINNING - Mar 3, 1986 | | | | |
|---|---|---|---|---|---|---|
|  |  | Mon 3 | Tue 4 | Wed 5 | Thu 6 | Fri 7 |
| Add/Change Appt | 06:30 AM |  |  |  | replace |  |
|  | 07:00 AM |  |  |  |  |  |
| Next Week | 07:30 AM |  |  |  |  |  |
|  | 08:00 AM |  |  |  |  |  |
| Previous Week | 08:30 AM |  |  |  |  | This is |
|  | 09:00 AM |  |  |  |  |  |
|  | 09:30 AM |  |  |  |  |  |
|  | 10:00 AM |  |  |  |  |  |
|  | 10:30 AM |  |  |  | test fo |  |
|  | 11:00 AM |  |  |  |  |  |
|  | 11:30 AM |  |  |  |  |  |

Press [Space-Bar] view the next Selection.
Press [Enter] to use the Selection : Add/Change Appt
Press [PgDn] to see the next page of weekly appointments.
Press [PgUp] to see the previous page of weekly appointments.
Press [Esc] to return to the previous screen.

breviations for months are as follows: JAN, FEB, MAR, APR, MAY, JUN, JUL, AUG, SEP, OCT, NOV and DEC. Note that when the date is changed, the portion of the Appointment Calendar that is visible to the right of the date will not change. Once the date that is desired appears correctly after the words "Type Date", the PC operator may view the appointments for that particular day by pressing the Enter Key. Once the Enter Key has been depressed, the user will be shown an expanded table of appointments for that particular day, as in the following screen:

APPOINTMENT CALENDAR-Secretary   WEEKLY

| TIME | Jan 1, 1980 | LEN | ALARM |
|---|---|---|---|
| 06:30 AM | this is an appointment | 00:30 | 07:25AM |
| 07:00 AM | | | |
| 07:30 AM | | | |
| 08:00 AM | | | |
| 08:30 AM | | | |
| 09:00 AM | | | |
| 09:30 AM | | | |
| 10:00 AM | | | |
| 10:30 AM | | | |
| 11:00 AM | | | |
| 11:30 AM | | | |

Type in new appointment or changes. Type [Tab] to change length.
Press [Enter] to move to the next appoointment time.
Press [F1] to save the new appointment(s) or changes.
Press [F2] to dial the number in the current appointment.
Press [PgDn] to see next page, or [PgUp] to see previous page of appointments.

SCREEN 46

The user may now add or change appointments for the dates shown in the manner described above to Add/Change appointment. Once the correct appointment information appears on the screen, depression of the F1 Key will save the new appointments or changes. Depression of the F2 Key will dial a telephone number that has been entered into the highlighted appointment.

(ii) Next Week

It is possible to advance the weekly calendar display forward by one week increments by using the Next Week Selection. To use the Next Week function, the user begins with Screen 44. Depression of the Space Bar (or Arrow Up/Down Keys) will move the highlighted field through the list of Selections. When the words "Next Week" are highlighted, depression of the Enter Key will advance the Weekly Calendar shown at the right by one week. Depression of the "N" Key on the PC Keyboard will duplicate the Space Bar/Enter Key Selection process. Multiple depressions of the Enter Key or the "N" Key will continuously advance the Weekly Calendar shown at the right by one week intervals. Once the Weekly Calendar that is desired is displayed, the Page Up and Page Down Keys will allow the PC operator to view the entire day's list of appointments for each day shown.

(iii) Previous Week

When the appointment calendar is being viewed in the weekly format, it is possible to move backwards through the calendar by one week intervals by using the Previous Week Selection. To use the Selection, Screen 44 is displayed. Once the Selection, Previous Week, is highlighted, the user may press the Enter Key to cause the weekly appointment calendar at right to display the previous week's appointments. Depression of the "P" key on the PC keyboard will duplicate the Space Bar/Enter Key Selection process. Each time the P key or the Enter Key is depressed, the weekly calendar will move backward in one week increments. Once the desired week is displayed, the PC operator may use the Page Up or Page Down keys to look through the entire day's list of appointments for each day shown.

(g) Monthly Appointment Calendar

It is possible to determine which days over a two month time span contain appointments by using the Monthly Appointment Calendar function. To use the Monthly Appointment Calendar function, the PC operator begins at Screen 44 and selects the desired function, creating this screen:

APPOINTMENT CALENDAR-Secretary -          Ver X.X

Selections

Add/Change Appt
Reschedule Appt
Next Day Appt
Last Day Appt
Weekly Appt Calendar
Monthly Appt Calender
Print Appointment(s)

Available Options

* Add/Change Appointment(s)
* Next Month
* Last Month

Press [Space-Bar] to view the next Selection.
Press [Enter] to use the current Selection : Monthly Appt Calendar
Press [PgDn] to see the next page of daily appointments.
Press [PgUp] to see the previous page of daily appointments.
Press [Esc]to return to the previous screen.

SCREEN 46(a)

On the left hand side of the screen, there is a list of Selections. Depression of the Space Bar (or Arrow Up/Down) will move the highlighted field through the list of Selections. When the monthly Appointment Calendar Selection is highlighted, depression of the Enter Key will allow the user to see a two month section of the Appointment Calendar. Depression of the "M" Key on the PC Keyboard will duplicate the Space Bar-/Enter Key Selection process.

Once the Monthly Appointment Calendar application has been selected, the user will be presented with Screen 47, which contains a list of Selections to the left of the screen and a two month condensed version of the appointment calendar on the right. Each day that contains at least one appointment will be highlighted on the calendar, that is, the background behind each date will be lighted brightly to make it stand out from the other dates. Then, if details regarding the appointments on those dates are required, the D unit user can use the daily or weekly appointment review features described above.

The selections to the left of the appointment calendar will allow the user to add or change appointments for any particular day or move forward or backward (by using "Next Month" or "Previous Month") through the Appointment Calendar.

(h) Add/Change Appointment (Monthly)

It is possible to add or change appointments from the Monthly Calendar portion of the Appointment Calendar program.

APPOINTMENT CALENDAR-Secretary -MONTHLY     Ver X.X

Selections         Mar 6, 1986

| | Mar | Apr |
|---|---|---|
| Add Change Appt | S M T W T F S | S M T W T F S |
| |                1 |     1 2 3 4 5 |
| Next Month | 2 3 4 5 6 7 8 | 6 7 8 9 10 11 12 |
| | 9 10 11 12 13 14 15 | 13 14 15 16 17 18 19 |
| Previous Month | 16 17 18 19 20 21 22 | 20 21 22 23 24 25 26 |
| | 23 24 25 26 27 28 29 | 27 28 29 30 |
| | 30 31 | |

Press [Space-Bar] to move to the next Selection.
Press [Enter] to use the selection : Add/Change Appt
Press [Esc] to return to the previous screen.

SCREEN 47

To use the Add/Change Appointment function (at the Monthly Appointment Calendar level), the user selects the Add/Change Appointment feature. The following screen appears:

APPOINTMENT CALENDAR-Secretary   MONTHLY

Type Date : 01/Jan/80        Jan 1, 1980

| Jan | Feb |
|---|---|
| S M T W T F S | S M T E T F S |
|     1 2 3 4 5 |             1 2 |
| 6 7 8 9 10 11 12 | 3 4 5 6 7 8 9 |
| 13 14 15 16 17 18 19 | 10 11 12 13 14 15 16 |
| 20 21 22 23 24 25 26 | 17 18 19 20 21 22 23 |
| 27 28 29 30 31 | 24 25 26 27 28 |

Type in new Date for adding or changing appointments.
Press [Enter] to add or change appointments for the selected Date.
Press [Esc] to return to the previous screen.

SCREEN 48

The date is Screen 48 can be changed in the usual way. Once the desired date is typed correctly after the words "Type Date", the PC operator may view the appointments for that particular day by pressing the Enter Key. Once the Enter Key has been depressed, the user will be shown an expanded table of appointments for that particular day, as in Screen 49:

APPOINTMENT CALENDAR-Secretary   MONTHLY

| TIME | Jan 1, 1980 | LEN | ALARM |
|---|---|---|---|
| 06:30 AM | this is an appointment | 00:30 | 07:25AM |
| 07:00 AM | | | |
| 07:30 AM | | | |
| 08:00 AM | | | |
| 08:30 AM | | | |
| 09:00 AM | | | |
| 09:30 AM | | | |
| 10:00 AM | | | |
| 10:30 AM | | | |
| 11:00 AM | | | |
| 11:30 AM | | | |

-continued

Type in new appointment or changes. Type [Tab] to change length.
Press [Enter] to move to the next appointment time.
Press [F1] to save the new appointment(s) or changes.
Press [F2] to dial the number in the current appointment.
Press [PgDn] to see next page, or [PdUp] to see previous page of appointments.

SCREEN 49

The user may now add or change appointments for the dates shown as described above for weekly or daily appointments. Once the correct appointment information appears on the screen, depression of the F1 Key will save the new appointments or changes. Depression of the F2 Key will dial a telephone number that has been entered into the highlighted appointment.

(ii) Next Month

It is possible to move through the Appointment Calendar at the monthly level one month at a time by using the Next Month function. Since this function operates in the same way as the "Next Week" function, it will not be described further.

(iii) Previous Month

When the Appointment Calendar is being viewed in the monthly format, it is possible to move backward through the calendar month by month by using the Previous Month Selection. Since this function operates like the "Previous Week" function, it will not be described further.

(h) Print Appointments

It is possible to print a list of daily appointments for any C telephone user on the D network. To use the Print Appointments function, the PC operator begins at Screen 37.

When the Print Appointments Selection is highlighted, depression of the Enter Key will allow the user to begin printing appointments for the dates shown at the top of the Appointment Calendar. Print out will occur on the printer 148 connected to the PC. The printout will contain a time column, a date column (which contains the appointment information), the length of each appointment and the alarm time set for each appointment, in the format shown in Screen 39. Appointments for an entire day will be printed along with the words "daily appointments for" followed by the name of the C telephone user.

(i) Appointment Schedule Display on "C" Unit

It is within the scope of this invention to enable the computer to transmit schedules of appointments to be displayed on the individual displays of the transceiver 10. If the entire date will not fit on the display, the display information can be stored in the memory of the unit 10 and scrolled forwardly and backwardly to view the whole schedule.

It also is within the scope of this invention to program one or more of the programmable keys of the "C" unit to retrieve daily, weekly or monthly appointment schedules from the PC and display them on the display 16 of the "C" unit.

7. Dictation Log

The PC maintains a Dictation Status Table and Time Order to monitor dictation activities on C/A machines in the Network. As dictation is completed on a C/A unit, a message is transmitted to the PC indicating the need for transcription. This message, the C Unit Number (or the name associated with that telephone), Date/Time, and Work Type designation. This information will be stored in a Status Table. Dictation will appear in the Status Table, whether it is dictated locally by the C machine or remotely (when the C machine is in the remote dictation mode). To use the features associated with the Dictation Log, the user must begin at the top level display or Main Menu, Screen 6.

The above information can be viewed, displayed in reverse time order, erased and printed, in the same way as the Messages Delivered log. The description of those procedures will not be repeated here.

8. Voice Messaging

The Dictaphone Network Manager has the capability of providing a status table for all voice messages that are recorded when any given C/A unit is in the auto answer mode.

To use this feature, the "Voice Messaging" option is selected from the Main Menu (Screen 6).

As with other telephone calls and dictation, the voice messaging data can be viewed in greater detail, erased, viewed in reverse time order, and printed.

The type of information contained in the voice messaging log is essentially the same as for the telephone call log described above and will not be repeated here.

9. Remote Document Printing

It is possible to print any document created under MS—DOS at any C machine which has a printer attached, except for the one sitting next to the PC (address 0). To use the Remote Document Printing function, the user must begin at the top level screen of the Dictaphone Network Manager, i.e., the Main Menu, Screen 6.

When the Selection "Remote Document Printing" is highlighted, depression of the Enter Key will activate the Remote Document Printing function. Note that depression of the "R" Key on the PC Keyboard will duplicate the Space Bar/Enter Selection process. Once the Remote Document Printing section of the program has been entered (either by Enter Key or "R" Key on the PC Keyboard), the user will be presented with a list of Selections related to Remote Document Printing, as in the following screen:

REMOTE DOCUMENT PRINTING-   Ver X.X

| Selections | Available Options |
|---|---|
| Type Name of Document to Print — Abort Print Request Change Print Directory | Type Document Name to Print : |

Press [Space-Bar] to view the next selection.
Press [Enter] to use the selection: Type Name of Document to Print
Press [Esc] to go to previous screen.

SCREEN 50

(a) Type Name of Document to Print

The Type Name of Document to Print Selection will allow the PC operator to begin the Remote Document Printing process. As the name of the Selection implies, the user will be required to type in a name of an existing document so that the remote document printing program can redirect that document to a remote printer. The PC operator must know the exact name of the desired document in order to print that document. The PC operator must also know the directory in which the document exists. To use the Type Name of Document to Print Selection, press the Space Bar (or Arrow Up/Down Keys) to move the highlighted field through the list of Selections. When the Selection, Type Name of Document to Print, is highlighted, depression of the Enter Key will allow the user to Enter the name of the document that is to be printed. Note that the Space Bar/Enter Key Selection process may be duplicated by pressing the "T" Key on the PC Keyboard. Once the Type Name of Document to Print Selection has been activated, the PC screen will change to allow the user to enter the document name, as in the following screen:

REMOTE DOCUMENT PRINTING-TYPE NAME OF DOCUMENT          Ver X.X

Type Name of Document to Print :
rund.bat

| A. Secretary | J. Shamla Sharma |
|---|---|
| B. Betsy Lab | K. Dm Sood |
| C. Steve Smith | L. Brian Beloin |
| D. Nick Dagasto | M. Betsy |
| E. David Chamberlin | N. Walt |
| F. Jy-hong Su | O. Jack Dwyer |
| G. Mark Harris | P. Ernie Hoffman |
| H. Shailai Kambli | |
| I. John Garay | |

Type Name of Document to Prnt in the block
Press [Enter] to select th receiver of the Document,
Press [Esc] to return to the previous screen.

SCREEN 51

The PC operator is now allowed to type in the document name exactly as it appears in an MS—DOS directory. The Backspace Key can be used to delete a single character and move the cursor back one space to the left. The Arrow Keys (right or left) can be used to edit a single character without disturbing the ones around it. Once the name appears correctly in the block, the PC operator can press the Enter Key to select the receiver of the document, as in Screen 52.

| REMOTE DOCUMENT PRINTING-TYPE NAME OF DOCUMENT-RECEIVER Ver X.X ||
|---|---|
| Receiver(s) ||
| A.Secretary | J.Shamla Sharma |
| B.Betsy Lab | K.Om Sood |
| *C.Steve Smith | M.Betsy |
| D.Nick Dagasto | N.Walt |
| E.David Chamberlin | O.Jack Dwyer |
| F.Jy-hong Su | P.Ernie Hoffman |
| G.Mark Harris | Q.ALL |
| H.Shailai Kambli | |
| I.John Garay | |

Press [Space-Bar] to move through list of telephone names.
Press [Enter] to select : Steve Smith (Repeat above steps for selecting multiple receivers)
Press [F1] to start printing.
Press [Esc] to disregard the selection(s) and return to the previous screen.

SCREEN 52

The center portion of the new screen will display a list of possible recipients for Remote Document Printout. Press the Space Bar to move through the list to the desired receiver, press the Enter Key to select a receiver for Remote Document Printing. As asterisk will appear next to all receivers that are selected. Several receivers may be selected by using the Space Bar to highlight the receiver and the Enter Key to select it. A receiver may be de-selected (taken off the selected list for Remote Document Printing) by using the Space Bar to move to the desired receiver and pressing the Enter Key to de-select that receiver. The asterisk next to a particular will now disappear. Receivers may be selected or de-selected by using the PC Keyboard.

The user may select the receiver next to the capital letter A on the list by pressing the "A" Key on the Keyboard. Similarly, the recipient next to the letter "A" may be de-selected by pressing the letter "A" Key on the Keyboard again. Once all the desired receivers, for Remote Document Printing have been selected, the user may begin Remote Document Printout by pressing the F1 Key. If the Escape Key is pressed before the F1 Key is pressed, the Selections made on this screen will be ignored and the user will be returned to the previous screen.

(b) Stop Print Out

The PC operator may stop any printout in progress by using the Stop Print Out function. To use the Stop Print Out function, the user must begin at the top level screen for Remote Document Printing. Depression of the Space Bar (or Arrow Up/Down Keys) will move the highlighted field through the list of Selections. When the Selection, Stop Print Out, is highlighted, the user may press the Enter Key to bring up Screen 53, which allows one to select which printout will be stopped. Once the Stop Printing function has been activated, the user will be presented with a list in Screen 53 of print requests that are still being executed by the Network Manager. The PC operator may select one or all of the printouts in progress for cancellation.

| REMOTE DOCUMENT PRINTING- | Ver X.X |
|---|---|
| Selections | Available Options |
| Type Name of Document to Print<br>Abort Print Request<br>Change Print Directory | No print request queued. |

Press [Space-Bar] to view the next selection.
Press [Enter] to use the selection: Abort Print Request
Press [Esc] to go to previous screen.

SCREEN 53

(iii) Change Print Directory

The Dictaphone Network Manager is able to print documents that exist in the current directory. The current directory is the one that was left behind when the Dictaphone Network Manager was activated. It is possible to complete a document using a work processing program running under MS—DOS and immediately enter the Dictaphone Network Manager (See Programmable Key) and cause a Remote Document Printout without changing the directory. However, if the directory that the PC operator was in at the time of entry to the Dictaphone Network Manager program is not the same directory that holds the document that will be printed remotely, the user must change directories to accommodate the remote document printing function.

It is possible to change directories without exiting the Dictaphone Network Manager by using the Change Print Directory function. To use the Change Print Directory function (see Screen 54), press the Space Bar (or the Arrow Up/Down Keys) to move the highlighted field through the list of Selections. When the Selection Change Print Directory is highlighted, the user may press the Enter Key to activate the Change Print Directory function.

The Space Bar/Enter Key Selection process can be duplicated by pressing the C Key on the PC Keyboard. Once the Change Print Directory function has been entered, the PC screen will change to show the user the current directory and allow the directory to be changed to accommodate Remote Document Printing, as in Screen 55.

| REMOTE DOCUMENT PRINTING- | Ver X.X |
|---|---|
| Selections | Available Options |
| Type Name of Document to Print<br>Abort Print Request<br>Change Print Directory | Please type new print directory :<br><br>Current print directory is :<br>\d_soft |

Press [Space-Bar] to view the next selection.
Press [Enter] to use the selection: Change Print Directory
Press [Esc] to go to previous screen.

SCREEN 54

| REMOTE DOCUMENT PRINTING-Change Print Directory Ver X.X. |
|---|
| Current Print Directory is : C:/d_soft<br>Type in new Print Directory : C:/DICTADAT |

Type in new Print Directory in the block
Press [Enter] to use new Print Directory.
Press [Esc] to return to the previous screen.

SCREEN 55

The user is prompted to type in a new Print Directory. The Backspace Key may be used to delete on character on the screen and move the cursor back one space. The Arrow keys (right or left) can be used to edit a single character without disturbing the ones around it. Once the directory name that is desired appears correctly on the screen, the user may press the Enter Key to use the new print directory for Remote Document Printing.

10. Backing Up the D on Floppy Disk

It is possible to save all of the Directory Information, Telephone Accounting Dictation Log, Appointments and so on (in effect, everything stored on the hard disk) on a floppy disk. These floppy disks may be used for records or transferral of D Network Managers to different computers. The backup function is an MS DOS command. Entry of an appropriate command will copy all of the files stored on the hard disk that pertain to the current D Network Manager to a floppy disk inserted in drive 144 (FIGS. 1 and) of the PC112.

The Dictaphone Network Manager can be returned to the hard disk (overwriting the files currently stored there if a Network Manager has been previously installed) by executing another command followed by a depression of the Enter Key. This command will take all of the files stored on a floppy disk and transfer them to the Network Manager installed in Drive 146, the hard disk drive.

XIV CONCLUSION

In conclusion, the network and method described above admirably meet the objectives set forth above. The invention provides a relatively low-cost versatile communications network and method of handling office tasks; including dictation, telephone communications, message handling appointment reminders, and many others.

Specific embodiments of the invention have been set forth above in order to describe the best mode contemplated by the inventors for practicing their invention, but should not be read in limitation of the scope of the claims.

We claim:

1. A communications network, said network comprising, in combination, a plurality of telephone transceiver units, each having visual display means, a control computer, and means for interconnecting said computer and said transceiver units so that said transceiver units can be used in telephone communications and can receive and display in text form information received from said control computer, said control computer being adapted to store and retrieve information regarding the times for appointments for users of said transceiver units and to transmit and display on a selected one of said transceiver units information regarding said appointments.

2. A network as in claim 1 in which each of said transceiver units is adapted to transmit dictation to and from sound recording and reproducing means, whereby the unit can be used for telephone communications, as a dictation terminal, and as a means for displaying appointment information.

3. A network as in claim 1 in which said control computer is adapted to automatically send a reminder alarm and message for display by a selected one of said transceiver units before each of said appointments.

4. A network as in claim 1 in which each of said transceiver units includes means for retrieving and displaying schedules of appointments for the user of one of said transceivers on the display means of that transceiver unit.

5. A network as in claim 1, said display on said transceiver unit being of relatively limited size, said transceiver unit including means for scrolling said display forwardly or backwardly.

6. A network as in claim 1 in which the appointments for the user of a given transceiver can be displayed for a selected time period, said time period being selected from the group consisting of one or more days one or more weeks, and one or more months.

7. A network as in claim 6 including means for selecting at said predetermined time period a day or week or month one or more days or weeks or months in the future.

8. A network as in claim 1 in which the information stored for each appointment includes a telephone number, and including means for automatically dialing said telephone number upon the retrieval of said information.

9. A network as in claim 8 including means for also displaying an appointment calendar for one or more months in the future or in the past.

10. A network as in claim 1 in which said control computer is a small pre-programmed general purpose computer having a CPU, a RAM, a disk file, a keyboard and a video display screen for displaying appointment information.

11. A network as in claim 10, said disk file including a permanently installed storage disc.

12. A network as in claim 1 including a private branch exchange for selectively connecting each of said transceiver units to outside telephone lines for telephonic communications.

13. A network as in claim 1 in which the appointments for each of said transceiver units are stored separately from the appointments for others of said transceiver units.

14. A network as in claim 1 in which one of said computer and said transceiver unit is adapted to display the telephone number of the party with whom the appointment is scheduled, and for automatically dialing said telephone number when displayed.

15. A network as in claim 1 in which said control computer includes a visual display screen, means for displaying on said screen a calendar for at least a portion of one month, and indicating means for indicating thereon the days on which an individual user of said network has an appointment.

16. A network as in claim 15 including means for displaying on said screen the times of the appointments for said individual for at least one selected sub-period of said month, said sub-period being selected from the group consisting of days and weeks.

17. A network as in claim 15 in which said indicating means comprises means for highlighting said days on said screen.

18. A network as in claim 1 in which said control computer includes a full alphanumeric keyboard for input of appointment information.

19. A communication network, said network comprising, in combination, a plurality of telephone transceiver units, each having visual display means, a control computer, and means for interconnecting said computer and said transceiver units so that said transceiver units can be used in telephone communications and can receive and display in text form information received from said control computer, said control computer being adapted to store and retrieve information regarding the times for appointments for users of said transceiver units to automatically send a reminder alarm and message for display by a selected one of said transceiver units before each of said appointments.

20. A network as in claim 19 in which said telephone transceiver unit is usable for dictation, and including sound recording and reproducing means for recording and reproducing sound.

21. A network as in claim 19 including means for modifying, cancelling, adding to and printing appointment lists.

22. A network as in claim 19 in which said control computer is adapted to transmit and display on a selected one of said transceiver units a schedule of appointments for a predetermined time period in which each of said transceiver units includes means operable by a user for retrieving and displaying said schedule on the display means of that transceiver unit.

* * * * *